(12) United States Patent (10) Patent No.: US 8,897,818 B2
Weng et al. (45) Date of Patent: Nov. 25, 2014

(54) SYSTEM AND METHOD FOR REDUCING ENERGY CONSUMPTION OF MOBILE DEVICES USING EARLY PAGING INDICATOR

(75) Inventors: Jianfeng Weng, Kanata (CA); Mark Earnshaw, Kanata (CA); Xin Jin, Waterloo (CA); Phat Hong Tran, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 12/944,309

(22) Filed: Nov. 11, 2010

(65) Prior Publication Data

US 2012/0122495 A1 May 17, 2012

(51) Int. Cl.
*H04W 68/00* (2009.01)
*H04W 68/02* (2009.01)

(52) U.S. Cl.
CPC .............. *H04W 68/025* (2013.01); *Y02B 60/50* (2013.01)
USPC ........ 455/458; 455/515; 455/574; 455/343.2; 455/343.3; 455/343.4; 455/343.5; 370/310.2; 370/311; 370/328

(58) Field of Classification Search
CPC ..... H04W 68/00; H04W 48/16; H04W 52/02; H04W 52/022; H04W 80/04; H04L 2012/5607
USPC .................. 455/458, 515, 574, 343.2–343.5; 370/310.2, 311, 328
See application file for complete search history.

(56) References Cited

U.S. PATENT DOCUMENTS

| 5,930,718 | A | * | 7/1999 | Rydbeck et al. | 455/458 |
| 6,111,865 | A | | 8/2000 | Butler et al. | |
| 8,073,470 | B1 | * | 12/2011 | Collins et al. | 455/458 |
| 2003/0114132 | A1 | | 6/2003 | Yue | |
| 2005/0277429 | A1 | | 12/2005 | Laroia et al. | |

OTHER PUBLICATIONS

"Extended European Search Report", European Patent Application No. 10190904.2, May 11, 2011, 7 pages.

* cited by examiner

*Primary Examiner* — Steve D Agosta

(57) ABSTRACT

A method for reducing energy consumption of mobile devices using a phase-continuous early paging indicator (EPI) is provided. For each of at least one paging occasion either A) an EPI indicative that a page is present in the paging occasion is transmitted during an EPI occasion in advance of the paging occasion, the EPI comprising at least one phase-continuous tone for the EPI occasion, and a page is transmitted during the paging occasion, or B) an EPI indicative that a page is not present in the paging occasion is transmitted during an EPI occasion in advance of the paging occasion, the EPI comprising at least one phase-continuous tone for the EPI occasion. A mobile device is configured to monitor for an EPI that comprises at least one phase-continuous tone for an EPI occasion in advance of its paging occasion in order to determine if a page is potentially present.

16 Claims, 32 Drawing Sheets

SYSTEM AND METHOD FOR REDUCING ENERGY CONSUMPTION OF MOBILE DEVICES USING EARLY PAGING INDICATOR

FIELD OF THE APPLICATION

The application relates to wireless communication, and more particularly to paging in wireless communication systems.

BACKGROUND

Various technical references are referred to herein using numerals in square brackets, [ ]. A complete citation for each of these references is provided at the end of the application.

In order to conserve battery energy of user equipment (UE) (user terminal or mobile station), a UE that has not received or performed transmissions for an extended period of time is quite likely to be placed in an RRC_IDLE state and is woken up by a paging message if there is traffic, an Earthquake Tsunami Warning System (ETWS) message, and/or updated broadcast system information to be delivered to or received by that UE. It is expected that UEs will likely spend a majority of their time in this RRC_IDLE state.

A UE may also be placed in a different type of "idle" mode while remaining in the RRC_CONNECTED state. This mode is referred to as DRX (Discontinuous Reception), and allows a UE to "sleep" for a certain portion of a configured DRX cycle. During this sleep portion of the cycle, the UE is not expected to receive communications from the eNB. Such an RRC_CONNECTED UE would continue to monitor paging for ETWS and/or system information change notifications, and this would occur during a non-sleep portion of the DRX cycle. However, a UE that has neither received nor transmitted traffic for a while would be expected to be moved to RRC_IDLE (where the UE also has to monitor paging to determine if the network wishes to initiate contact with the UE) since this is a lower energy-consuming state than is RRC_CONNECTED (even with an extended DRX cycle configured).

BRIEF DESCRIPTION OF THE DRAWINGS

Embodiments will now be described with reference to the attached drawings in which.

DETAILED DESCRIPTION

Figure 1A:
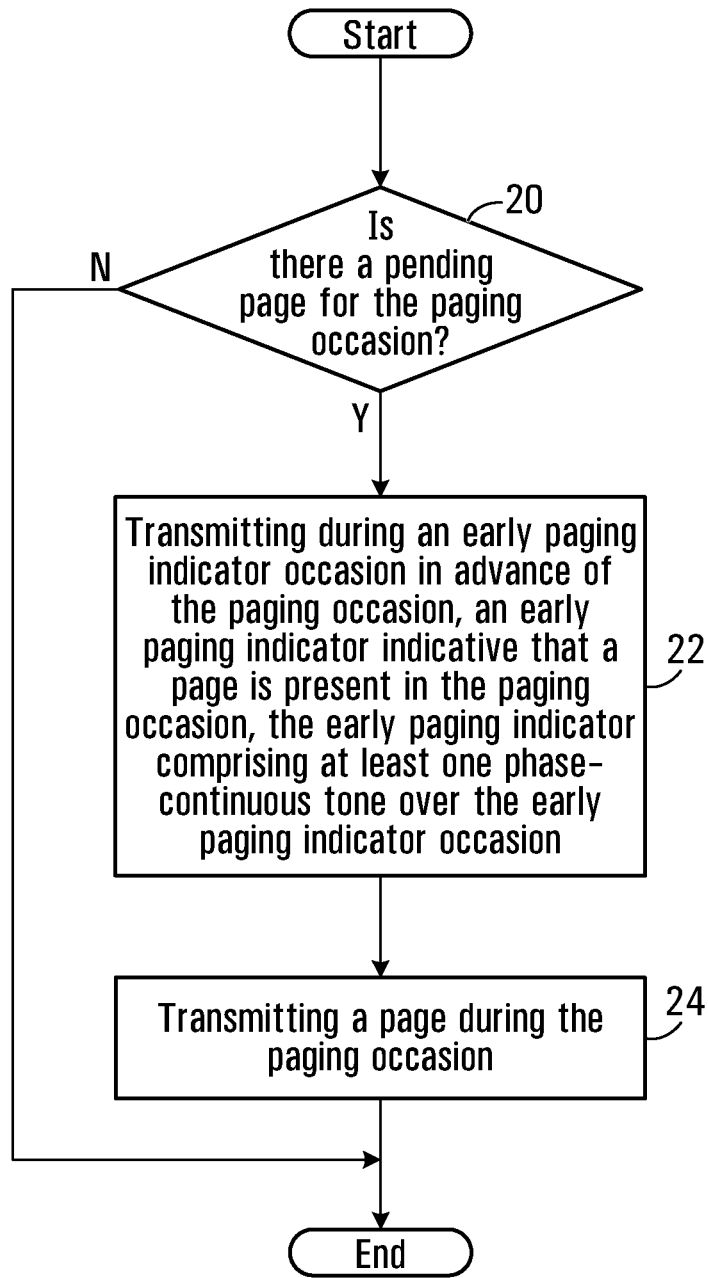
FIGS. 1A, 1B and 1C are flowcharts of example methods of informing mobile devices of the potential presence and/or absence of a page in an upcoming paging occasion, in accordance with an embodiment of the present disclosure.

This disclosure describes various embodiments for an early paging indicator through examples of OFDM-based (Orthogonal Frequency Division Multiplexing) wireless technologies, and the method can also be used in non-OFDM based technologies, such as CDMA based technologies. Such a paging indicator may reduce receiver processing and allow an RRC_IDLE (or equivalent) UE to quickly determine whether or not it should proceed with the more complex and energy-intensive processing that is typically associated with actually receiving a paging message. That is, the early paging indicator informs the UE whether a corresponding upcoming paging message is likely to be present and the UE should therefore try to receive a paging message, or whether an upcoming paging message is definitely not present. This reduction in receiver processing by RRC_IDLE mode UEs may reduce battery energy consumption and consequently could potentially extend total standby time (or, in real usage scenarios, time between charges) for a given UE.

One aspect of the present disclosure provides a method in a network component, the method comprising:

performing at least one of:

A) for each of at least one paging occasion:

transmitting, during an early paging indicator occasion in advance of the paging occasion, an early paging indicator indicative that a page is present in the paging occasion, the early paging indicator comprising at least one phase-continuous tone over the early paging indicator occasion;

transmitting a page during the paging occasion; and

B) for each of at least one paging occasion:

transmitting, during an early paging indicator occasion in advance of the paging occasion, an early paging indicator indicative that a page is not present in the paging occasion, the early paging indicator comprising at least one phase-continuous tone over the early paging indicator occasion.

In some embodiments: the early paging indicator occasion in advance of a paging occasion comprises a plurality of OFDM symbol intervals of the OFDM data subcarriers; transmitting, during an early paging indicator occasion in advance of the paging occasion, an early paging indicator indicative that a page is present in the paging occasion comprises transmitting an early paging indicator that comprises at least one phase-continuous tone over the plurality of OFDM symbol intervals; and transmitting, during an early paging indicator occasion in advance of the paging occasion, an early paging indicator indicative that a page is not present in the paging occasion comprises transmitting an early paging indicator that comprises at least one phase-continuous tone over the plurality of OFDM symbol intervals.

In some embodiments: a given paging occasion is associated with a group of mobile devices, the group of mobile devices comprising a plurality of subgroups of mobile devices within the group; the transmitted page is for at least one mobile device of at least one subgroup; for each subgroup for which a page is to be transmitted during the paging occasion, transmitting, during the early paging indicator occasion in advance of the paging occasion, an early paging indicator indicative that a page is present in the paging occasion comprises transmitting an early paging indicator specific to the subgroup that comprises at least one phase-continuous tone over the early paging indicator occasion and that is indicative that a page is present in the paging occasion for the subgroup; and for each subgroup for which no page is to be transmitted during the paging occasion, transmitting, during the early paging indicator occasion in advance of the paging occasion, an early paging indicator indicative that a page is not present in the paging occasion comprises transmitting an early paging indicator specific to the subgroup that comprises at least one phase-continuous tone over the early paging indicator occasion and that is indicative that a page is not present in the paging occasion for the subgroup.

In some embodiments, the early paging indicators specific to particular subgroups collectively comprise a plurality of tones each having a respective frequency offset from a subcarrier frequency of an OFDM resource space.

In some embodiments, the method further comprises transmitting at least one of a reference tone and a timing correction tone, wherein the plurality of tones comprises, for each subgroup, at least one separate indicator tone with each tone having a subgroup-specific offset in frequency from the reference tone.

In some embodiments, transmitting, during an early paging indicator occasion in advance of the early paging occasion, an early paging indicator indicative that a page is not present in the paging occasion comprises at least one of: transmitting the early paging indicator in a physical resource block that may otherwise be used for data transmission; and dynamically re-allocating the physical resource block for data transmission based on traffic load level.

In some embodiments, at least one band-edge subcarrier frequency which lies inside an allocated frequency band but outside a frequency range configured for data transmission is allocated for transmission of the early paging indicator.

Another aspect of the present disclosure provides a method in a mobile device comprising:

for each of at least one paging occasion:

during an early paging indicator occasion in advance of the paging occasion, monitoring for an early paging indicator that comprises at least one phase-continuous tone over the early paging indicator occasion; and performing either:

A) upon detecting the early paging indicator, attempting to receive a page during the paging occasion; or B) upon failing to detect the early paging indicator, attempting to receive a page during the paging occasion.

In some embodiments, monitoring for an early paging indicator that comprises at least one phase-continuous tone over the early paging indicator occasion comprises: calculating, over at least a portion of the early paging indicator occasion, received energy of an early paging indicator that comprises at least one phase-continuous tone; and determining that the early paging indicator has been detected if the received energy that has been calculated exceeds a first threshold value.

In some embodiments, monitoring for an early paging indicator that comprises at least one phase-continuous tone over the early paging indicator occasion comprises waking up the mobile device for the early paging indicator occasion in advance of the paging occasion and monitoring for the early paging indicator during at least a portion of the interval of the early paging indicator occasion.

In some embodiments: the mobile device belongs to a subgroup of a plurality of subgroups of mobile devices associated with a given paging occasion, each subgroup having a respective early paging indicator specific to the subgroup; and monitoring for an early paging indicator that comprises at least one phase-continuous tone over the early paging indicator occasion comprises monitoring for the respective early paging indicator specific to the subgroup of mobile devices to which the mobile device belongs.

In some embodiments, the method further comprises receiving a reference tone within a subcarrier frequency space, wherein monitoring for the respective early paging indicator specific to the subgroup to which the mobile device belongs comprises monitoring for at least one tone having a frequency offset from the frequency of the reference tone corresponding to the subgroup to which the mobile device belongs.

In some embodiments, the method further comprises: receiving a timing correction tone; and using at least one of the activation and deactivation edges of the timing correction tone to fine-tune timing associated with waking up the mobile device for the next early paging indicator occasion.

In some embodiments, calculating received energy of an early paging indicator that comprises at least one phase-continuous tone over at least a portion of the early paging indicator occasion further comprises waking up the mobile device from an energy saving mode at a time such that the effective starting time for calculating the received energy of the early paging indicator is not earlier than the starting time of the early paging indicator tone signal at a receiver of the mobile device.

In some embodiments, calculating received energy of an early paging indicator that comprises at least one phase-continuous tone over at least a portion of the early paging indicator occasion further comprises terminating the calculation at the earlier point of time between i) and ii) when: i) the calculated energy of the early paging indicator up to the point of time exceeds a second threshold value based on a target confidence level that is not lower than the first threshold value; and ii) the early paging indicator occasion ends.

In some embodiments, monitoring for an early paging indicator that comprises at least one phase-continuous tone for the early paging indicator occasion comprises monitoring at least one band-edge subcarrier frequency, which lies inside an allocated frequency band but outside a frequency range configured for data transmission, allocated for transmission of the early paging indicator.

In some embodiments, the method further comprises placing the mobile device in an energy saving mode in response to at least one of the following: upon detecting an absence of an early paging indicator indicative that a page is present in the paging occasion; and upon detecting a presence of an early paging indicator indicative that a page is not present in the paging occasion.

Yet another aspect of the present disclosure provides a mobile device comprising:
  at least one antenna;
  a wireless access radio, functionally connected to the at least one antenna, configured to communicate with at least one wireless access network;
  a processor, functionally connected to the wireless access radio, configured to process wireless communications communicated via the wireless access radio;
  an early paging indicator detector function configured to, for each of at least one paging occasion assigned to the mobile device:
    for an early paging indicator occasion in advance of and associated with the paging occasion, monitor via the wireless access radio for an early paging indicator that comprises at least one phase-continuous tone over the early paging indicator occasion; and
    either:
    A) upon detecting the early paging indicator, prompt the processor to attempt during the paging occasion to receive a page via the wireless access radio; or
    B) upon failing to detect the early paging indicator, prompt the processor to attempt during the paging occasion to receive a page via the wireless access radio.

In some embodiments, the early paging indicator detector function is further configured to otherwise place the early paging indicator detector function and the wireless access radio into an energy saving mode.

In some embodiments, at least one of the early paging indicator detector function and the wireless access radio is further configured to wake up for the early paging indicator occasion in advance of and associated with the paging occasion.

In some embodiments, the early paging indicator function is configured to monitor for an early paging indicator that comprises at least one phase-continuous tone for the early paging indicator occasion by calculating received energy of an early paging indicator that comprises at least one phase-continuous tone over a first time duration and determining that the early paging indicator has been detected if the received energy that has been calculated exceeds a first threshold value.

In some embodiments: the mobile device belongs to a subgroup of a plurality of subgroups of mobile devices associated with a given paging occasion, each subgroup having a respective early paging indicator specific to the subgroup; and the early paging indicator detector function is configured to monitor for an early paging indicator that comprises at least one phase-continuous tone over the early paging indicator occasion by monitoring for the respective early paging indicator specific to the subgroup of mobile devices to which the mobile device belongs that comprises at least one phase-continuous tone over the early paging indicator occasion.

In some embodiments, the early paging indicator detector function is further configured to: receive via the wireless access radio a reference tone within a subcarrier frequency space; and monitor for the respective early paging indicator specific to the subgroup to which the mobile device belongs by monitoring for a tone having an offset from the frequency of the reference tone corresponding to the subgroup to which the mobile device belongs.

In some embodiments, the early paging indicator detector function is further configured to: receive via the wireless access radio a timing correction tone; and determine, based on at least one of the activation and deactivation edges of the timing correction tone, the timing associated with waking up at least one of the early paging indicator detector function and the wireless access radio for the next early paging indicator occasion.

In some embodiments, the early paging indicator detector function is configured to monitor for an early paging indicator that comprises at least one phase-continuous tone over the early paging indicator occasion by monitoring at least one band-edge subcarrier frequency, which lies inside an allocated frequency band but outside a frequency range configured for data transmission, allocated for transmission of the early paging indicator.

In some embodiments, the early paging indicator detector function is configured to place the mobile device in an energy saving mode in response to at least one of the following: upon detecting an absence of an early paging indicator indicative that a page is present in the paging occasion; and upon detecting a presence of an early paging indicator indicative that a page is not present in the paging occasion.

Embodiments of the present disclosure are applicable to any OFDM-based radio access technology, such as (but not limited to)
  E-UTRA (Evolved Universal Terrestrial Radio Access) (e.g. LTE (Long Term Evolution), LTE-A (LTE Advanced), etc); and
  WiMAX (Worldwide Interoperability for Microwave Access).

Three examples of methods for providing an early paging indicator in accordance with the present disclosure will now be described with reference to FIGS. 1A, 1B and 1C.

FIG. 1A is a flowchart of an example of a method in a network component for providing an early paging indicator indicative of when a page is potentially present in an upcoming paging occasion. Within this document, the terms "page" and "paging message" may be used interchangeably. An access node is an example of a network component in which some embodiments of the present disclosure may be implemented. A base station and a relay node are each an example of an access node in which some embodiments of the present invention may be implemented. In some embodiments, as described later, the base station may be an eNB (evolved Node B) station in an E-UTRA network. The method shown in FIG. 1A is illustrated for a single paging subgroup, but it is understood that one or more paging subgroups may exist for the same paging occasion and that the procedure described in FIG. 1A may need to be repeated for each of these potentially multiple paging subgroups. The same is true for the methods illustrated in FIGS. 1B and 1C.

The method in FIG. 1A begins at decision block 20, in which it is determined if a pending page is present for an upcoming paging occasion.

If a pending page is present (Yes path from decision block 20), the method proceeds to block 22, in which, during an early paging indicator occasion in advance of the paging occasion, the network component transmits an early paging indicator that is indicative that a page is present in the paging occasion. The early paging indicator comprises at least one phase-continuous tone for the early paging indicator occasion, which can potentially reduce the processing complexity associated with detecting an early paging indicator. Each such tone is individually phase-continuous, and the phase of a first such phase-continuous tone could be different from the phase of a second such phase-continuous tone.

A tone is defined here as a single-frequency waveform being transmitted with a fixed frequency. Information may be communicated by varying at least one property of this waveform, where such properties include its phase (possibly relative to a reference phase) and amplitude. The amplitude may be set to zero in certain cases. This particular case is termed On-Off-Keying (OOK), where information is communicated via the presence (i.e. a non-zero waveform amplitude) or absence (i.e. a waveform amplitude equal to zero) of the waveform.

Following block 22, the method proceeds to block 24, in which the network component transmits the pending page during the paging occasion, and the method is done for that paging occasion.

In some embodiments, if it is determined in decision block 20 that there is not a pending page for the paging occasion (No path for block 20), the method is done for that paging occasion.

In some embodiments, the page transmitted in block 24 is modulated prior to transmission using the standard modulation used for paging messages. In many cases, in order to receive paging messages, a mobile device must be in a relatively high energy-consuming state. This is due at least in part to the fact that the encoding and modulation used to encode and modulate pages typically require resource-intensive processing in order to be demodulated and decoded. In contrast, because differing modulation types are utilized to modulate early paging indicators and pages in embodiments of the present disclosure, a mobile device can potentially receive and demodulate an early paging indicator that is transmitted such that it comprises at least one phase-continuous tone for the early paging indicator occasion and can be decoded in a lower energy-consuming state.

In some embodiments, a mobile does not need to transition into a higher energy-consuming state associated with demodulation of messages, such as pages, encoded and modulated using a different modulation type, should the mobile device determine based on the EPI decoding result that there is no potential page present in the paging occasion based on the early paging indicator.

The example method illustrated in the flowchart of FIG. 1A is based on a "positive" indication from the network component that a potential page is present in the upcoming paging occasion. That is, in accordance with FIG. 1A, the network component transmits the early paging indicator to indicate that a mobile device should check for a page during the upcoming paging occasion.

Figure 1B:
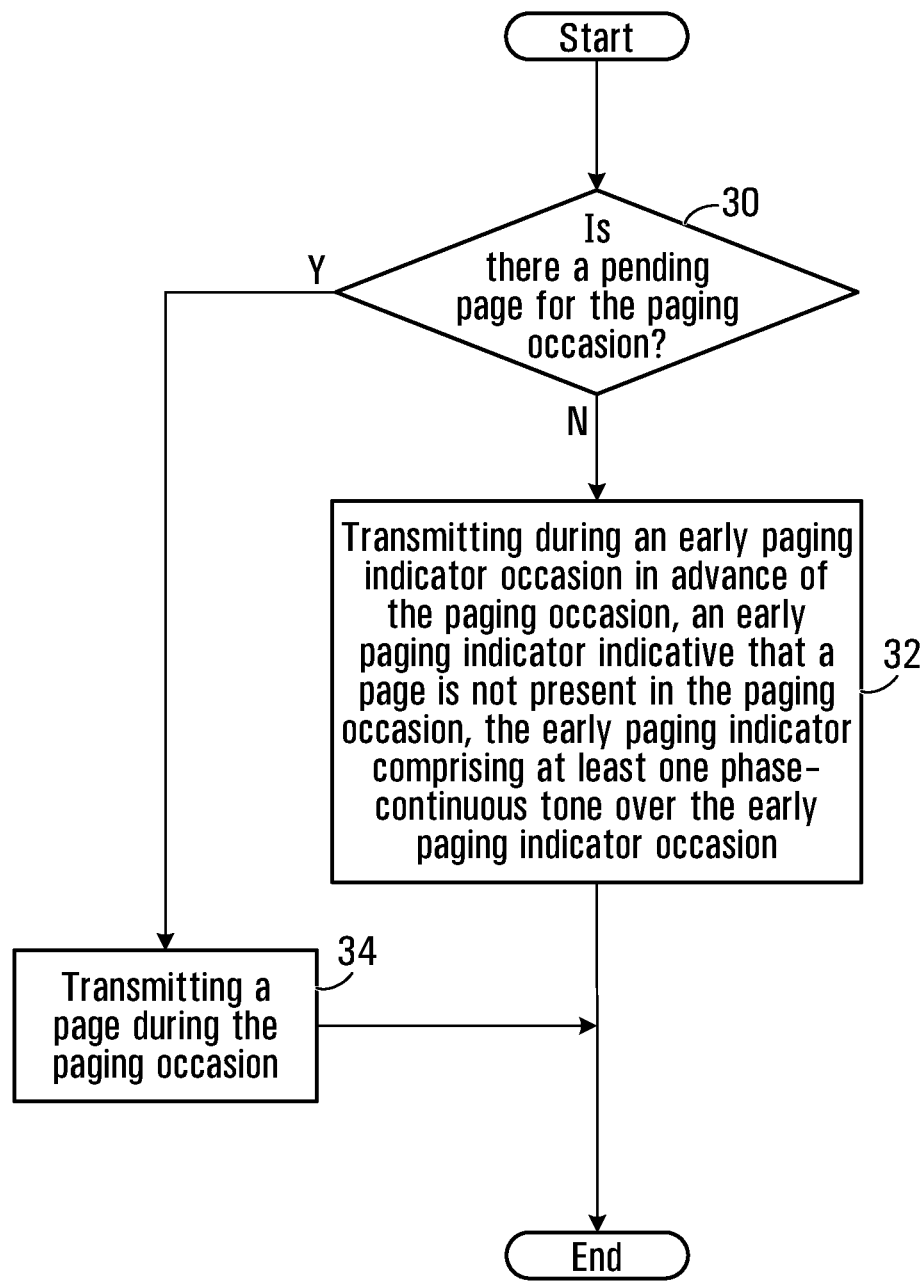

In contrast, the method illustrated in the flowchart of FIG. 1B involves the transmission of a "negative" early paging indicator that indicates that a mobile device should not check for a page during the upcoming paging occasion. In some embodiments, the default behaviour of the mobile device is to check for a page at each paging occasion unless a "negative" early paging indicator is received in an early paging indicator occasion in advance of the paging occasion.

The method illustrated in the flowchart of FIG. 1B begins at block 30, in which the network component determines if there is a pending page for the upcoming paging occasion.

If a pending page is not present (No path from decision block 30), the method proceeds to block 32, in which, during an early paging indicator occasion in advance of the paging occasion, the network component transmits an early paging indicator that is indicative that a page is not present in the paging occasion. Similar to the "positive" early paging indicator transmitted in block 22 of FIG. 1A, the "negative" early paging indicator transmitted in block 32 of FIG. 1B comprises at least one phase-continuous tone for the early paging indicator occasion.

Following block 32, the method is done for that paging occasion.

In the illustrated embodiment of the method, if it is determined in decision block 30 that there is a pending page for the paging occasion (Yes path for block 30), the method proceeds to block 34, in which the network component transmits the pending page during the paging occasion, and the method is done for that paging occasion.

In some embodiments, some mobile devices, groups of mobile devices or subgroups of mobile devices, as described later, are configured to monitor for "positive" early paging indicators in accordance with FIG. 1A, while others are configured to monitor for "negative" early paging indicators in accordance with FIG. 1B. Accordingly, in some embodiments, a network component may be configured to provide early paging indicators in accordance with the example method illustrated in FIG. 1A, the example method illustrated in FIG. 1B, or both.

Figure 1C:
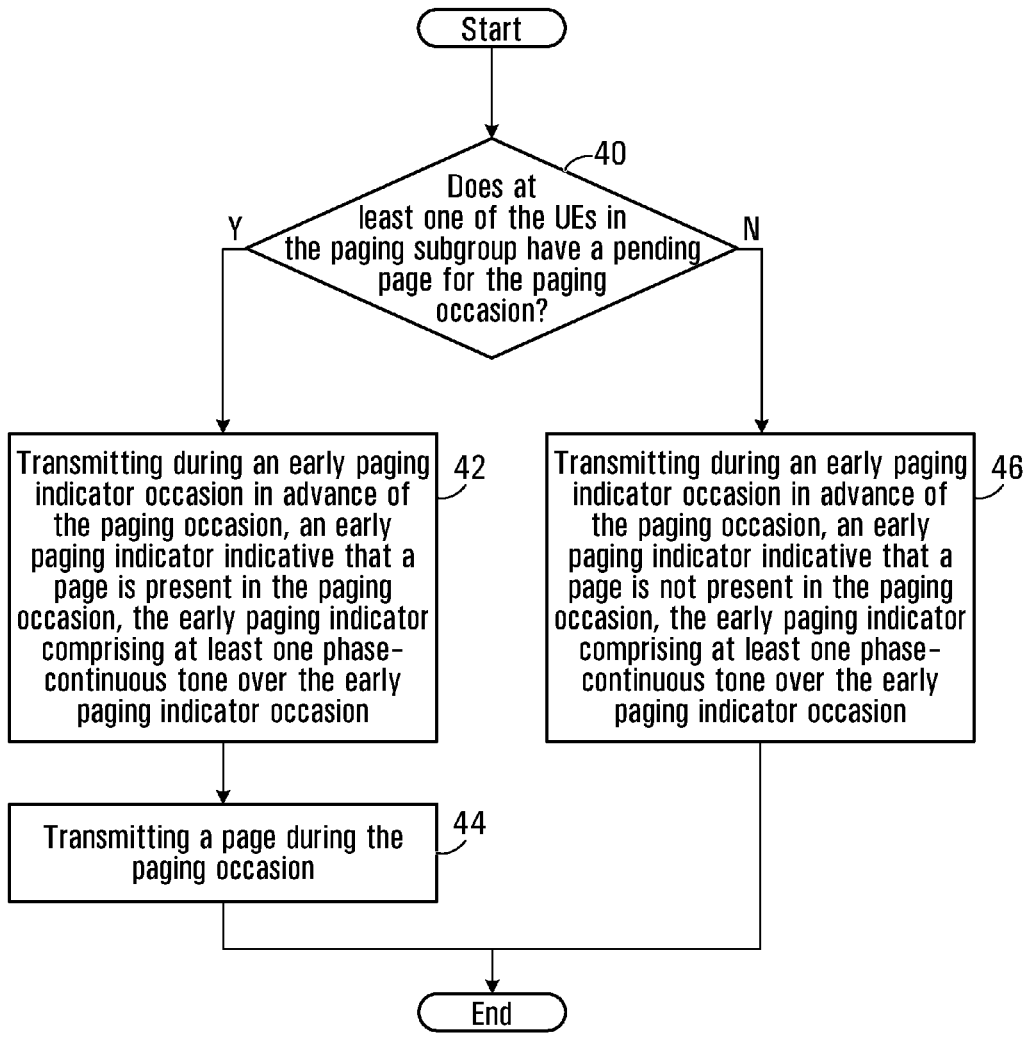

FIG. 1C is a flowchart of an example of a method in a network component for providing an early paging indicator indicative of when a page or paging message is potentially present or is expected to be absent in an upcoming paging occasion. The method in FIG. 1C begins at block 40, in which the network component determines if any of the UEs in the paging subgroup being considered have a pending page. If there is at least one pending page for at least one UE in the subgroup (Yes path from block 40), the method proceeds to block 42, in which, during an early paging indicator occasion in advance of the paging occasion which contains at least one page, the network component transmits an early paging indicator that indicates that at least one page for at least one UE in the paging subgroup is present in the associated paging occasion. The early paging indicator comprises at least one phase-continuous tone for the early paging indicator occasion.

It is understood that the early paging indicator is modulated with a modulation type that produces a phase-continuous waveform for the early paging indicator occasion. Modulation is the process of varying at least one property of an output transmitted signal based on the values contained in an input information signal. This process may include multiple individual processing steps between the input and output, such as error correction coding, bit interleaving, mapping to constellation symbols, and conversion between frequency and time domains (e.g. via an IFFT (Inverse Fast Fourier Transform)). The input information signal may comprise a set of one or more information bits.

In some cases, modulation may not include all of the example listed processing steps.

In some cases, additional processing steps which are not specifically listed above may also be included as part of modulation.

The term "modulation type", as used herein, is defined as a specific sequence of processing steps between the input information signal and the output modulation signal. For example, one modulation type may comprise the three consecutive steps of error correction coding, bit interleaving, and constellation mapping, while another different modulation type may simply comprise the single step of constellation mapping. As such, the particular sequence and selection of processing steps included in a modulation type are implementation-specific details and the specific examples described herein are understood as merely illustrative of aspects of the present disclosure without being limiting.

Following block 42, the method proceeds to block 44, in which the network component transmits the page during the paging occasion, and the method for the paging subgroup concludes in preparation for either processing another paging subgroup for the same paging occasion or else waiting for the next paging occasion.

If there is no pending page for any of the UEs in the paging subgroup (No path from block 40), the method proceeds to block 46, in which, during an early paging indicator occasion in advance of the paging occasion which does not contain a page for the paging subgroup, the network component transmits an early paging indicator that comprises at least one phase-continuous tone and which indicates that a page is not expected to be present in the associated paging occasion, and the method for the paging subgroup concludes in preparation for either processing another paging subgroup for the same paging occasion or else waiting for the next paging occasion.

In some embodiments, the default behaviour of the mobile device is to check for a page at each paging occasion unless a "negative" early paging indicator is received in an early paging indicator occasion in advance of the paging occasion.

In some embodiments, the early paging indicator is modulated using simple On-Off-Keying, and in this case the processing steps contained in block 46 of FIG. 1C or the processing steps contained in block 42 and 44 of FIG. 1C are not performed or are skipped. For On-Off-Keying, if a "positive" early paging indicator (indicative that a page is present in the associated paging occasion for an "ON" keyed condition) is to be sent, then only the steps contained in block 42 and block 44 of FIG. 1C are performed and the steps contained in block 46 of FIG. 1C are not performed (i.e., skipped). In contrast, for On-Off-Keying, if a "negative" early paging indicator (indicative that a page is not present in the associated paging occasion for an "ON" keyed condition) is to be sent, then only the steps contained in block 46 of FIG. 1C are performed and the steps contained in block 42 and block 44 of FIG. 1C are not performed (i.e., skipped). Examples of such operation are illustrated in the flowcharts of FIGS. 1A and 1B respectively.

In other embodiments, the early paging indicator could be modulated using a different modulation type such as Phase Shift Keying, for example BPSK (Binary Phase Shift Keying) or QPSK (Quadrature Phase Shift Keying), constellation mapping which, during a single modulation symbol over the EPI occasion the waveform maintains a phase-continuous tone. Detection of an On-Off-Keying modulated early paging indicator is generally simpler and requires less signal processing resources as compared to BPSK or QPSK, as the latter constellation mappings typically involve coherent demodulation or differential demodulation, while On-Off-Keying modulation resolves any phase ambiguity problem, etc.

In some embodiments, the early paging indicator occasion in advance of a paging occasion comprises a plurality of symbol intervals and transmitting an early paging indicator indicative of the presence or not of a pending page comprises transmitting an early paging indicator that comprises at least one phase-continuous tone for the plurality of symbol intervals. A symbol interval is an OFDM symbol duration plus the cyclic prefix duration.

In some embodiments, a given paging occasion is associated with a group of mobile devices, wherein the group of mobile devices comprises a plurality of subgroups of mobile devices within the group. For a page associated with a subgroup, or a mobile device within the subgroup, transmitting, during the early paging indicator occasion in advance of the paging occasion, an early paging indicator indicative that the page is present in the paging occasion comprises transmitting an early paging indicator specific to the subgroup that comprises at least one phase-continuous tone over the duration of the early paging indicator occasion.

In some embodiments, for a paging occasion in which no page is present for a subgroup, transmitting an early paging indicator indicative that a page is not present in the paging occasion comprises, for each subgroup for which no page is to be transmitted during the paging occasion, transmitting, during the early paging indicator occasion in advance of the paging occasion, an early paging indicator specific to the subgroup that comprises at least one phase-continuous tone over the duration of the early paging indicator occasion and indicative that a page is not present in the paging occasion for the subgroup.

In some embodiments, the early paging indicators specific to particular subgroups collectively comprise a plurality of tones each having a respective frequency offset from a sub-carrier frequency of an OFDM resource space.

In some embodiments, for a given subcarrier allocated for EPI transmission, only one EPI tone within the subcarrier frequency range is used in order to maintain the orthogonality of the EPI tones and data subcarriers.

In some embodiments, the plurality of tones comprise a reference tone, a timing correction tone and, for each subgroup, a separate tone having a subgroup-specific offset in frequency from the reference tone.

In some embodiments, each early paging indicator has a length in terms of a number of OFDM symbols that exceeds the number of tones in the plurality of tones.

In some embodiments, at least one early paging indicator has a length in terms of OFDM symbols that exceeds the length of one subframe.

In some embodiments, the method further comprises transmitting an indication of how far in advance of the paging occasion the early paging indicator will be transmitted, so that the mobile devices know when to wake up, assuming they are in a reduced energy-consumption "idle" state, and monitor for the early paging indicator.

In some embodiments, transmitting an early paging indicator indicative that a page is not present in the paging occasion comprises transmitting the early paging indicator in one or more physical resource blocks that would otherwise be used for data transmission. In some embodiments, the method further comprises dynamically re-allocating these physical resource blocks for data transmission (rather than early paging indicator transmission) having regard to traffic load.

In some embodiments, transmission of the early paging indicator is punctured with transmission of at least one reference signal.

In some embodiments, transmission of the early paging indicator is repeated in consecutive subframes.

In some embodiments, the plurality of tones each having a respective frequency offset from a subcarrier frequency and the resulting time-domain waveform for the k-th (k= −M/2, . . . , −1, 0, 1, . . . , M/2−1) tone in a subcarrier is given by $$s_{EPI}(t) = \sum_{k=-M/2}^{M/2-1} \beta_{k,EPI} \alpha_{k,EPI} e^{j2\pi \Delta f [k_{o,EPI}+(k/M)]t} \quad (1)$$

for $t$ over the EPI occasion where M is the partitioning factor to divide a nominal subcarrier into a plurality of tones, $\beta_{k,EPI}$ is the amplitude of the early paging indicator (EPI) waveform, $\alpha_{k,EPI}$ is the On-Off-Keying modulated early paging indicator symbol including an initial phase for the k-th tone of the plurality of tones within the data subcarrier (the phase contained in $\alpha_{k,EPI}$ maintains a constant value over the EPI occasion, but may change from one EPI time interval to another), and $k_{o,EPI}$ is the subcarrier offset in a configured channel bandwidth assigned to carry early paging indicator tones.

In some embodiments, within a subcarrier frequency range allocated for the transmission of EPI tones, the EPI tone with index k=0 is used for the EPI transmission while other possible EPI tones with tone index k≠0 are left unused. One benefit of that is the 0-th EPI tone is orthogonal within any nominal OFDM symbol interval (interval duration=1/Δf) to the waveforms of other data subcarriers. Note that if multiple EPI tones within the same subcarrier are used for EPI transmission, those EPI tones are orthogonal to each other with a longer observation interval (interval duration=M/Δf) but those EPI tones may introduce potential interference to other non-EPI subcarriers, a remedy to which is to introduce a sufficient guard band at both sides of the EPI tones and guard band is not used to transmit anything. Another way is to introduce some window function to the amplitude of the tone. It is possible to consider a guard band together with a windowing function.

In some embodiments, one or more data subcarriers may be subdivided into EPI tones as described above. In some embodiments, the EPI tones, reference tone, and timing correction tone may have a one-to-one mapping to data subcarriers with no subdivision of data carriers occurring.

In some embodiments, there is no layer mapping and precoding in the modulation type used for modulation of the early paging indicator.

In some embodiments, at least one band-edge frequency band is allocated for transmission of the early paging indicator.

In some embodiments, the network component receives signaling from at least one mobile device identifying at least one preferred location of the early paging indicator within an OFDM resource space. In some embodiments, the network component may provide a set of possible early paging indicator locations to the mobile devices, which may then indicate their preferences from this set.

In some embodiments, the method further comprises broadcasting early paging indicator location and configuration information.

In some embodiments, the method further comprises broadcasting an indication of the number of subgroups, e.g. distinct early paging indicators, associated with the paging occasion.

In some embodiments, transmitting the early paging indicator comprises puncturing transmission of the early paging indicator on at least one subcarrier otherwise allocated for Physical Downlink Control CHannel (PDCCH) transmissions.

Figure 2:
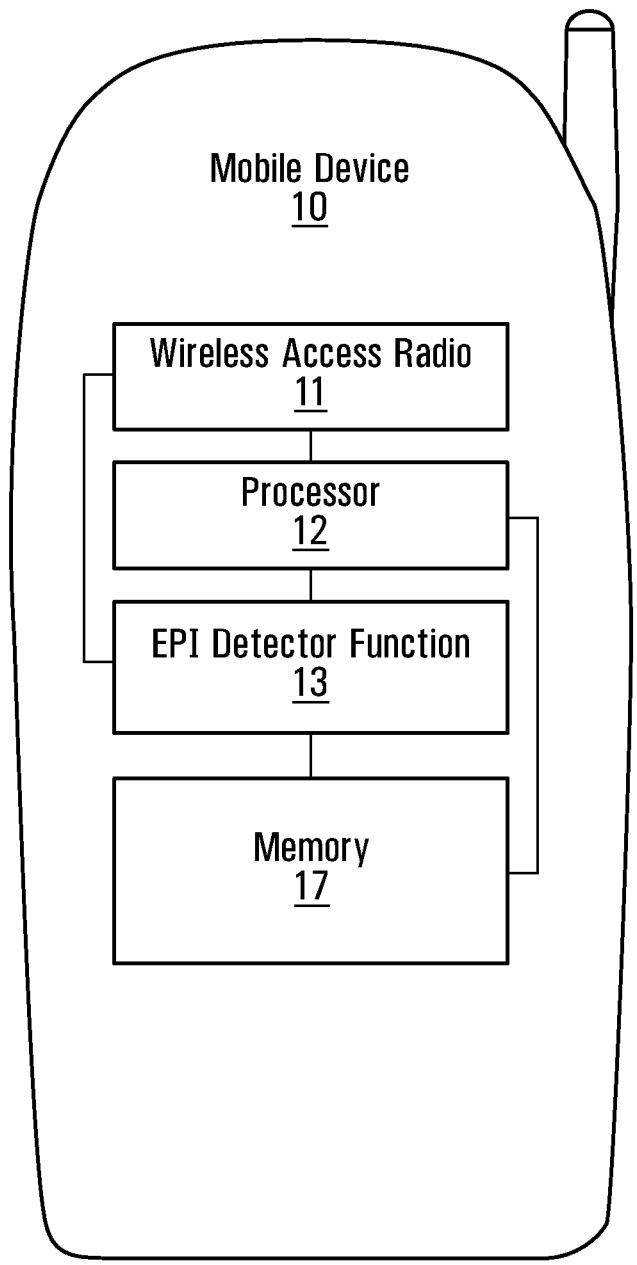
FIG. 2 is a block diagram of an example mobile device in accordance with an embodiment of the present disclosure.

Example details of a mobile device 10 in accordance with an embodiment of the present disclosure are shown in FIG. 2. Mobile device 10 has a wireless access radio 11, a processor 12, an EPI detector function 13, and a memory 17. The mobile device 10 may have other components, but they are not shown for the sake of simplicity. In some embodiments the memory 17 may include a SIM (Subscriber Identity Module).

Wireless access radio 11 is functionally connected to processor 12 and EPI detector function 13. Processor 12 is also functionally connected to EPI detector function 13 and memory 17. EPI detector function is also functionally connected to memory 17.

Operation of the mobile device 10 will now be described by way of detailed example with reference to FIGS. 1A, 1B, 1C and 2.

Wireless access radio 11 is configured to transmit and receive wireless signalling from at least one wireless network, via at least one wireless radio access technology (RAT). Processor 12 is configured to, amongst other things, process data associated with wireless communication via wireless access radio 11, store and receive data in/from memory 17 and communicate with EPI detector function 13.

EPI detector function 13 is configured to monitor an early paging indicator occasion in advance of a paging occasion in order to determine if the mobile device should look for a potential page during the paging occasion. In particular, EPI detector function 13 is configured to monitor for an early paging indicator modulated using a first modulation type that results in an early paging indicator that comprises at least one phase-continuous tone over the duration of the early paging indicator occasion. Depending on whether the EPI detector function 13 is configured to look for either a "positive" or "negative" early paging indicator, EPI detector function 13 is configured to either advise processor 12 to attempt to receive a page via wireless access radio 11 during the paging occasion upon detecting an early paging indicator indicative of a potential page during the paging occasion, wherein the page is expected to be modulated using a second modulation type that differs from the first modulation type, or advise processor 12 to attempt to receive a page modulated using the second modulation type via wireless access radio 11 during the paging occasion upon failing to detect an early paging indicator indicative that no potential page is present for the mobile device during the paging occasion. During the time periods other than the EPI occasions or the paging occasions when the EPI is indicative of no potential pending paging message, the wireless access radio 11, the hardware associated with the EPI detector function 13, as well as the processor 12 and memory may be placed in a low energy consumption mode by the processor 12 if they are not needed in other tasks. Otherwise, they are placed in a mode that consumes energy at a higher rate.

In some embodiments, if EPI detector function 13 detects an early paging indicator indicating that no page is present for the mobile device during the paging occasion, processor 12 will not attempt to receive a page via the wireless access radio 11 during the associated paging occasion.

In some embodiments, if EPI detector function 13 detects absence of an early paging indicator indicating that a page is present for the mobile device during the paging occasion, processor 12 will not attempt to receive a page via the wireless access radio 11 during the paging occasion.

As noted above, FIGS. 1A and 1B illustrate flowcharts of methods by which a network component may generate an early paging indicator for a given paging occasion indicating that a page is present or is not present, respectively, during the paging occasion. FIG. 1C illustrates a flowchart of a method that generates an early paging indicator that indicates a page is pending for at least one device in a subgroup of mobile devices and also generates, for one or more subgroups for which a page is not pending for a given paging occasion, an early paging indicator indicating that a page is not pending in the paging occasion.

In some embodiments, EPI detector function 13 is configured to wake up the mobile device for an early paging indicator occasion in advance of the paging occasion and monitor for the early paging indicator during the early paging indicator occasion.

In some embodiments, processor 12 is configured to: put the mobile device into a reduced energy consumption state and wait for the next early paging indicator occasion when either EPI detector function detects absence of an early paging indicator indicating that a potential page is present during the upcoming paging occasion, or when EPI detector function detects an early paging indicator indicating that no page is present for the upcoming paging occasion.

In some embodiments, the mobile device belongs to a subgroup of a plurality of subgroups of mobile devices associated with a given paging occasion, each subgroup having a respective early paging indicator specific to the subgroup, and EPI detector function 13 is configured to monitor for the respective early paging indicator specific to the subgroup of mobile devices to which the mobile device belongs.

In some embodiments, the respective early paging indicators specific to particular subgroups collectively comprise a plurality of tones each having a respective frequency offset from a subcarrier frequency.

In some embodiments, the plurality of tones comprise a reference tone, a timing correction tone and, for each subgroup, a separate tone having a subgroup-specific offset in frequency from the reference tone. The reference tone, the timing correction tone, and other EPI tones are not necessarily within one data subcarrier allocated for EPI transmission, but may occupy multiple data subcarriers that have been allocated for EPI transmission.

In some embodiments, the processor is configured to use activation edges of the timing correction tone to correct timing associated with waking up the mobile device for the next early paging indicator occasion.

In some embodiments, monitoring for the respective early paging indicator specific to the subgroup to which the mobile device belongs comprises monitoring for the tone having a respective offset from the subcarrier frequency corresponding to the subgroup to which the mobile device belongs.

In some embodiments, the early paging indicator occasion comprises a plurality of symbol intervals and EPI detector function 13 is configured to monitor for an early paging indicator that comprises at least one phase-continuous tone over the early paging indicator occasion by measuring the received energy of an early paging indicator that comprises at least one phase-continuous tone over the plurality of symbol intervals, and determine that the early paging indicator has been detected if the received energy that has been measured exceeds a threshold value.

In some embodiments, EPI detector function 13 is configured to monitor for an early paging indicator specific to the subgroup to which the mobile device belongs by accumulating a received signal on a tone frequency specific to the subgroup over a number of OFDM symbols that exceeds the number of tones in the plurality of tones allocated within the OFDM subcarrier band.

In some embodiments, EPI detector function 13 is configured to adapt the length of the accumulation having regard to confidence in the detection of the early paging indicator. In some embodiments, EPI detector function 13 is configured to terminate accumulation if a threshold value of confidence in the detection of the early paging indicator has been satisfied.

In some embodiments, EPI detector function 13 is configured to monitor the respective tone of the subgroup during the early paging indicator occasion between punctures of at least one reference signal.

In some embodiments, EPI detector function 13 is configured to monitor the respective tone of the subgroup in consecutive subframes.

In some embodiments, EPI detector function 13 is configured to monitor at least one band-edge subcarrier frequency allocated for transmission of the early paging indicator.

In some embodiments, mobile device 10 is configured to transmit a request identifying a preferred location of the early paging indicator within an OFDM resource space. In some embodiments, a set of possible early paging indicator locations may be provided to the mobile device, which then indicates its preference(s) from this set.

In some embodiments, mobile device 10 is configured to determine if an early paging indicator is provided by a cell by receiving via wireless access radio 11 a broadcast transmission possibly containing early paging indicator location and configuration information.

In some embodiments mobile device 10 is configured to receive broadcast information via wireless access radio 11 indicating the number of distinct early paging indicators that each comprise at least one individually phase-continuous tone for a given early paging indicator occasion, and determine the mobile device's respective subgroup, EPI_SG, according to:

$$EPI\_SG = IMSI \bmod EPIs\_per\_EPI\_occasion$$

where EPIs_per_EPI_occasion represents the number of distinct EPIs at each early paging indicator occasion and IMSI is the International Mobile Subscriber Identity of the mobile device.

In some embodiments, processor 12 is configured to attempt to receive a page modulated using the second modulation type during the paging occasion by transitioning mobile device 10 to a higher energy consumption state.

Figure 3:
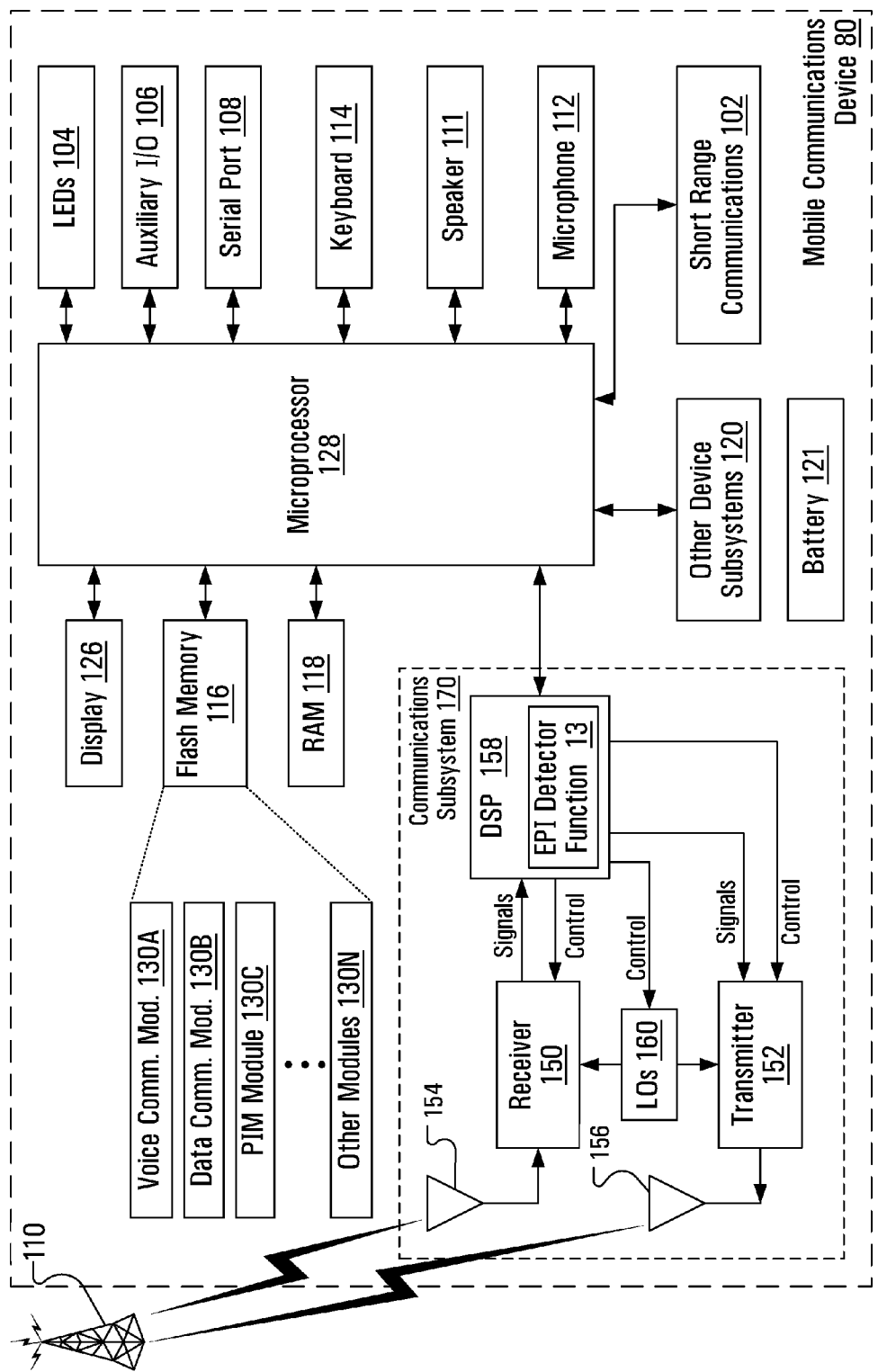
FIG. 3 is a block diagram of an example mobile device in accordance with another embodiment of the present disclosure.

There are many possibilities for the mobile device 10 shown in FIG. 2. Referring now to FIG. 3, shown is a block diagram of another mobile device 80 that may implement any of the methods described herein. It is to be understood that the mobile device 80 is shown with very specific details for example purposes only.

A processing device (a microprocessor 128) is shown schematically as coupled between a keyboard 114 and a display 126. The microprocessor 128 controls operation of the display 126, as well as overall operation of the mobile device 80, in response to actuation of keys on the keyboard 114 by a user.

The mobile device 80 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 80 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 80 may have a battery 121 to power the active elements of the mobile device 80. The mobile device 80 is in some embodiments a two-way radio frequency (RF) communication device having voice and data communication capabilities. In addition, the mobile device 80 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 80 may also be stored to the RAM 118.

The microprocessor 128, in addition to its operating system functions, enables execution of software applications on the mobile device 80. A predetermined set of software applications that control basic device operations, such as a voice communications module 130A and a data communications module 130B, may be installed on the mobile device 80 during manufacture. In addition, a personal information manager (PIM) application module 130C may also be installed on the mobile device 80 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communications subsystem 170, and possibly through the short-range communications subsystem 102. The communications subsystem 170 includes a receiver 150, a transmitter 152 and one or more antennas, illustrated as a receive antenna 154 and a transmit antenna 156. In addition, the communications subsystem 170 also includes a processing module, such as a digital signal processor (DSP) 158, and local oscillators (LOs) 160. In FIG. 3, DSP 158 is shown to include an EPI detector function 13. The EPI detector function 13 shown in FIG. 3 is configured to operate in the same manner as the EPI detector function 13 shown as part of the mobile device 10 in FIG. 2. As such, a repetition of its functionality is omitted here. However, it is noted that in FIG. 3, DSP 158 has a "control" line to LOs 160 and to receiver 150 (and transmitter 152 as well although not necessarily related to EPI Detector Function 13), so that EPI detector function 13 is able to control LOs 160, receiver 150 and transmitter 152 in order to shut them off when EPI detector function 13 determines that there is no pending paging message for mobile device 80, and sleep until the next EPI cycle. In some embodiments, the interface between DSP 158 and Microprocessor 128 includes an interrupt signal, so that EPI detector function 13 may be able to wake up Microprocessor 128 for additional protocol processing once it determines there may be a pending paging.

The specific design and implementation of the communications subsystem 170 is dependent upon the communication network in which the mobile device 80 is intended to operate. For example, the communications subsystem 170 of the mobile device 80 may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 80.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 80 may send and receive communication signals over the communication network 110. Signals received from the communication network 110 by the receive antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital-to-analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, based on a timer (not shown in the drawing), DSP 158 controls the receiver 150 and LOs 160 to power off and on so that during the EPI occasions the receiver is ready to receive the potential incoming EPI modulated signals. During other periods the receiver 150 and LOs 160 are placed in a low energy consumption mode to save energy. As another example, gains applied to communication signals in the receiver 150 and the transmitter 152 may be adaptively controlled through automatic gain control algorithms implemented in the DSP 158.

In a data communication mode, a received signal, such as a text message or web page download, is processed by the communications subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communications subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 80. In addition, the display 126 may also be utilized in voice communication mode, for example, to display the identity of a calling party, the duration of a voice call, or other voice call related information.

The short-range communications subsystem 102 enables communication between the mobile device 80 and other proximate systems or devices, which need not necessarily be similar devices. For example, the short-range communications subsystem may include an infrared device and associated circuits and components, or a Bluetooth™ communication module to provide for communication with similarly-enabled systems and devices.

For illustrative purposes, further specific embodiments relating to the E-UTRA radio access technology standard are discussed below, although it is to be understood that the concepts described herein are equally applicable to other standards that are based on other radio access technologies, some of which are listed above.

In order to provide some background information relating to paging in an E-UTRA network, a brief overview on E-UTRA downlink channel structure and the E-UTRA paging channel is given and a high-level description of the demodulation of the E-UTRA paging channel is provided.

ABBREVIATIONS & TERMINOLOGY

For the assistance of the reader, the following listing of abbreviations and terminology used herein is provided:
CDMA Code Division Multiple Access
CCE Control Channel Element
CFI Control Format Indicator
CP Cyclic Prefix
CW Continuous Waveform
DCI Downlink Control Information
DL DownLink
DRX Discontinuous Reception
DwPTS Downlink Pilot Time Slot
eNB Evolved Node B
EPI Early Paging Indicator
E-UTRA Evolved Universal Terrestrial Radio Access
FDD Frequency Division Duplexing
FFT Fast Fourier Transform
GP Guard Period
HARQ Hybrid Automatic Repeat reQuest
IFFT Inverse Fast Fourier Transform
IMSI International Mobile Subscriber Identity
LTE Long Term Evolution (aka E-UTRA)
MAC Medium Access Control
MBMS Multimedia Broadcast Multicast Service
MBSFN MBMS Single Frequency Network
MIMO Multiple Input Multiple Output
NAS Non Access Stratum
OFDM Orthogonal Frequency Division Multiplexing
OOK On Off Keying
PCH Paging CHannel
PDCCH Physical Downlink Control CHannel
PDSCH Physical Downlink Shared CHannel
PHY Physical layer
PMCH Physical Multicast CHannel
QAM Quadrature Amplitude Modulation
QPCH Quick Paging CHannel
RLC Radio Link Control
RRC Radio Resource Control
RS Reference Symbol
RSRP Reference Signal Received Power
RTC Real Time Clock
SIB System Information Block
TDD Time Division Duplexing
TD-SCDMA Time Division Synchronous CDMA
UE User Equipment
UL UpLink
UpPTS Uplink Pilot Time Slot Unless stated otherwise, it can be assumed that all information given in this document applies to E-UTRA FDD (but not necessarily to E-UTRA TDD, especially at the physical layer).

E-UTRA Downlink Overview
E-UTRA Downlink Frame Structure

Figure 4:
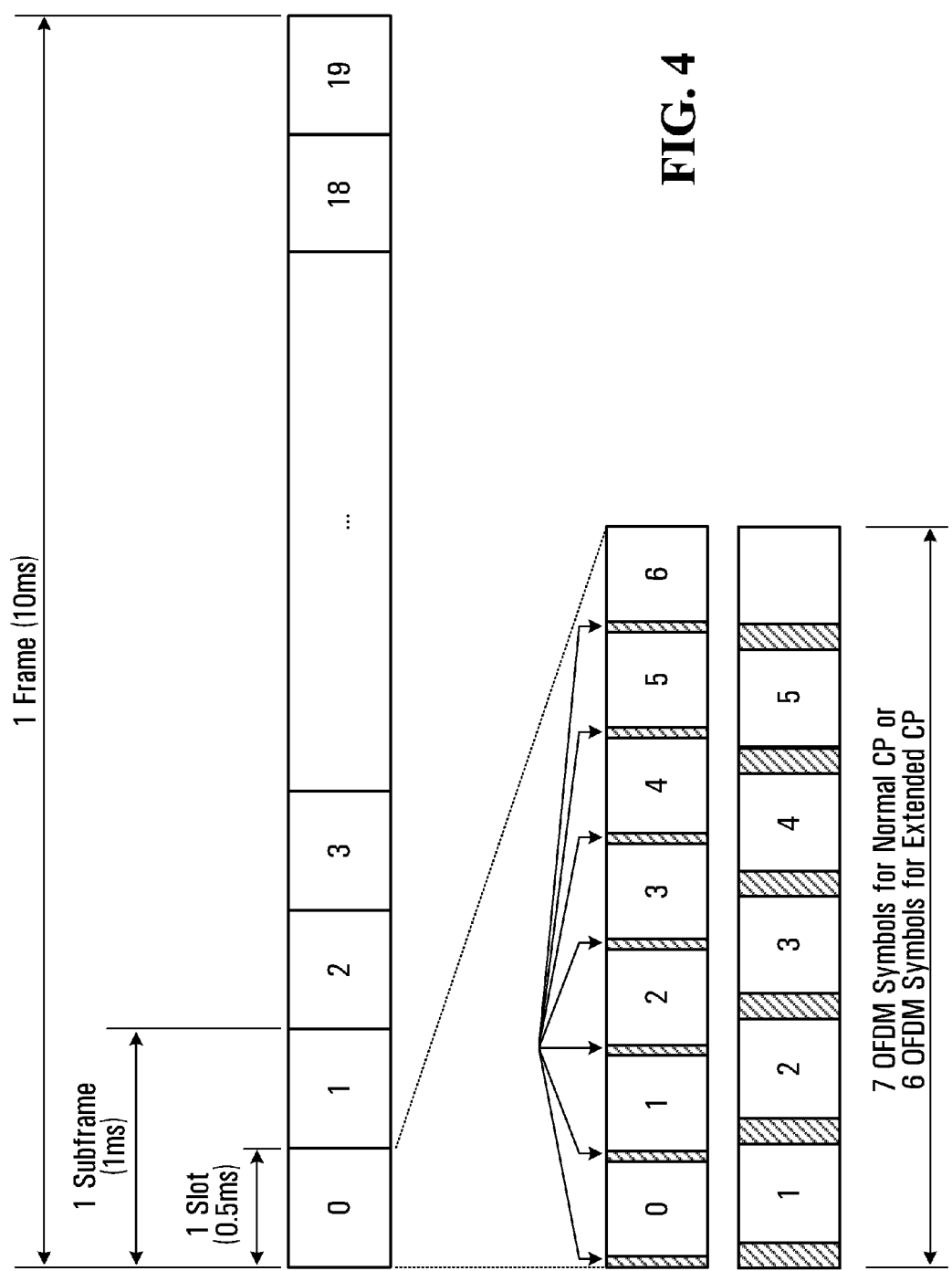
FIG. 4 is an illustration of downlink PHY frame structure in FDD mode.

The E-UTRA DL PHY frame structure is shown in FIG. 4 in FDD mode.

In the E-UTRA DL PHY frame structure shown in FIG. 4, the frame structure has the following characteristics.

Each frame is 10 ms long.

Within each frame, there are 10 equal-length subframes with two slots in each subframe.

Within each slot, there are 7 OFDM symbols with the normal CP case or 6 OFDM symbols with the extended CP case.

Normal CP: the cyclic prefix length in OFDM symbol 1 is different from that in other 6 OFDM symbols. Specifically, the CP length in OFDM symbol $1=160T_s\approx5.21$ us, where $T_s=1/(2048*15\text{ kHz})$. The CP length in each of the remaining 6 OFDM symbols$=144T_s\approx4.69$ us.

The OFDM symbol interval (excluding CP duration)$=2048T_s=66.67$ us.

Extended CP: the cyclic prefix length is longer than that in the normal CP case and the length is the same for all OFDM symbols$=512T_s=16.67$ us. The OFDM symbol length (not including the cyclic prefix) does not change and it is equal to 66.67 us.

With the sampling interval $T_s$, the sampling rate is 30.72 MSps.

Figure 5:
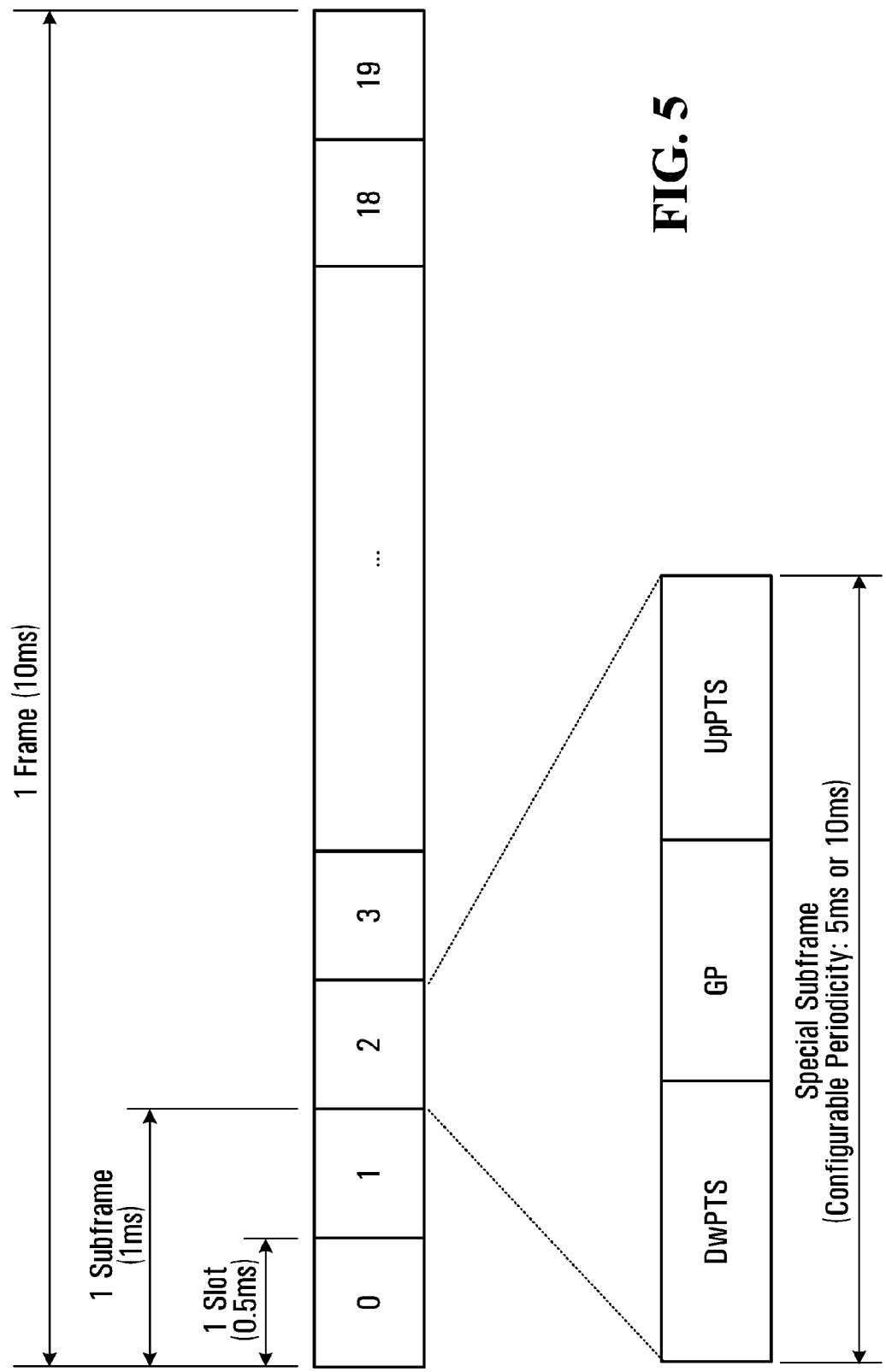
FIG. 5 is an illustration of downlink PHY frame structure in TDD mode.

The frame structure in TDD mode is shown in FIG. 5, which is almost the same as that in FDD mode except that special subframes are specifically defined for the backward compatibility of TD-SCDMA [10]. This special subframe has three fields: DwPTS, GP, and UpPTS, where DwPTS is for the downlink pilot time slot and it can be used for downlink transmission, GP is the guard period for the transmission switching between the downlink and the uplink, and UpPTS is the uplink pilot time slot and it can be used for uplink random access and/or transmission of sounding reference symbols. The length of each field is configurable. The transmission of the special subframe can be with a 5 ms or 10 ms periodicity. Details can be found in TS36.211 [2] and are omitted here.

All non-special subframes in TDD are designated for either DL or UL transmission. In particular, subframes 0 and 5 are always reserved for downlink transmission as those two subframes need to carry the sync signal for cell identification. Subframes immediately following the special subframes are always reserved for uplink transmission. Again, details can be found in TS36.211 [2] and are omitted here.

From the paging perspective, it should be noted that not all subframes can be used as paging occasions.

For FDD mode, the only subframes that can be used for paging are subframes 0, 4, 5, 9. Note that E-UTRA sync signals for cell identification are transmitted in subframes 0 and 5 only.

For TDD mode, the only subframes that can be used for paging are subframes 0, 1, 5, 6. Note that subframe 1 is always a special subframe while subframe 6 is also a special subframe if the special subframe periodicity is set to 5 ms.

A more detailed description of paging occasions is provided later in the section entitled "Paging Cycle and Paging Occasions".

DL Resource Block (RB) and Resource Elements (RE)

Figure 6:
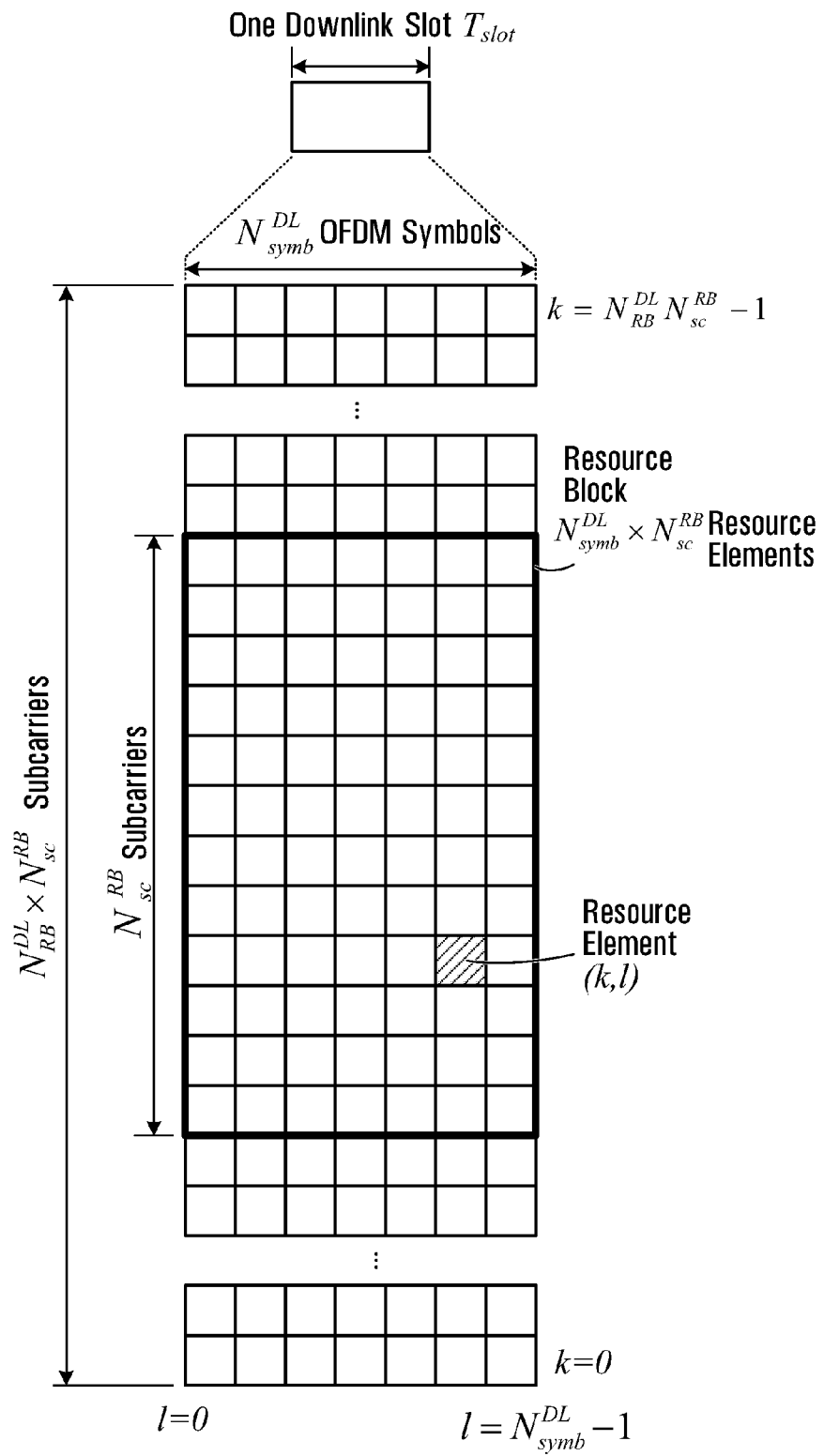
FIG. 6 is an example of a downlink resource grid/space.

A DL resource grid is a unit of PHY resource used to carry the transmitted signal in the DL. There are terms of resource block (RB) and resource elements (RE). Their relation with the DL slot is illustrated in FIG. 6, where:

k: The subcarrier index ranging from subcarrier 0 to $N_{RB}^{DL} N_{SC}^{RB} - 1$.

l: The OFDM symbol index ranging from symbol 0 to $N_{sym}^{DL} - 1$.

$N_{RB}^{DL}$: The number of RBs configured for the DL. For E-UTRA, n=6, 15, 25, 50, 75, 100 for channel bandwidth=1.4, 3, 5, 10, 15, 20 MHz, respectively.

$N_{SC}^{RB}$: The number of subcarriers per RB. For E-UTRA, $N_{SC}^{RB} = 12$.

$N_{sym}^{DL}$: The number of OFDM symbols configured for the DL slot. For E-UTRA, $N_{sym}^{DL} = 7$ with the normal CP case and $N_{sym}^{DL} = 6$ with the extended CP case.

DL PHY Processing

Figure 7:
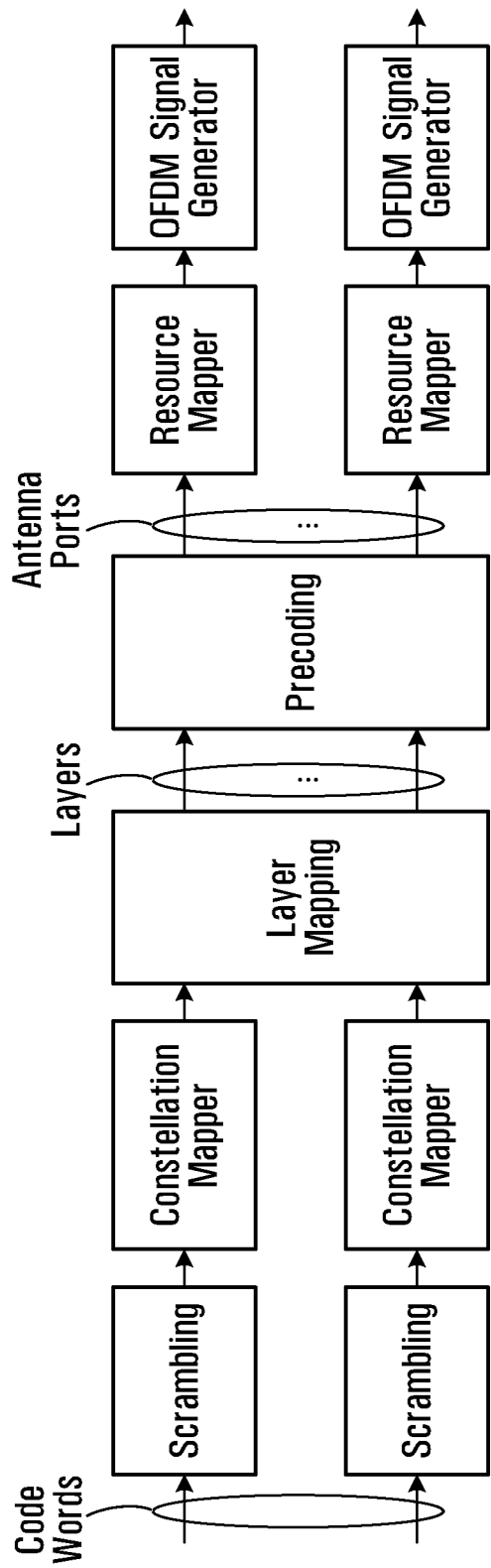
FIG. 7 is a block diagram of downlink PHY processing.

The processing chain involved in DL PHY processing is illustrated in FIG. 7, where:

Scrambling: to pseudo-randomly scramble the incoming channel encoded bits (for the purpose of having a zero mean on the outgoing transmitted bits).

Constellation mapper: to map the input bits to QAM symbols (QPSK, 16QAM, or 64QAM). The average power of each symbol is normalized to 1 (digital power).

Layer mapping: to map the QAM symbols to layers (as part of MIMO processing).

Precoding: to map the layer-mapped symbols to antenna ports (as part of MIMO processing).

Resource mapper: to map the precoded symbols to the resource elements. Each resource element is an element in a time frequency grid occupying one OFDM symbol interval ($2048 T_s$ long with $T_s = 1/(2048*15 \text{ kHz})$) and 15 kHz subcarrier spacing. For DL, the DC subcarrier is not used and has zero energy. Also, some band-edge subcarriers are not used for normal data transmission because of emission control purposes. The resource mapped symbols are passed to the next block on an OFDM symbol by OFDM symbol basis. For a 20 MHz channel bandwidth, each OFDM symbol has 2048 resource mapped symbols.

OFDM signal generator: to convert the input resource mapped symbols (in frequency domain conceptually) to time domain samples and prepend a cyclic prefix for each conversion. The conversion is done by performing an IFFT on the input symbols. A fixed normalization factor is used to scale the output digital power. After the conversion, a subset of the end samples is prepended to the IFFT output to form a cyclic prefix section (to combat the effects of dispersive channels).

Physical Layer DL Channels/Signals

The following physical layer DL channels/signals may be supported (TS36.211[2]).

Physical Downlink Shared Channel, PDSCH.
Physical Broadcast Channel, PBCH.
Physical Multicast Channel, PMCH.
Physical Control Format Indicator Channel, PCFICH. This indicates the number of OFDM symbols used for the PDCCH.
Physical Downlink Control Channel, PDCCH.
Physical Hybrid ARQ Indicator Channel, PHICH.
Reference signal (RS).
Synchronization signal: primary sync signal (PSS) and secondary sync signal (SSS).

The above DL channels/signals may be mapped to different resource elements. To be specific, the mapping may be as follows:

PDSCH can use the resource blocks and/or resource elements not occupied by other channels/signals. Different UEs will be allocated different RBs. It is possible that within one subframe one UE is scheduled to use as many as all of the RBs or as few as just one RB.

PDCCH is within the first 2-4 OFDM symbols for a 1.4 MHz system bandwidth, and within the first 1-3 OFDM symbols for other bandwidths. For MBSFN subframes, the maximum length of the PDCCH is 2 OFDM symbols.

PCFICH is within the first OFDM symbol of each subframe.

PHICH is within the first 1-3 OFDM symbols, depending upon the PHICH configuration.

PBCH occupies a portion of the first 4 OFDM symbols of slot 1 (see FIG. 3 and FIG. 4 for slot numbering).

RSs are scattered in time/frequency grids.

PSS and SSS are constrained within (62+1)*15 kHz=945 kHz around the DC subcarrier (the +1 term accounts for the DC subcarrier) and are transmitted in one OFDM symbol every 5 ms.

E-UTRA Paging Channel

Paging allows an eNB to broadcast notifications to all UEs within a cell. Such notifications include:

Instructing a specific UE to move from RRC_IDLE to RRC_CONNECTED state so that the UE can receive traffic (Section 5.3.2 of TS36.331 [6]).

Informing ETWS-capable UEs of a warning message that should be acquired (Section 5.2.1.4 of TS36.331 [6]).

Informing UEs of a pending change to the broadcast system information (e.g. Sections 6.1 of TS36.304 [7] and 5.2.1.3 of TS36.331 [6]).

DL Channel Overview

Figure 9:
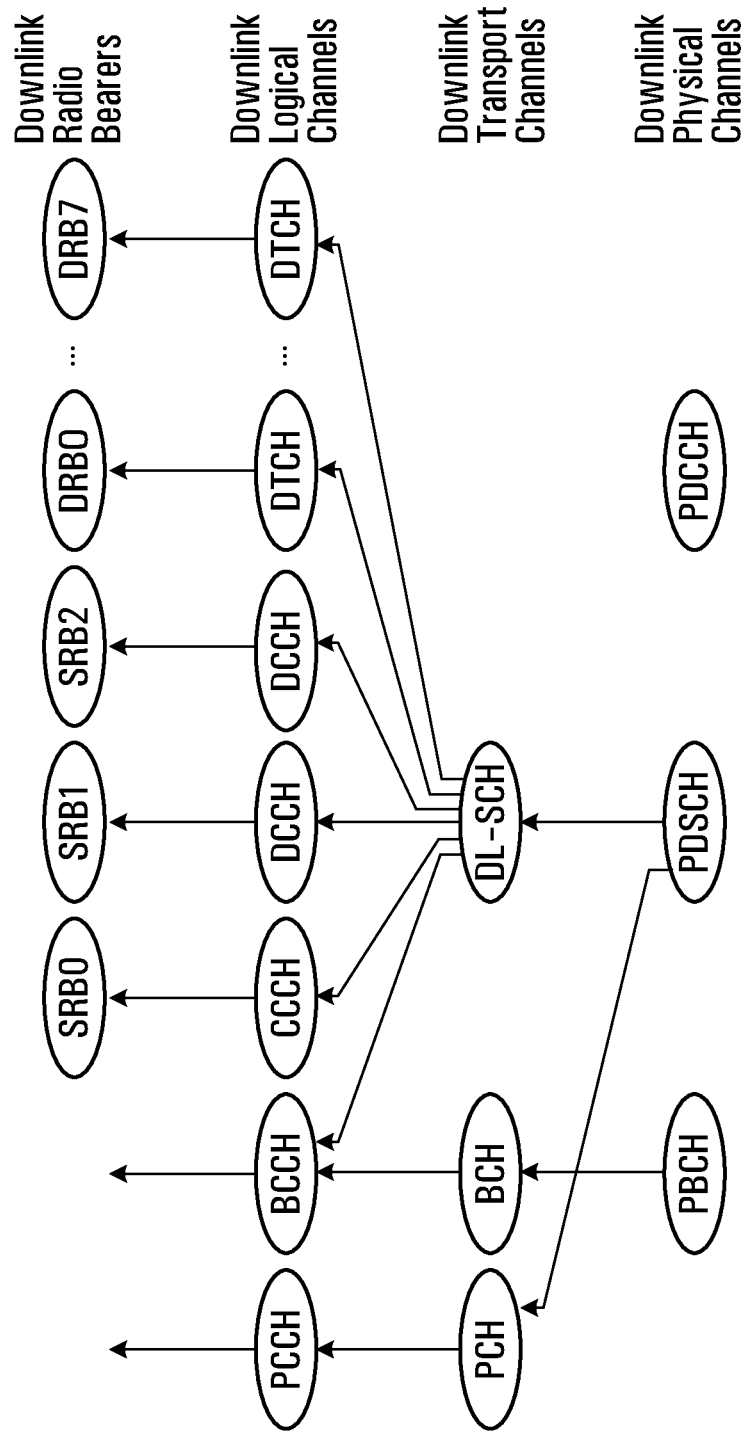
FIG. 9 is an illustration of downlink channel mappings.

FIG. 9 (adapted from FIGS. 5.3.1-1 and 6.1.3.1-2 of TS36.300) shows the various channel mappings for the E-UTRA (E-UTRA Release 8) downlink from the perspective of the UE receiver. Here, we focus only on the channels that are relevant to paging.

The PDCCH (Physical Downlink Control CHannel) carries control information to the physical layer describing how the traffic on the PDSCH (Physical Downlink Shared CHannel) should be demapped and decoded. As shown in the diagram, all other traffic is carried over the PDSCH (except for a small amount of broadcast system information that is carried on the PBCH (Physical Broadcast CHannel)). At the transport channel level, the appropriate PDSCH traffic may be demapped to paging traffic via the PCH (Paging CHannel) transport channel, which in turn maps to the PCCH (Paging Control CHannel) logical channel. Note that the PCCH is a unidirectional broadcast channel and is not associated with a specific Signalling Radio Bearer (SRB). Instead, any messages received on the PCCH can be sent directly to RRC for further processing.

Paging Cycle & Paging Occasions

Figure 10:
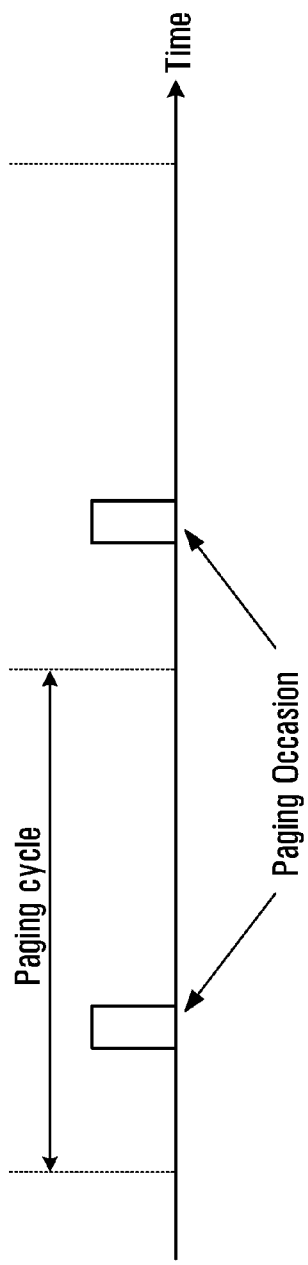
FIG. 10 is a plot of a paging cycle and paging occasions.

FIG. 10 illustrates the concept of the paging cycle and a specific paging occasion for a UE.

The default paging cycle length is set in a broadcast Radio Resource Control (RRC) information element. Valid values for the default paging cycle length are: 32, 64, 128, and 256 radio frames (one radio frame is 10 ms in length and contains ten subframes).

Within a given paging cycle, a given UE will have exactly one paging occasion. This paging occasion corresponds to one subframe where the UE must monitor the PDCCH with the P-RNTI (Paging Radio Network Temporary Identifier) in order to search for any paging messages that have been transmitted by the eNB. A UE's paging occasion always occurs at the same relative location within the paging cycle, but different UEs may have different paging occasion locations within the paging cycle. There is little point for a UE to search for paging messages outside of its own paging occasion, since the eNB will only page a specific UE within the paging occasion corresponding to that UE. It is possible that multiple UEs share the same paging occasion and could therefore be considered to belong to the same paging group.

Section 7.1 of TS36.304 [7] describes the process by which a UE can determine its paging occasion location. T corresponds to the default paging cycle length. The other parameter that is set by PCCH-Configuration is termed nB and is used to derive the number of paging groups. Valid values for nB are: 4T, 2T, T, T/2, T/4, T/8, T/16, and T/32.

Other parameters that are used when calculating the paging occasion location include the following.

N=min(T, nB)
Ns=max(1, nB/T)
UE_ID=IMSI mod 1024

Possible values for Ns are 1, 2 and 4. If a UE does not have an IMSI (e.g. when making an emergency call without a USIM (Universal Subscriber Identity Module)), then it should use the default identity UE_ID=0. The IMSI is given as a sequence of decimal digits (i.e. each digit in the range from 0 to 9) that shall be interpreted directly as a decimal number rather than as representing a hexadecimal number.

The Paging Frame (PF) that contains a UE's paging occasion can be determined as radio frames that satisfy the following equality.

$$SFN \bmod T = (T \text{ div } N)*(UE\_ID \bmod N)$$

where SFN is the System Frame Number of a radio frame, and T, N, and UE_ID are as defined further above.

The index value i_s is then used to determine the specific subframe within the paging frame that represents the UE's paging occasion.

$$i\_s = \text{floor}(UE\_ID/N) \bmod Ns$$

This index is then used to select a specific subframe according to Table 1 for an FDD system (taken from Section 7.2 of TS36.304 [7]). This subframe represents the UE's paging occasion.

TABLE 1

Subframe patterns for paging occasions in an FDD system

| | Paging Occasion subframe index | | | |
|---|---|---|---|---|
| Ns | i_s = 0 | i_s = 1 | i_s = 2 | i_s = 3 |
| 1 | 9 | n/a | n/a | n/a |
| 2 | 4 | 9 | n/a | n/a |
| 4 | 0 | 4 | 5 | 9 |

Depending upon the configured value of Ns for a particular cell, paging may occur in 1, 2 or 4 subframes of each 10 ms radio frame.

Table 2 shows the subframe patterns for paging occasions in a TDD system (taken from Section 7.2 of TS36.304 [7]). This subframe represents the UE's paging occasion.

TABLE 2

Subframe patterns for paging occasions in a TDD system

| | Paging Occasion subframe index | | | |
|---|---|---|---|---|
| Ns | i_s = 0 | i_s = 1 | i_s = 2 | i_s = 3 |
| 1 | 0 | n/a | n/a | n/a |
| 2 | 0 | 5 | n/a | n/a |
| 4 | 0 | 1 | 5 | 6 |

Figure 11:
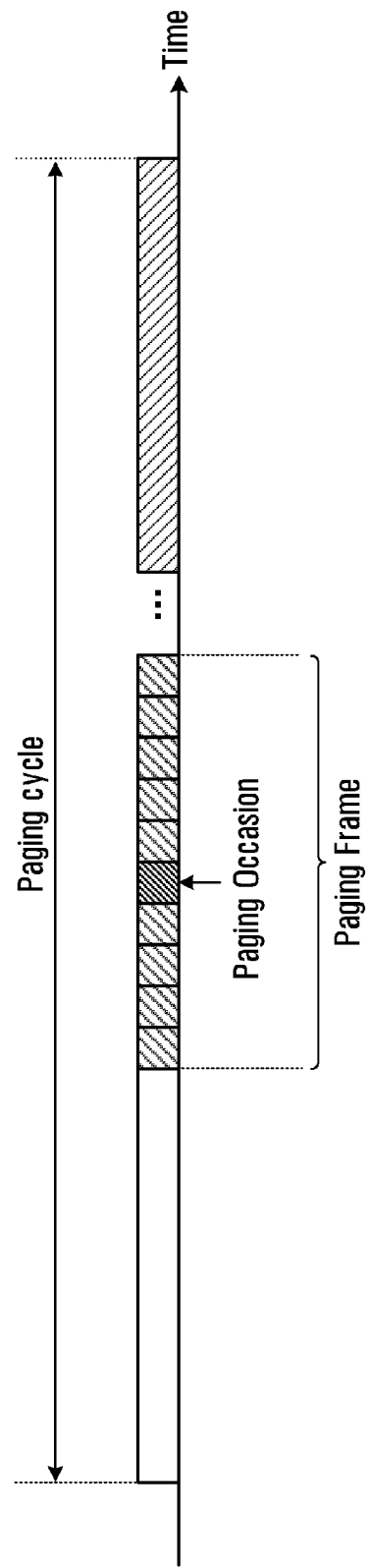
FIG. 11 is a plot showing the paging occasion for a UE.

FIG. 11 shows an example paging occasion for a UE within the paging cycle. Here, the UE's paging occasion corresponds to subframe 4 of the second radio frame of the paging cycle.

Paging Message Processing

Please note the following for paging message processing.

When to search: RRC is responsible for instructing the PHY when (i.e. within which subframes) to search for paging signals.

PDCCH detection: Paging messages can be identified by searching within the common search space of the PDCCH for DCI 1C and 1A allocations whose CRCs have been scrambled with the P-RNTI (Table 7.1-2 of TS36.213 [4]).

Determine HARQ redundancy version: No HARQ retransmissions are performed on paging traffic. If a DCI 1C addressed to the P-RNTI is observed, the corresponding redundancy version to be assumed for decoding purposes shall be 0 (Section 7.1.7.3 of TS36.213 [4]). Note that DCI 1C does not explicitly signal HARQ redundancy version information. DCI 1A explicitly signals HARQ redundancy version information and the redundancy version for paging would be expected to be set to 0 all the time (Again, no HARQ retransmissions of a paging message are performed).

Determine MIMO mode: Table 7.1-2 of TS36.213 [4] states that if the observed number of BCH antenna ports is one, then single antenna port, port 0 is used for the PDSCH transmission scheme of the PCH; otherwise, transmit diversity is used.

PDSCH demodulation: Paging messages are broadcast on the PCH (Paging CHannel) transport channel, which is mapped to the PDSCH. That means, PDSCH demodulation is needed to extract the data for the paging message.

Transport blocks corresponding to PCH transmissions use the transparent mode MAC and TM (Transparent Mode) RLC, so the received and decoded PCH transport block should arrive (via the PCCH (Paging Control CHannel) logical channel) at RRC unchanged (i.e. there are no MAC or RLC headers to remove). DL-HARQ (either combining or ACK/NACKing) is not applicable to the PCH.

The format of the RRC Paging message is described in Section 6.2.2 of TS36.331 [6] and is omitted here.

The procedure to follow by a UE receiving a Paging message is described in Section 5.3.2.3 of TS36.331 [6].

If a UE is in RRC_IDLE, the UE shall examine the paging record list. If any of the ue-Identity fields matches the values allocated by NAS, then ue-Identity and cn-Domain should be forwarded to NAS.

If the UE is in either RRC mode (RRC_IDLE or RRC_CONNECTED):

If the systemInfoModification flag is present, the system information shall be reacquired following the next modification period boundary.

If the UE is ETWS-capable and the etws-Indication flag is present, the necessary ETWS information shall immediately be acquired.

E-UTRA Paging Channel Demodulation

A summary on the demodulation of the E-UTRA paging channel is given here.

Paging Demodulation Processing Flow and Timeline

Figure 12:
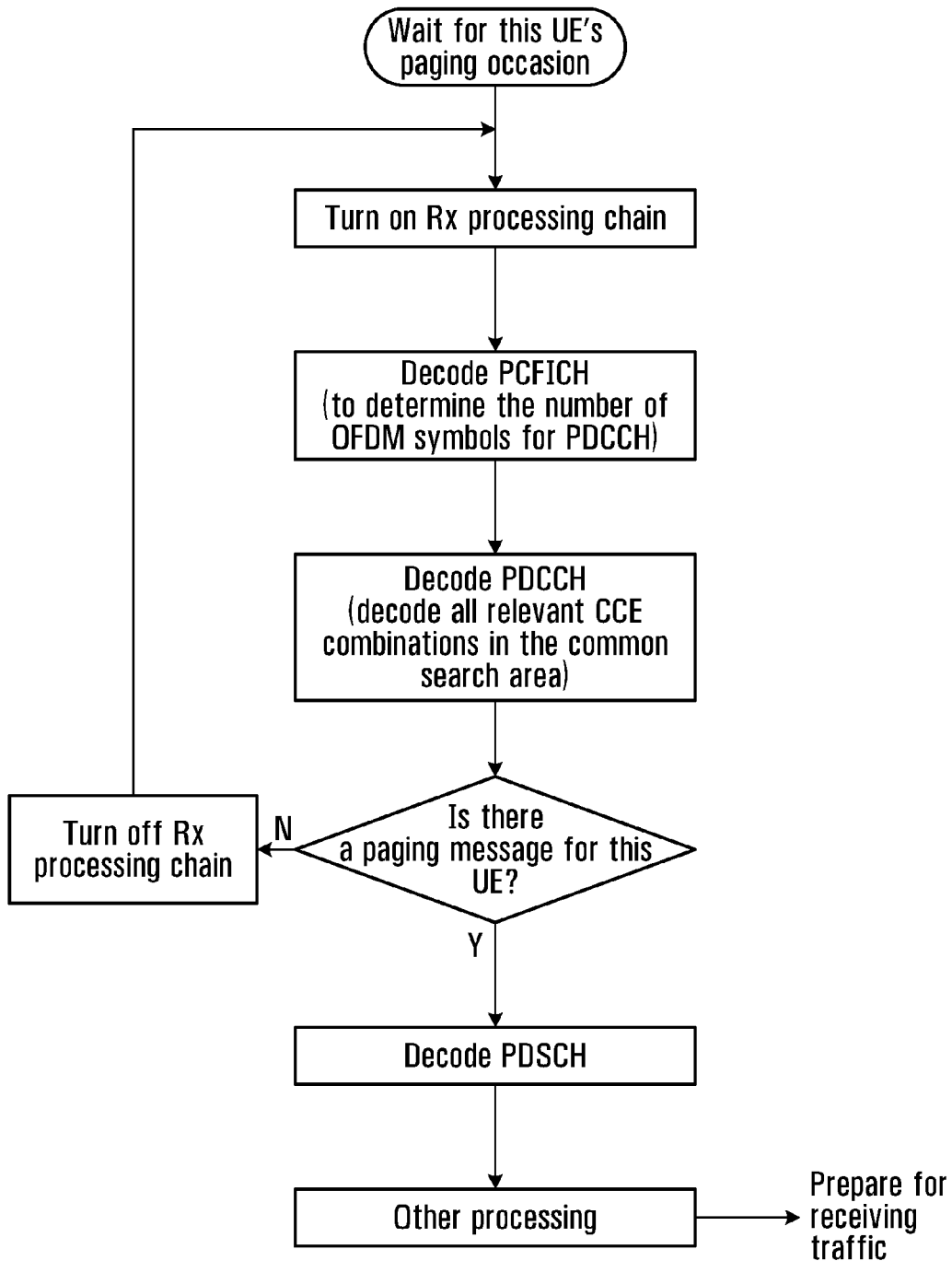
FIG. 12 is a flowchart of paging demodulation processing flow.
Figure 13:
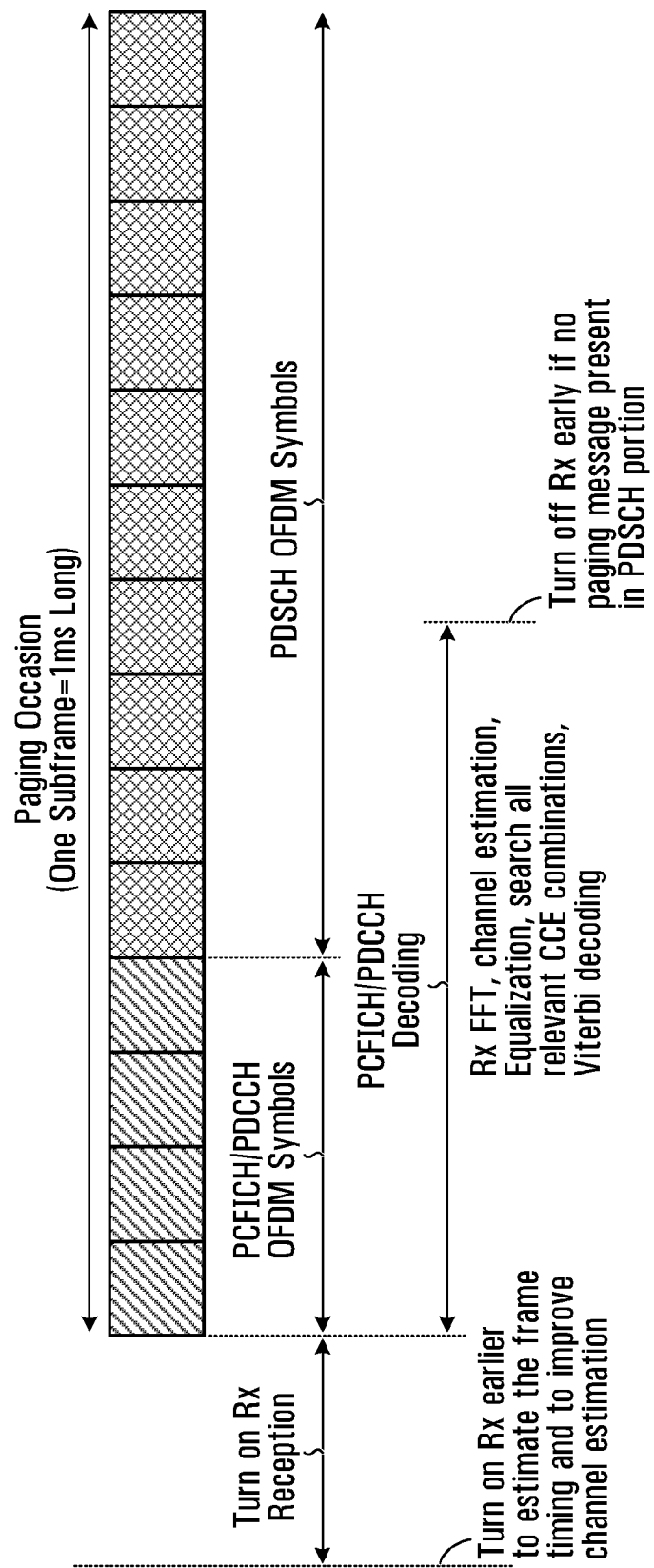
FIG. 13 is a plot of a paging demodulation processing timeline.

The paging demodulation processing flow is shown in FIG. 12 and an example of the processing timeline is shown in FIG. 13. In the example, for illustrative purposes, the number of OFDM symbols for PCFICH/PDCCH is set to four.

To demodulate the paging channel, UE does the following.

Turn on the Rx processing chain at the subframe corresponding to the paging occasion for this UE. UE might need to turn on the reception earlier to estimate the frame timing accurately and to improve the channel estimation.

Decode the PCFICH to know the number of OFDM symbols used to carry the PDCCH. Then, decode and search the PDCCH to check if there is any paging message for this paging occasion. The actual paging message contents are in the PDSCH portion of the same subframe.

To decode the PCFICH and PDCCH, Rx FFT processing needs to be done for each OFDM symbol to convert the time-domain samples to the frequency-domain resource elements. Also, the channel estimation, equalization, searching of all relevant control channel element (CCE) combinations, and blind decoding of each PDCCH candidate, are needed. A further description of PCFICH and PDCCH demodulation is provided in the following sections entitled "PCFICH Demodulation" and "PDCCH Demodulation".

Turn off the Rx processing chain if there is no paging message for this paging occasion or continue to process the PDSCH to obtain the actual paging message. Note that the Rx turning off cannot be done immediately following the PCFICH/PDCCH symbols due to the fact that UE might need a few OFDM-symbol intervals to decode PCFICH/PDCCH and to determine if there is a paging message. Meanwhile, the UE must continue buffering PDSCH samples in the event that the UE needs to extract a PCH transmission.

PCFICH Demodulation

Figure 14:
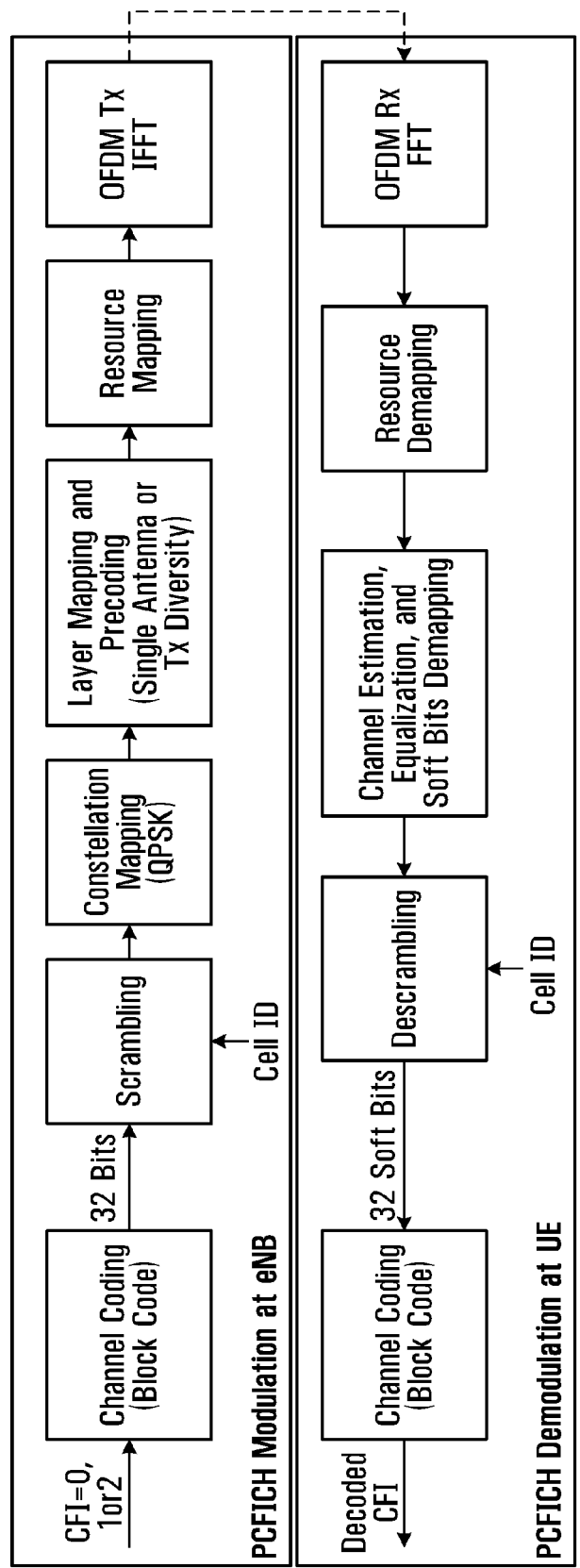
FIG. 14 is a block diagram of PCFICH modulation at eNB and PCFICH demodulation at UE.

A block diagram for the PCFICH demodulation at UE is shown in FIG. 14, where the PCFICH modulation at eNB is also plotted to show a complete PCFICH processing chain from transmitter to receiver.

As shown in FIG. 14, the PCFICH modulation at eNB needs to encode the input control format indicator (CFI), scramble the resulting encoded 32 bits based on the cell ID, constellation map the scrambled bits to QPSK, perform layer mapping and precoding depending on the number of Tx antennas, and finally map the resultant data to the resource elements and perform the OFDM Tx IFFT processing to convert the frequency-domain signal to the time-domain signal. Details on PCFICH modulation can be found in TS36.212 [3] and TS36.211 [2] and are omitted here.

Note that the control format indicator takes one of three possible values, i.e., 1, 2, or 3. The number of OFDM symbols used for PDCCH transmission is CFI for system bandwidth=3, 5, 10, 15, or 20 MHz and is CFI+1 for system bandwidth=1.4 MHz.

The PCFICH demodulation at UE is to perform a series of reverse processing of the PCFICH modulation at eNB and that reverse processing includes OFDM Rx FFT processing, resource demapping, channel estimation and equalization to compute the soft-bits, descrambling, and the final channel decoding for the decision on CFI.

Due to the block coding of 32 bits (=15 dB), PCFICH can provide up to 15 dB gain against the signal attenuation (for the cell coverage) and fading. (The gain is actually smaller than 15 dB due to the non-coherent detection to detect three possible CFI values.)

PDCCH Demodulation

Figure 15:
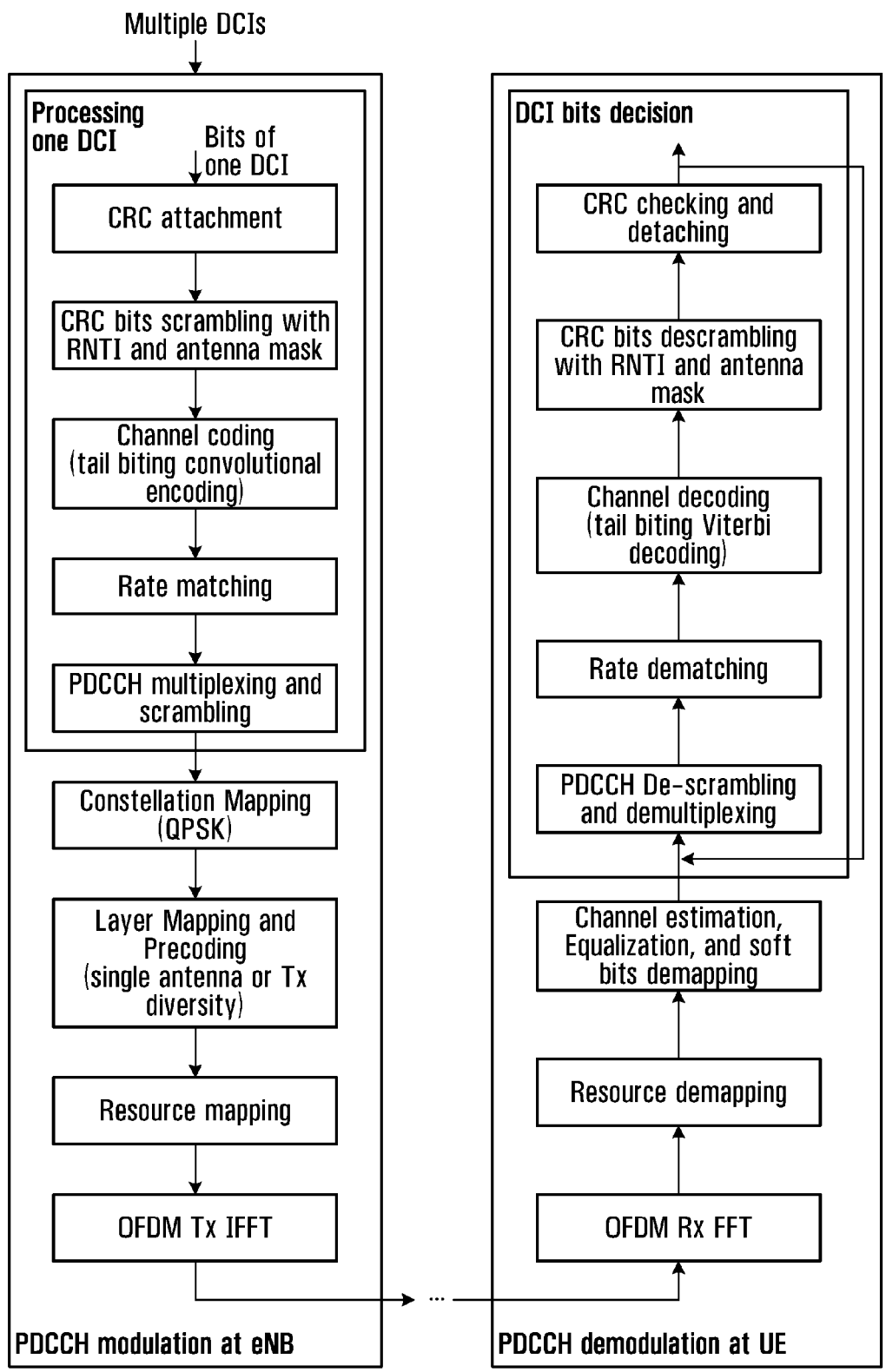
FIG. 15 is a block diagram of PDCCH modulation at eNB and PDCCH demodulation at UE.

A block diagram for the PDCCH demodulation at UE is shown in FIG. 15, where the PDCCH modulation at eNB is also plotted to show a complete PDCCH processing chain from transmitter to receiver.

As shown in FIG. 15, the PDCCH modulation at eNB needs to process multiple DCIs. For each DCI, based on the input information bearing DCI bits, eNB will attach CRC bits (scrambled based on RNTI and possibly an antenna mask), encode the concatenated information and CRC bits, perform rate matching to match the number of coded bits to the number of channel bits that can be accommodated by the physical channel, and multiplex and scramble the rate-matched bits. The resultant bits of each DCI will finally go through a common processing chain, i.e., QPSK constellation mapping, layer mapping and precoding, resource mapping, and OFDM Tx FFT processing to complete the whole PDCCH modulation. Details on PDCCH modulation can be found in TS36.212 [3] and TS36.211 [2] and are omitted here.

The PDCCH demodulation at a UE needs to perform the reverse processing to extract common (broadcast) DCIs and/or UE-specific DCIs. The processing comprises OFDM Rx FFT processing, resource demapping, channel estimation and equalization to compute the soft bits. For the DCI of interest, UE needs to perform demultiplexing, descrambling, rate-dematching, channel decoding, and the final CRC checking and CRC detaching in order to decode the DCI.

The search loop shown in the figure is for the blind detection. The reason is as follows.

UEs in the RRC_IDLE state need to check the common DCIs only. eNB may use DCI format 1A or 1C to encode the DCI bits. Therefore, UE may need to try decoding DCI 1A and 1C blindly. In each case, a pass of CRC check indicates a successful blind detection.

On a per subframe basis, UEs in the RRC_CONNECTED state generally need to check only the UE-specific DCIs. The location of a UE-specific DCI may be determined by the assigned RNTI, although a UE-specific DCI may also be located in the common search space of the PDCCH. However, the location also depends on the number of control channel elements (CCE) used by the eNB. A CCE can be regarded as a group of resource elements for the control channel transmission. Several CCEs can be aggregated together to carry one DCI. The number of aggregation levels is from a finite set $\{1, 2, 4, 8\}$ but the aggregation level used for a particular DCI transmission is unknown to UEs. As a result, each UE needs to search the possible locations for a possible PDCCH detection and use the CRC check as a pass flag to determine if the detection attempt is successful.

Figure 16:
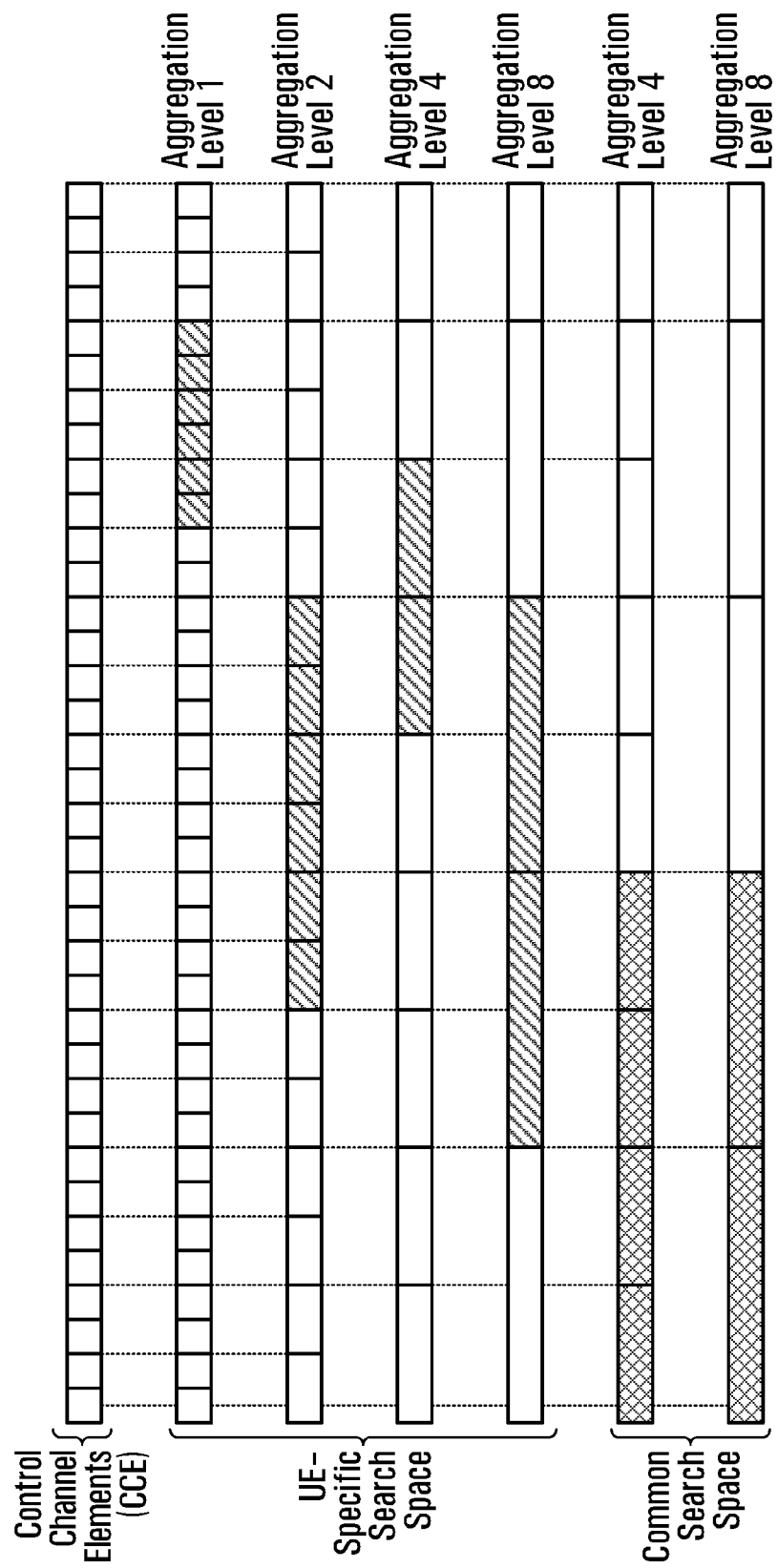
FIG. 16 is an example of UE search space and CCE aggregation levels.

For illustration purpose, we consider the set of the possible locations that each UE needs to search as a search space. FIG. 16 shows an example of UE search spaces and possible CCE aggregation levels. UEs in the RRC_IDLE state need to search only the common search space. The common search space will use aggregation level 4 or 8. In the figure, a total of 6 possible PDCCH candidate locations need to be checked in the common search space. UEs in the RRC_CONNECTED states need to search both the common search space and the UE-specific search space. The starting position of the UE-specific search space is determined by the assigned RNTI and the CCE aggregation level used at eNB, and the starting position of the UE-specific search space might be different for different aggregation levels as aforementioned and as illustrated in the figure.

Channel Estimation

Note that the aforementioned PDCCH demodulation is a coherent demodulation and it needs the channel estimation, which estimates the frequency domain channel coefficient for each resource element within the OFDM symbols of interest. Due to the availability of the cell-specific reference signal (RS), the channel estimation is generally done as follows.

Figure 8A:
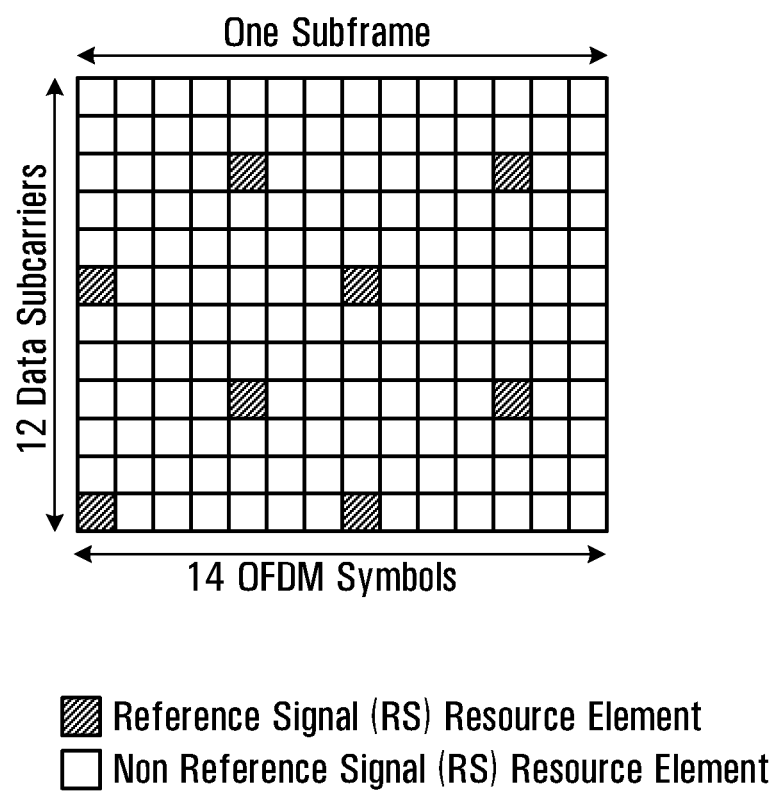
FIGS. 8A to 8C are illustrations of the locations of reference signals (RS) for various transmit antenna arrangements.
Figure 8B:
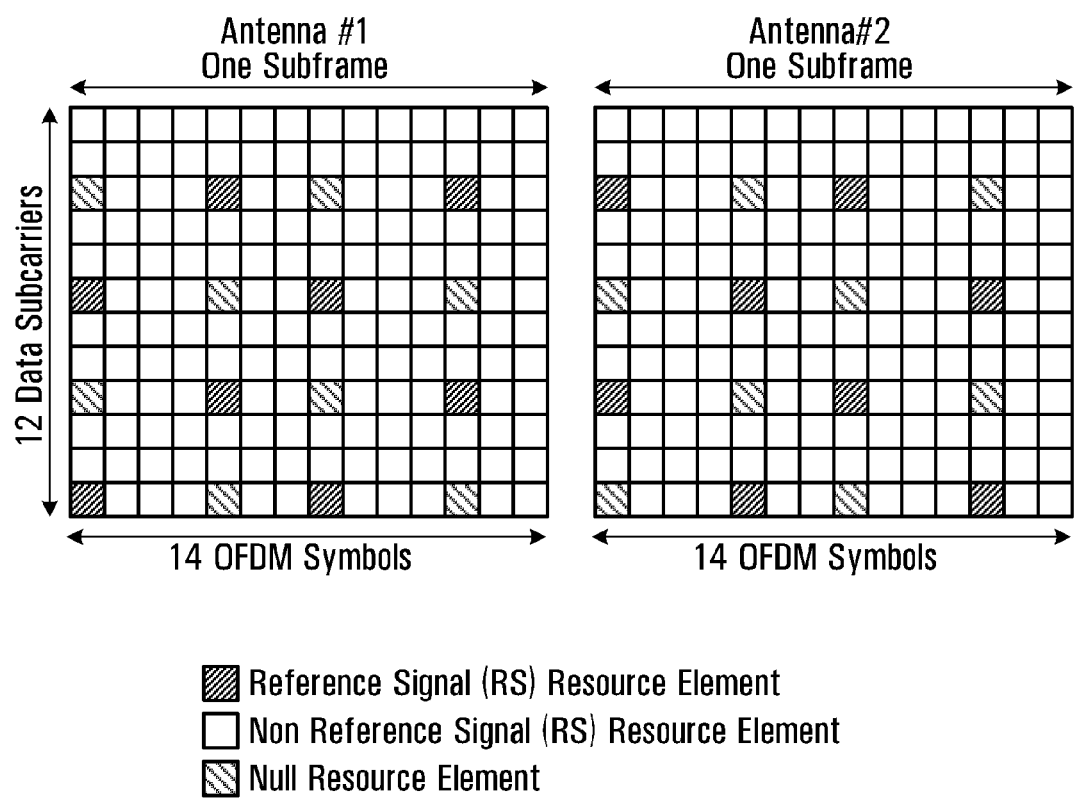
Figure 8C:
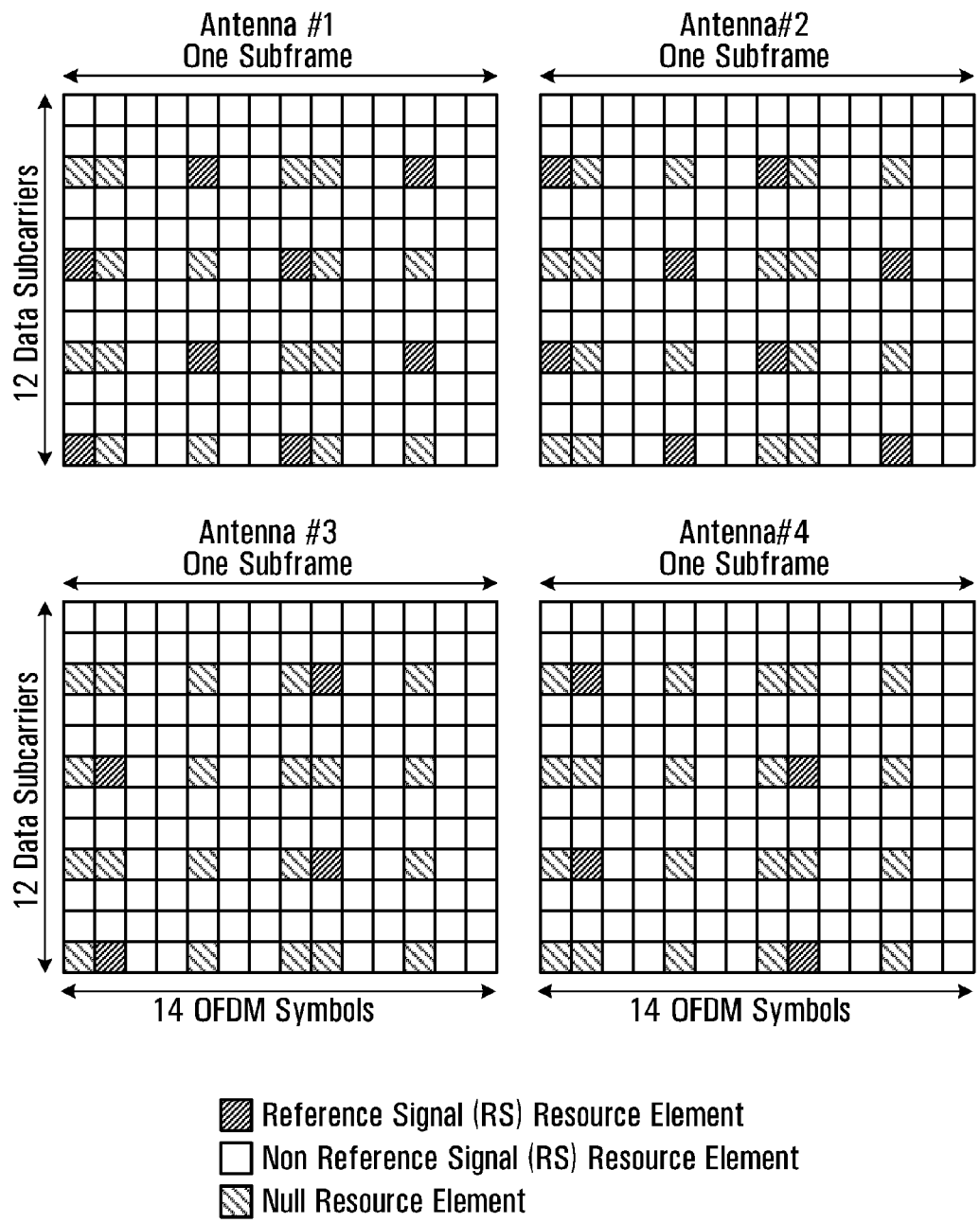

Detect the raw channel estimates at the RS locations within the given OFDM symbol. Please see FIGS. 8A, 8B and 8C for the RS locations.

Interpolate the channel coefficients at the non-RS locations. The interpolation could be a simple smoothing filtering or a more complex Wiener filtering.

The performance of the PDCCH demodulation depends on the quality of the channel estimation. To achieve a good quality, channel estimation might need to access the raw channel estimates in the previous OFDM symbols to make use of the slow time-varying nature of the channel and a good channel estimation algorithm can be very complex. The channel estimation involves some computation complexity in terms of processing and that results in energy consumption. The more complex the channel estimation is, the more energy consumption it results in.

Some of the problems associated with the current approach for the E-UTRA paging demodulation are described below.

PCFICH Demodulation Complexity

As mentioned in the section entitled "E-UTRA Paging Channel Demodulation", for E-UTRA paging channel demodulation, a PCFICH demodulation needs to be performed. The PCFICH demodulation as shown in FIG. 14 needs the OFDM Rx FFT processing, resource demapping, channel estimation and equalization to compute the soft bits, descrambling, and the final channel decoding for the decision on CFI. This requires a certain amount of processing in order just to figure out the number of OFDM symbols for the PDCCH demodulation. Note that PCFICH does not have any CRC attachment and consequently UE does not know if the detection of PCFICH is correct. In other words, even if the PCFICH detection is incorrect, UE still needs to perform PDCCH demodulation and decoding. An unfortunate fact is if the PCFICH detection is incorrect, it is essentially impossible to perform PDCCH detection correctly.

PDCCH Demodulation Complexity

The PDCCH demodulation as shown in FIG. 15 is even more complicated. Apart from the common processing as that in PCFICH demodulation, UE needs to perform a blind detection for all possible combinations of the aggregation level and the DCI format. For each combination, UE needs to perform demultiplexing, descrambling, rate-dematching, channel decoding, and the final CRC checking and CRC detaching. Note that the maximum number of combinations is 12 for UE to detect the presence of a paging message as UE needs to search six common search locations as indicated in FIG. 16 and for each search location, UE needs to try DCI formats 1A and 1C. The search stops as soon as one CRC check passes when there is a paging message for this UE. In other words, in the case where there is no paging message for this UE, this UE needs to try all 12 combinations. This is a significant amount of processing just to determine the presence or absence of a paging message for this UE.

Potentially Longer Rx on Time

The PCFICH/PDCCH demodulation also needs a fairly good channel estimation. To have a good channel estimation, UE Rx processing chain might need to be turned on earlier to capture extra cell-specific reference signals for the channel estimation. In addition, due to the aforementioned PCFICH/PDCCH demodulation complexity and thus the decoding latency, UE Rx processing chain needs to be maintained on until a decision on the presence of the paging message is made. These received samples need to be buffered for possible future use.

Many UEs may share the same paging occasion and may decode the same paging message and at the RRC level each UE will determine if that paging message is for this UE. This also adds to the paging detection latency, suggesting potentially longer Rx on time.

High Requirement on the Timing Accuracy

Since an idle mode UE sleeps for most of the time, and periodically wakes up for the scheduled paging occasions, to save battery energy, it is desirable to have UE wake up on time (not earlier nor later). In an implementation, the wake-up timing of a UE may be maintained by a low rate clock, sometimes referred to as the Real-Time Clock (RTC). To avoid missing the detection of the downlink signals, the wake-up time needs to be advanced by a sufficient amount to account for the RTC frequency inaccuracy. In addition, when a UE wakes up, the system clock (which usually operates at a higher frequency) needs a certain period of time to settle its frequency and amplitude. The time required to settle is sometimes referred to as warm-up time.

As mentioned earlier, the Rx FFT processing is needed for PCFICH & PDCCH. Due to the sensitivity of the Rx FFT processing to the time offset, UE needs to have an accurate timing in order to decode properly the PCFICH/PDCCH. Note that when UE is in an idle mode, UE's timing may be maintained by a very low rate clock and its timing may drift. Depending on the implementation, a certain amount of time may be needed to allow the receiver to lock its frequency to the network frequency (either analog or digitally) and realize the time synchronization. Alternatively a receiver may need to buffer a sufficient amount of signal samples and post-process them to realize accurate frequency and time synchronization. In the latter case, when the synchronization needs to rely on processing the E-UTRA PSS/SSS, and when the E-UTRA PSS/SSS do not occur at the same period of time as the paging occasion, the receiver need to be turned on for a longer period than the paging occasion duration.

In order to summarize the basic problem, a UE is expected to spend most of its time in the RRC_IDLE state, but still needs to monitor paging while in this state. Consequently, any achievable reduction in receiver processing that is related to paging messages should translate directly into reduced battery consumption and therefore longer standby times and intervals between charges.

For illustrative purposes, various examples for applying the early paging indicator concept of the present disclosure will now be described. It is to be understood that these are provided for illustrative purposes only and are not to be considered limiting.

Early Paging Indicator in E-UTRA

Some embodiments of the present disclosure provide an early paging indicator for E-UTRA to inform UE if it needs to decode the paging channel in the next upcoming paging occasion. The early paging indicator is generally designed for easy and reliable detection and to have good robustness against possible frequency and/or timing errors.

An Early Paging Indicator (EPI) occasion is an opportunity to transmit an EPI. For each existing paging occasion, the EPI occasion is ahead of the existing paging occasion. For the purpose of this description, the configuration parameter "timeOffsetEpi", measured in subframes, defines how far the EPI occasion is ahead of the existing paging occasion. Here, the configuration parameter "timeOffsetEpi" is configured by eNB and broadcast to UEs (one "timeOffsetEpi" per cell).

The setting of timeOffsetEpi mainly depends on the UE demodulation time of the EPI, which may vary from less than one ms to several ms, and this is determined by the physical structure of the EPI to be described in the next subsection.

Note that for any UEs whose paging message happens to arrive for transmission to the UE less than timeOffsetEpi subframes ahead of their designated normal paging occasions, the transmission of the paging message to the UE may have to be deferred to the next available paging occasion for delivery, since it will not be possible to signal an early paging indicator to the UE to inform the UE that it should decode the paging message. However, this should only happen in a small minority of cases since timeOffsetEpi will be much smaller than are typical paging cycle lengths.

Figure 17:
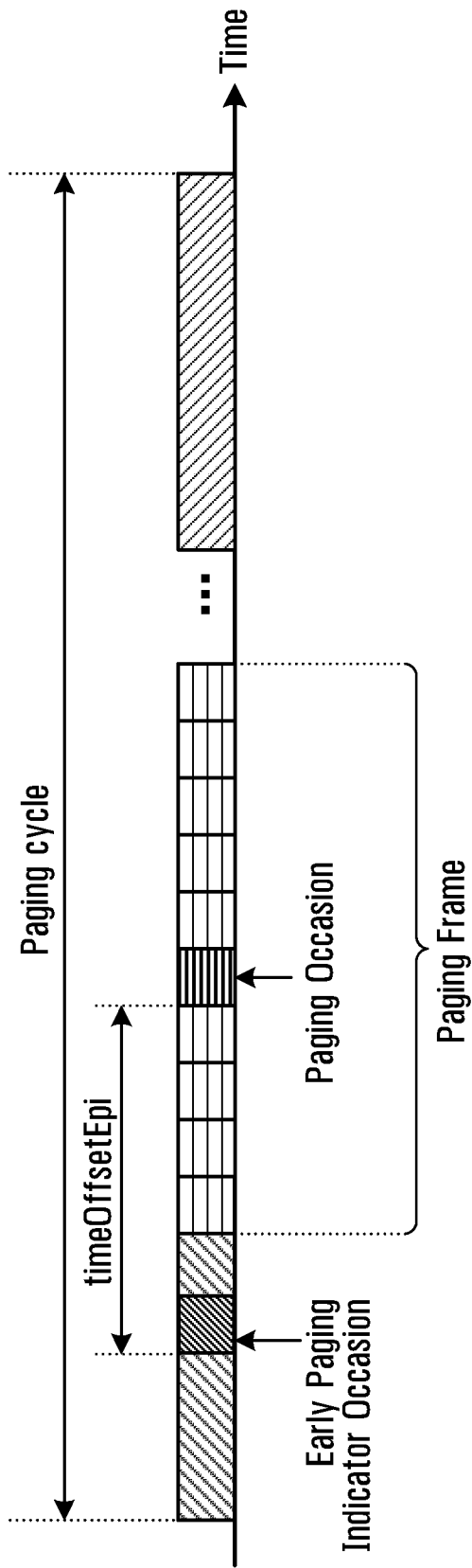
FIG. 17 is an example of early paging indicator occasion for a UE in accordance with an embodiment of the present disclosure.

Following the example paging occasion for a UE in FIG. 11, an example early paging indicator occasion will now be described with reference to FIG. 17.

In E-UTRA, each paging occasion can be considered to be associated with a paging group (i.e. a set of the UEs which expect to receive pages during the same paging occasion). Each UE knows which paging group it is in, and as such only needs to monitor the EPI associated with the paging group to which the UE belongs. This necessitates the UE waking up and decoding a paging message that is potentially for any UE of the same paging group.

In some embodiments, multiple early paging indicators are available for each early paging indicator occasion. A detailed example of this is provided below. These multiple early paging indicators are, in effect, transmitted in parallel, and can be independently detected. Each early paging indicator is associated with a respective subgroup of a paging group. Each UE knows the subgroup to which that UE belongs. The UEs of any subgroup still expect to receive their pages on the same paging occasion as any other UE in the paging group. However, a UE only need wake up and decode the paging message if there is an EPI associated with the subgroup to which that UE belongs.

A UE enabled with the early paging indicator feature will first determine its regular paging occasion from the relevant parameters (as described earlier in section entitled "Paging Cycle and Paging Occasions") and then determine its early paging indicator occasions based on knowledge of the offset timeOffsetEpi. The UE might, for example, update this information each time it changes cells. Next, the UE will check for an early paging indicator in each of its early paging indicator occasions. If a negative indicator is received or a positive indicator is not received, the UE can conclude that there is no relevant paging message in the next paging occasion and therefore the UE does not have to decode the PDCCH in that paging occasion subframe. Conversely, if a positive early paging indicator is detected or a negative indicator is not detected, the UE will conclude that there is a potentially relevant paging message in the next paging occasion for that UE and will therefore decode the PDCCH and perform the remainder of the PCH-related receiver processing in that paging occasion subframe. The procedure described in this paragraph is shown in flow chart form in FIG. 18A.

Figure 18A:
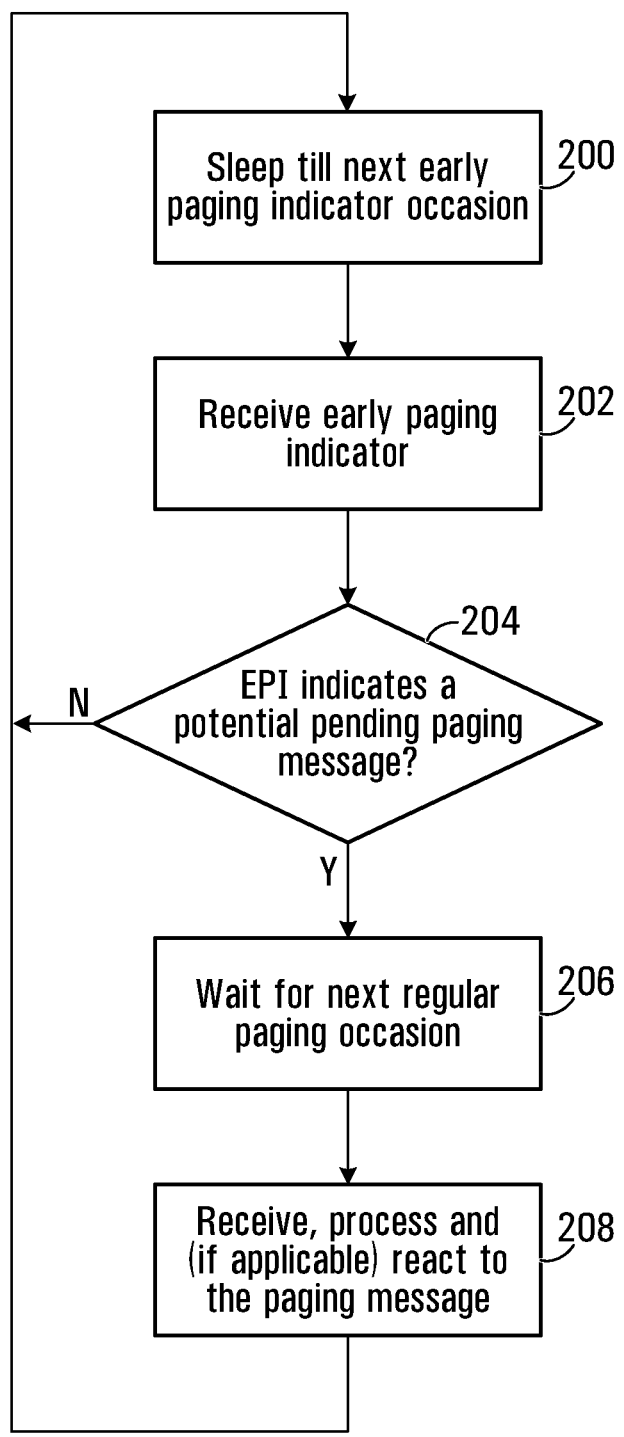
FIG. 18A is an example of a flowchart for receiving and using an EPI in accordance with an embodiment of the present disclosure.

The method illustrated in the flowchart of FIG. 18A begins at block 200, in which the mobile device is assumed to be in a reduced energy-consumption state, i.e. "sleeping", waiting for the next early paging indicator occasion. Once the next early paging indicator occasion occurs, the mobile device wakes up and monitors for an early paging indicator and it is assumed that the mobile device detects the contents of an early paging indicator at block 202.

If the detected early paging indicator content indicates that there will be a pending paging message at the upcoming paging occasion (Yes path at block 204), the method proceeds to block 206 and the mobile device waits for the next regular paging occasion. At block 208 the mobile device attempts to receive, process, and (if applicable) react to the paging message during the next regular paging occasion. Depending on the contents of the paging message, the mobile device may further enter a traffic mode for communication or return to the "sleep" state in block 200 until the next early paging indicator occasion.

If the detected early paging indicator content does not indicate that there will be a pending paging message at the upcoming paging occasion (No path at block 204), the method returns to block 200 and the mobile device is returned to the "sleep" state until the next early paging indicator occasion.

For legacy UEs, E-UTRAN will not arrange any early paging indicators for them. Those UEs will simply search for and receive paging messages in their usual paging occasion subframes according to the currently-defined method. The proposed early paging enhancement is therefore fully backward compatible.

A legacy eNB will, of course, not broadcast early paging indicators. In such a situation, a UE can determine this from the absence of early paging configuration parameters in the broadcast system information, and will receive paging messages using the currently-defined method for E-UTRA.

In the method illustrated in FIG. 18A, it is assumed that a positive EPI signal indicates that a pending paging message will be available at the next paging occasion. In an alternative embodiment, a positive EPI signal indicates the absence of a paging message at the next paging occasion. This has the advantage that if a particular UE is unable to receive the EPI or cannot receive the EPI with sufficient confidence (e.g. the UE is far away from the eNB), then the UE will automatically fail safe by falling back to the traditional method of searching for a paging message during the next paging occasion. A flowchart of an EPI reception procedure based on this alternative embodiment is shown in flowchart form in FIG. 18B.

Figure 18B:
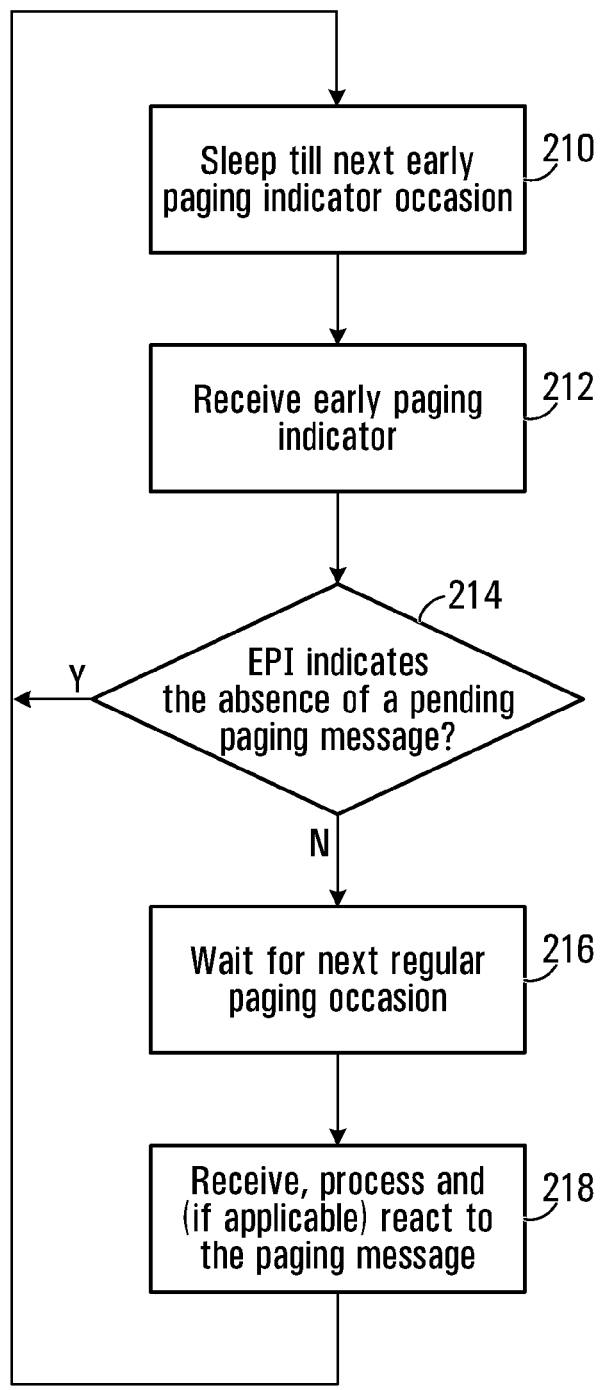
FIG. 18B is another example of a flowchart for receiving and using an EPI in accordance with an embodiment of the present disclosure.

The method illustrated in the flowchart of FIG. 18B begins at block 210, in which the mobile device is assumed to be in a reduced energy-consumption state, i.e. "sleeping", waiting for the next early paging indicator occasion. Once the next early paging indicator occasion occurs, the mobile device monitors for an early paging indicator and it is assumed that the mobile device receives an early paging indicator at block 212.

If the detected early paging indicator content indicates the absence of a pending paging message at the upcoming paging occasion (Yes path at block 214), the method returns to block 210 and the mobile device is returned to the "sleep" state until the next early paging indicator occasion.

If the result in detecting the early paging indicator fails to indicate that there is an absence of a pending paging message at the upcoming paging occasion, including an uncertain result in the detection (No path at block 214), the method proceeds to block 216 and the mobile device waits for the next regular paging occasion. At block 218 the mobile device attempts to receive the paging message during the next regular paging occasion. Depending on the content of the decoded paging message, the mobile device may proceed to a state for traffic communication or return to the "sleep" state in block 210 until the next early paging indicator occasion.

In this alternative approach (i.e. a positive EPI indicates the absence of a paging message), certain downlink transmission resources (e.g. one or more physical resource blocks that would otherwise be used for PDSCH transmissions) can be allocated for EPI transmissions. In the event that the cell suddenly becomes heavily loaded, some or all of those EPI resources can then be immediately taken back to be used for data transmission (on the PDSCH). UEs which normally receive an EPI signal on those re-designated resources would essentially see what appears to be random noise (rather than a phase-continuous tone signal, more detailed examples will be described herein later). This would result in a negative EPI indication, which would consequently cause the UEs to fall back to the existing method of paging reception. After the downlink traffic loading in the cell decreases, the eNB can restore the normal EPI transmissions on the designated EPI resources, and the EPI-enabled UEs will automatically go back to receiving the EPI indicator in the usual fashion. Note that this temporary auto-reconfiguration will occur automatically at the UEs and does not require any over-the-air signalling, but still results in robust paging operation for the UEs. It also allows the eNB to switch downlink resources between EPI signalling and data traffic transmission in a very flexible manner that allows for rapid adaptation to the current traffic load. In fact, this approach can allow the eNB to allocate even more downlink resources for EPI signalling than would otherwise be used in a fixed EPI configuration, since these resources can be easily re-allocated for data transmission as required. It also allows for some, rather than all, resources to be reallocated for data transmission and then to recover those resources after the network load decreases.

The above described automatic resource reallocation between EPI and data traffic without informing UEs may cause the UEs to decode both the EPI occasions and paging occasions during all paging cycles while data occupies the EPI resources, and thus increase the energy consumption of the UEs. To address this issue, alternatively at the first n paging occasions (n≥1) following the data-occupied EPI occasion, a paging message informs the affected UEs to stop monitoring the EPI occasions until further notice. After the EPI resources have been recovered, one or more paging messages to inform the affected UEs to resume monitoring the EPI occasions can be broadcast. This informed EPI-data resource reallocation is more suitable for scenarios with slow time-varying downlink loads, and the blind EPI-data resource reallocation is more suitable for scenarios with rapid time-varying downlink loads.

Early Paging Indicator Structure and Modulation

In some embodiments, the Early Paging Indicator is for an existing paging group of UEs or for a smaller EPI paging subgroup, depending on the number of early paging indicators per early paging indicator occasion. The number of early paging indicators depends on the physical layer structure of the Early Paging Indicator. In this section, the early paging indicator structure and modulation is described.

Early Paging Indicator Structure

Figure 19:
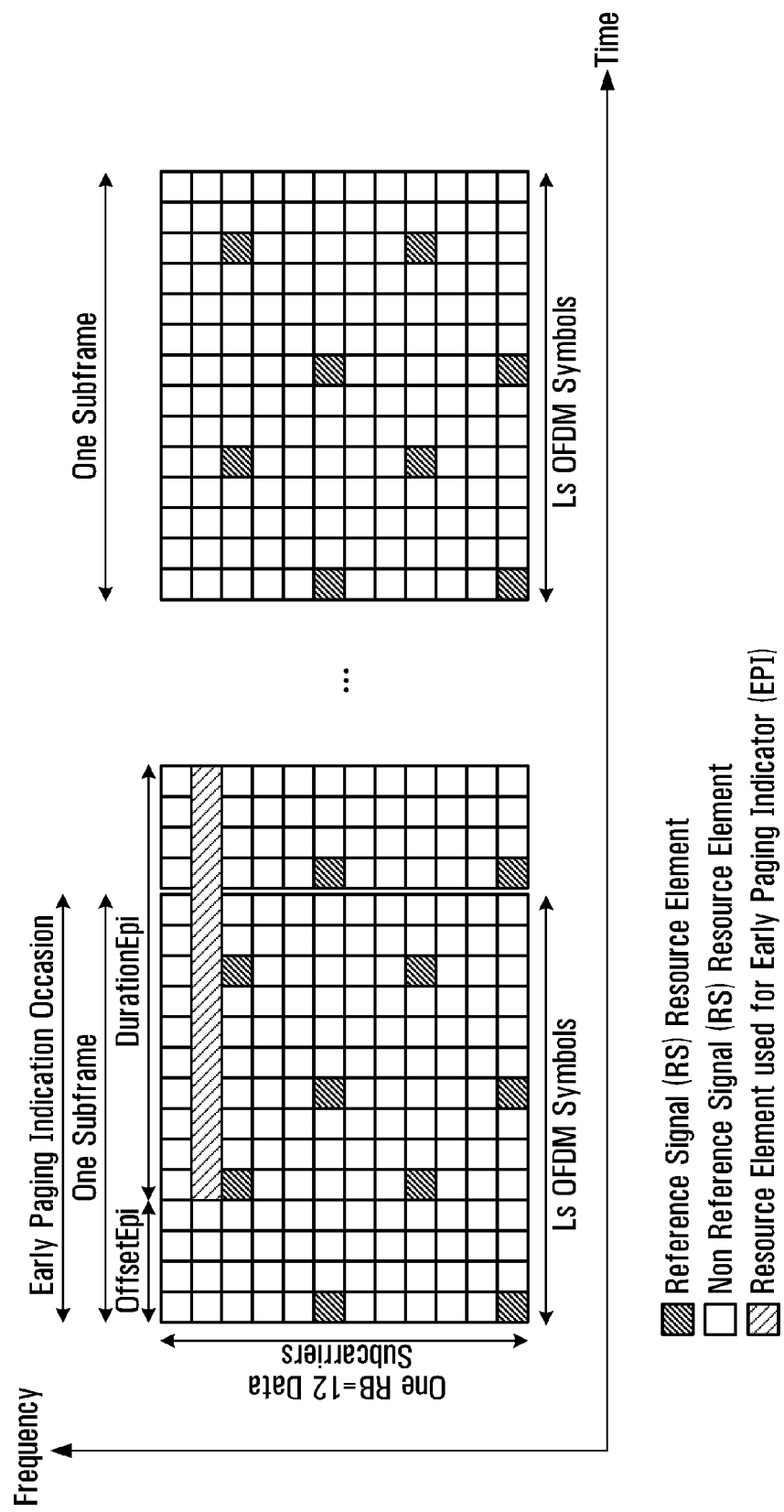
FIG. 19 is an illustration of resource element locations within a resource block for EPI transmission in accordance with an embodiment of the present disclosure.

The EPI structure is defined within the RBs assigned for the EPI and starting from the early paging indicator occasion. An EPI starts at "OffsetEpi" OFDM symbols from the start of an early paging indicator occasion and is "DurationEpi" OFDM symbols in length. In some embodiments, an EPI occupies one subcarrier frequency within one RB. An example EPI is shown in FIG. 19. In the figure, each subframe has Ls OFDM symbols, where Ls=14 or 12 depending on the cyclic prefix mode. Note that the EPI time-domain waveform comprises at least one phase-continuous tone over "DurationEpi" OFDM symbol intervals and at any given subcarrier offset $k_{o,EPI}$, an EPI waveform with tone index k=0 is orthogonal to other OFDM symbols and the tone spacing used for EPI transmission is not constrained to equal the regular OFDM subcarrier spacing; for example, the EPI waveform frequencies could be a fraction of the normal subcarrier spacing. In some embodiments, the duration of an EPI is allowed to exceed the subframe boundary provided that it does not collide in terms of using the same resource elements with an EPI transmission in another early paging indicator occasion. One may be concerned with the possible collision of an EPI transmission with the PDCCH symbols at the beginning of each subframe. However, as to be shown later, in some embodiments, band-edge RBs are allocated for the EPI transmission and the PDCCH transmissions are located only within the RBs in which the EPI is not transmitted.

Early Paging Indicator Modulation

Figure 20:
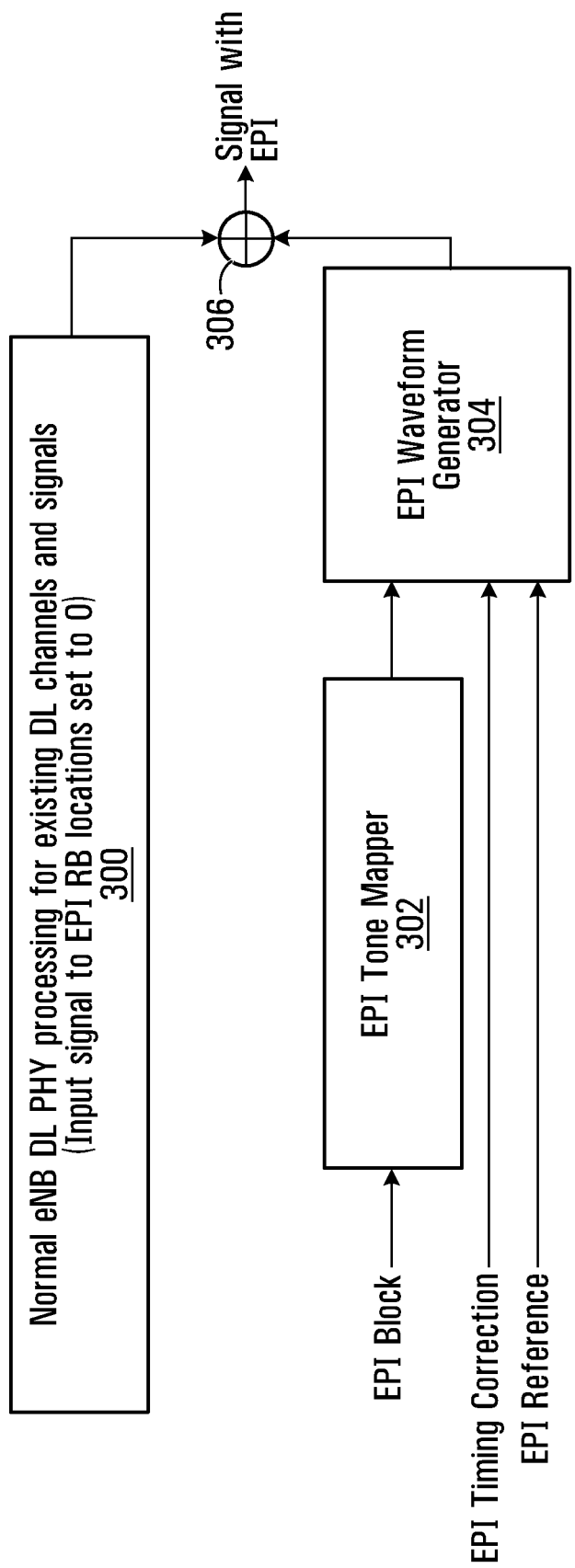
FIG. 20 is a block diagram of EPI modulation for the physical layer in accordance with an embodiment of the present disclosure.

An example of EPI modulation is shown in a block diagram in FIG. 20. The block diagram illustrated in FIG. 20 includes the following functional blocks: a normal eNB downlink PHY processing block 300 for existing downlink channels and signals, an EPI tone mapper block 302, an EPI waveform generator block 304 and a summing function 306. As shown in the embodiment illustrated in FIG. 20, the processing for an EPI modulation is as follows.

One or more RBs are allocated for the EPI transmission for one or multiple UEs. For RBs not used for the EPI transmission, the normal eNB DL PHY processing is performed in block 300. Details on the normal eNB DL PHY processing are described above with reference to FIG. 7.

An EPI data block, such as an array of symbols for on-off-keying (OOK) modulation, is mapped to EPI tone indexes by EPI tone mapper block 302. Some of the indexes may be mapped to "active" and some others may be mapped to "inactive" according to the value of the EPI data block.

The EPI waveform generation block 304 takes the mapped EPI tone indexes together with one EPI reference tone index and one EPI timing correction tone index and generates a time-domain waveform. In one embodiment, an active index corresponds to an active tone (to be transmitted), and an inactive index corresponds to an inactive tone (no corresponding tone to be transmitted). The individual tone waveform is desirable to be phase-continuous over "DurationEpi" OFDM symbols in duration. Note that the inequality DurationEpi≥M needs to be satisfied to make it possible to maintain the orthogonality when one subcarrier is subdivided into M phase-continuous tones for EPI transmission (The orthogonality is maintained for the EPI tones with k=0). Maintaining orthogonality to other subcarriers is usually desired.

In a mathematical form, the EPI waveform generation within one data subcarrier for the k-th EPI tone is given by equation (1) provided earlier.

Outputs of the normal eNB DL PHY processing block and EPI waveform generation block 304 are summed by summing function 306 to produce combined signals with EPI.

Figure 21:
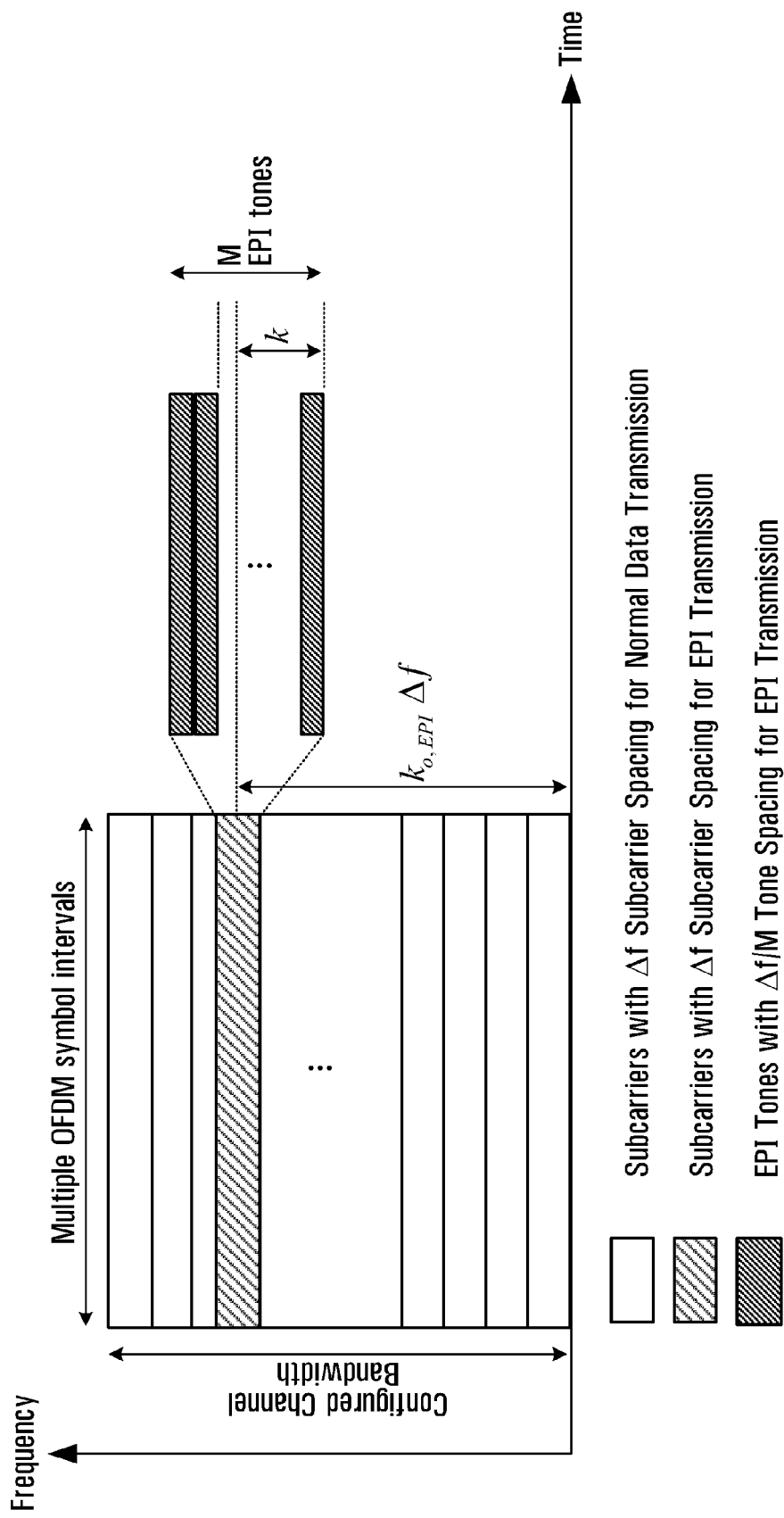
FIG. 21 is an illustration of EPI subcarrier offset and EPI tone index in accordance with an embodiment of the present disclosure.

An illustration of the EPI subcarrier offset $k_{o,EPI}$ and the EPI tone index k is shown in FIG. 21.

It is noteworthy to mention that there is no layer mapping and precoding in the EPI modulation. The EPI transmission will be on one Tx antenna, although it may also be possible to use a single virtual antenna that is virtualized from multiple physical antennas for EPI transmissions.

Special Band-Edge Subcarriers for EPI Transmission

Figure 22:
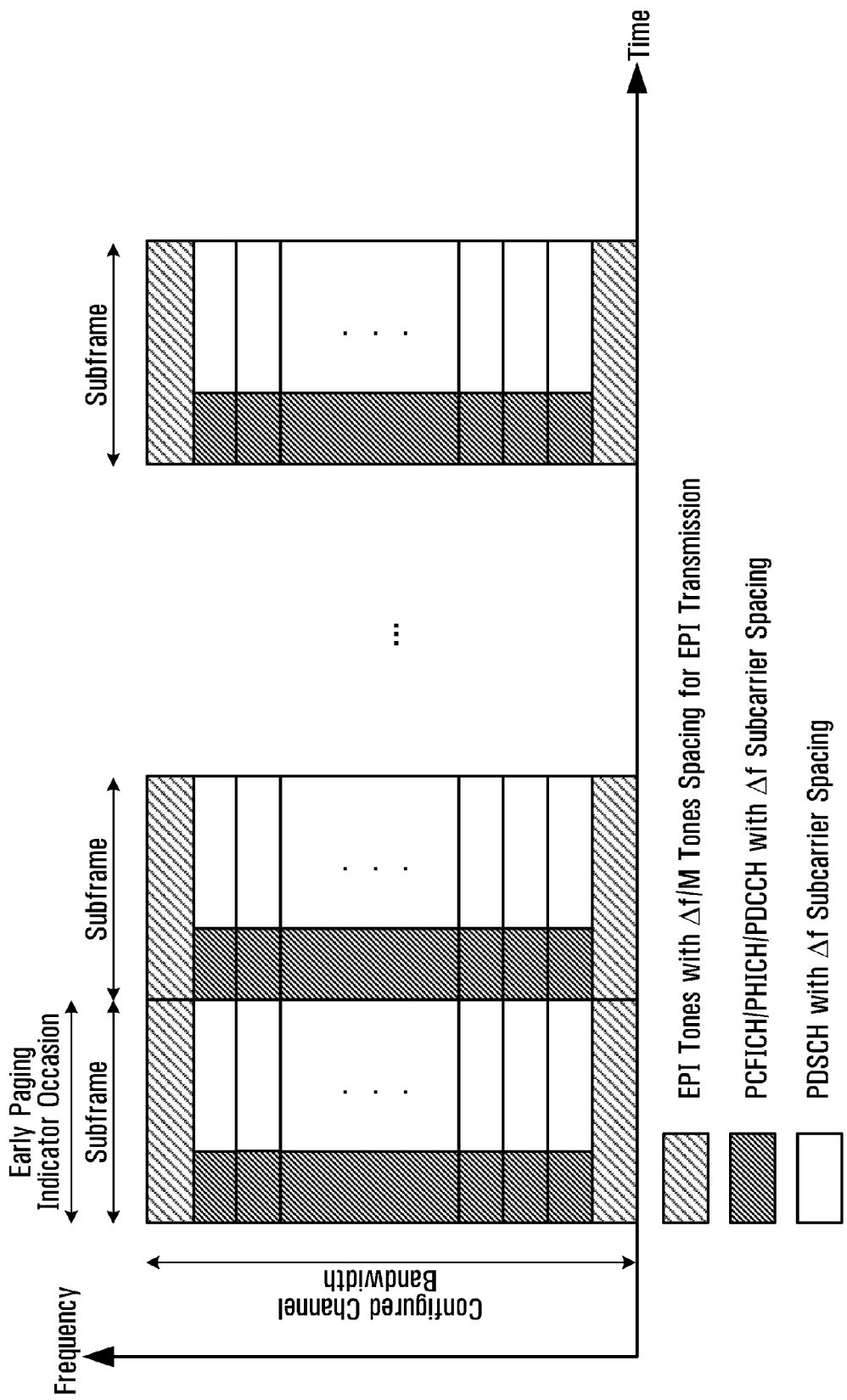
FIG. 22 is a plot of band-edge resource elements (subcarriers) for EPI transmission in accordance with an embodiment of the present disclosure.

In some embodiments, band-edge frequency bands, such as RBs or subcarriers, are allocated for the EPI transmission as shown in FIG. 22. A certain number of band-edge subcarriers immediately outside the defined E-UTRA data bandwidths (i.e. 6, 15, 25, 50, 75 or 100 RBs) are otherwise-unused subcarriers, and they may be usable for EPI functionality.

As an example, a data bandwidth of 100 RBs with 12 data subcarriers per RB and each subcarrier having a spacing of 15 kHz represents a total bandwidth of 100×12×15=18000 kHz=18 MHz. However, a total frequency spectrum allocation of 20 MHz is available in this situation. Consequently, one or more band-edge subcarriers immediately outside the 18 MHz configured data bandwidth could be used for EPI transmission and still be well within the overall 20 MHz bandwidth allocation.

As the EPI tone spacing is 1/M of the normal subcarrier spacing, its spectral sidelobe is smaller and rolls-off more quickly than that of the normal data subcarrier and that can help the spectral emission control.

The band-edge subcarriers for the EPI transmission do not contain any RS signal so these subcarriers can be fully utilized for the EPI transmission.

The EPI transmission starts at the beginning of each early paging indicator occasion and its duration may exceed one subframe. The transmission of control channels (PCFICH/PHICH/PDCCH) is restricted not to use any resource elements and/or RBs allocated for the EPI transmission so that there will be no collision when the EPI duration covers multiple subframes. The transmission of PMCH is also restricted not to use any RBs allocated for the EPI transmission.

Potential benefits of this approach include:
All subcarriers within the allocated RB can be used for the EPI transmission.

The use of band-edge subcarriers (or subbands at band-edges) to transmit EPI is not limited to OFDM systems. Rather, it can also be done in non-OFDM systems, where a proper guardband may be needed to reduce the interference between the EPI transmission and other data transmission.

Special PDSCH Subcarriers for Early Paging Indicator

Figure 23:
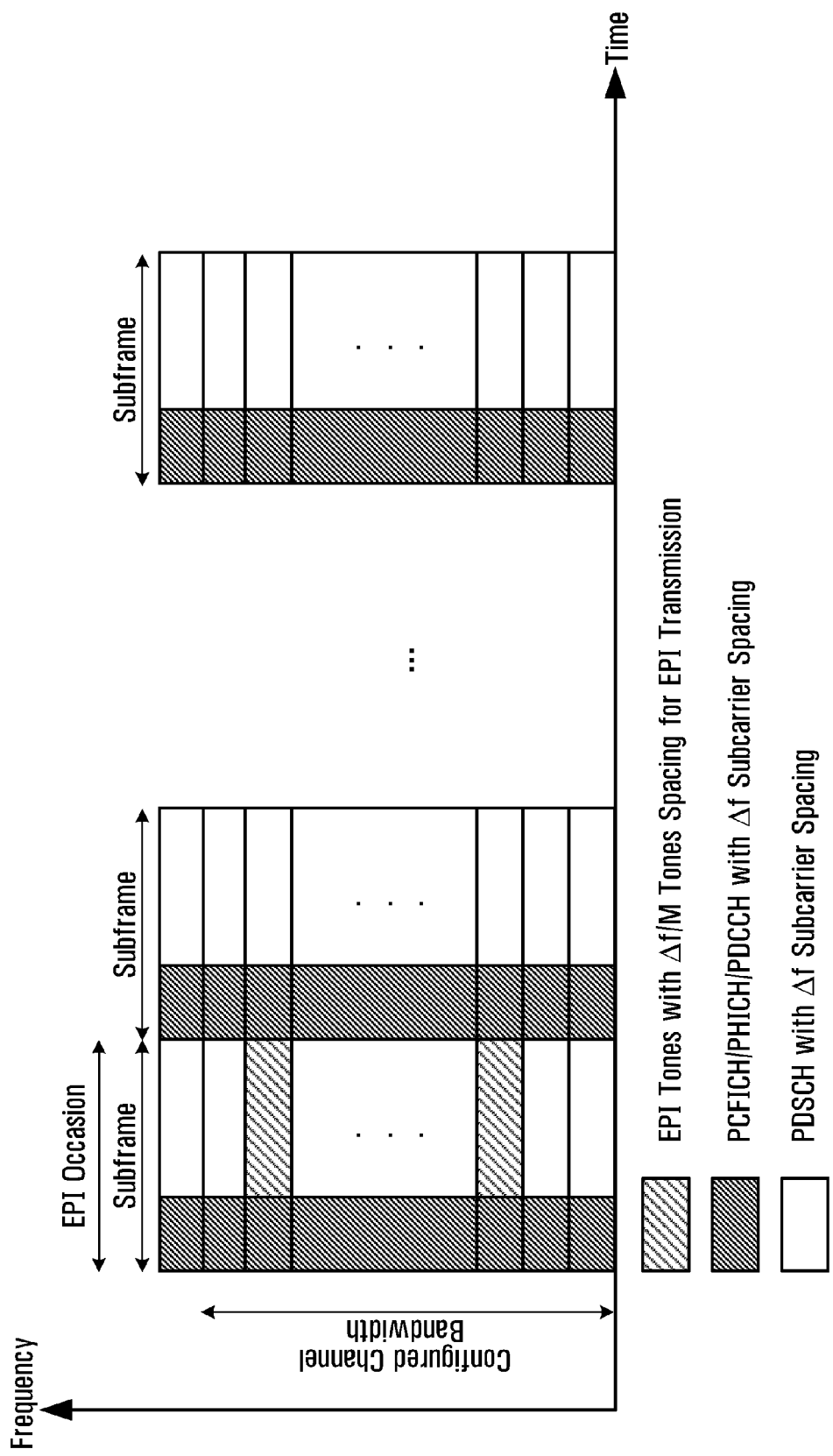
FIG. 23 is a plot of PDSCH subcarriers used for EPI transmission in accordance with an embodiment of the present disclosure.

In some embodiments, PDSCH RBs or subcarriers are allocated for the EPI transmission, as shown in FIG. 23.

For the subcarriers not containing any RS (the locations of RS can be found in FIGS. 8A, 8B and 8C), the EPI waveform is phase-continuous over the OFDM symbols used for PDSCH transmission.

Subcarriers containing RS at some specific OFDM symbol interval (the locations of RS can be found in FIGS. 8A, 8B and 8C) cannot be directly used for EPI. However, in some embodiments, the EPI waveform is repeated or some portion of a continuous EPI waveform is punctured by the RS waveform.

Some potential benefits include:
Backward compatibility with E-UTRA;
No interference to the control channels and data channels;
In some embodiments, a UE determines how long it needs to integrate the EPI waveform. Of course, the duration of the EPI waveform is limited to the number of OFDM symbols within each subframe for PDSCH transmission.

Special PDCCH Subcarriers for Early Paging Indicator

Figure 24:
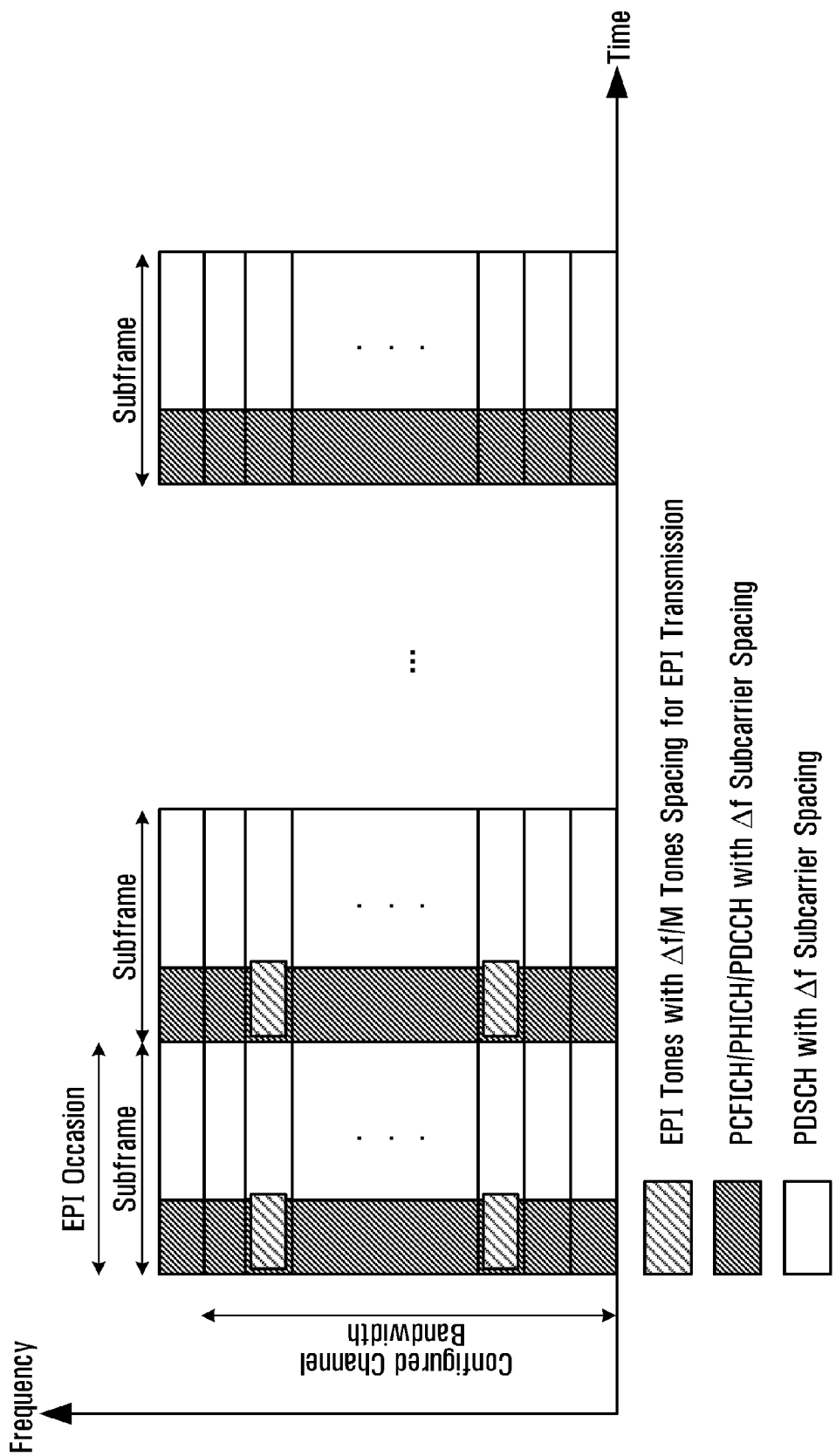
FIG. 24 is a plot of PDCCH subcarriers for EPI transmission in accordance with an embodiment of the present disclosure.

In some embodiments, some PDCCH subcarriers are "stolen" for the EPI transmission as shown in FIG. 24.

As shown in FIG. 24, several PDCCH resource elements (subcarriers) are "stolen" for the EPI transmission. That is, the EPI subcarriers are punctured into the normal PDCCH transmissions. With the coding gain on the PDCCH, this may not significantly affect the PDCCH performance provided that the number of subcarriers stolen within each subframe is very small. The EPI transmission for one EPI occasion is repeated in each subframe until the next EPI occasion.

In some embodiments, unused PDCCH subcarriers are used for the EPI transmission or PDCCHs within the PDCCH region are assigned so as to avoid collisions with the EPI subcarriers.

There is a maximum of four existing paging occasions (i.e. subframes that may be used for paging) per radio frame (one frame contains ten subframes). This would allow up to two subframes to be used per EPI occasion (i.e. floor(10/4)), thereby requiring up to a maximum of eight EPI subframes per radio frame.

Some potential benefits of this approach include:
Backward compatibility with E-UTRA.
The early paging indicator occasion and the normal paging occasion can happen at the same subframe.
Repeated EPI transmission can help UEs at the cell edge to detect the EPI (Those UEs unfortunately have to keep their reception time on longer). Otherwise, the EPI waveform is not long enough and we cannot steal too many subcarriers from the PDCCH portion within each subframe for the EPI transmission.

Detection Reliability for EPI eNB provides enough energy for each EPI for the cell coverage and against fading. For example, for one EPI, a use of C tones (there are C tones with symbol "1" in the OOK modulated symbol) and "DurationEpi" symbols indicates a gain of 10 log 10(C*DurationEpi) dB. In some embodiments of the present disclosure, by selecting C and DurationEpi, the gain can be arranged at least 3 dB larger than the gain that PCFICH and PDCCH currently provide.

Each UE can determine how long it needs to accumulate the EPI waveform for the EPI detection. A UE seeing a strong downlink signal can terminate its detection early as long as a reliable detection is considered to have been reached. A UE seeing a weak downlink signal might need to make use of the entire EPI waveform for accurate EPI detection.

A UE requiring a longer or even full-length detection of an EPI waveform in order to achieve a desired level of detection reliability may see insignificant energy savings from using an EPI as compared with the legacy approach of attempting to detect a paging message directly, due to the time-length of processing required. Such UEs may therefore wish to disable their EPI detection functionality until such time as the transmission channel conditions between the eNB and UE improve (e.g. the UE moves closer to the eNB). A UE could determine if it should disable its EPI functionality by examining the time needed to achieve given confidence in detecting the EPI tone(s), or alternatively its uplink timing advance or the estimated downlink path loss may also be used. Both of these quantities are indicative of the potential transmission channel conditions. A UE's uplink timing advance provides the relative time offset between an uplink subframe transmission and a downlink subframe reception, as measured at the UE. UE-specific timing advances are used to ensure that the uplink transmissions from all UEs within a cell are time-synchronized when they are received at the eNB. A larger uplink timing advance corresponds to a greater signal propagation time and propagation distance between the eNB and UE, and thus directly implies that a greater signal loss may be incurred within the current transmission channel. A UE with a valid uplink timing advance (i.e. in RRC_CONNECTED state and currently considered to be uplink-synchronized with the eNB) may therefore examine its current uplink timing advance (if present) when determining whether or not to enable its EPI functionality. A UE may also estimate the path loss of the downlink transmission channel by comparing the reference signal transmission power (this information is broadcast by the eNB) with the observed received power of those same reference signals. UEs observing a large downlink path loss may not realize energy savings from the EPI and may therefore wish to suspend their use of the EPI until such time as the downlink path loss decreases.

The start time for UEs to detect the EPI waveform does not need to be accurate. In some embodiments, to account for the wake-up time uncertainty, the targeted wake-up time and thus the start time for detecting the EPI may be intentionally slightly late, so that, even if the wake-up time has a maximum negative error to cause the UE to wake up too early, the start time for detection is still not earlier than the time at which the EPI symbol starts. At the other extreme, if the error for the wake-up time is the maximum positive possible, since the EPI is modulated using phase-continuous tones, a late start in detection will not cause a problem provided that the "DurationEpi" is sufficiently long.

As EPI waveforms comprise phase-continuous tones, they can be used for frequency error detection and correction. The reference tone of EPI, which, in some embodiments, is always "on", may be used for frequency error correction. Other EPI tones while they are "on", can also be used for frequency error estimation and correction either alone or together with the reference tone.

EPI Configuration
EPI Encoding, Location, and Timing Configuration

In some embodiments, information about the encoding method and/or location used for the EPI broadcast within a particular cell is broadcast using one of the following methods:

- The EPI has a fixed location in all cells, and its location would therefore not need to be broadcast. This would align with the current approach of the same P-RNTI being used in all cells.
- The EPI has a location that is dependent upon existing cell parameters (e.g. cell ID). Note that the reference symbol locations for a specific cell also depend on the existing cell parameters (i.e. the cell ID and the number of Tx antennas at the eNB). Consequently, this approach may be beneficial if the EPI is to be located on subcarriers that are not used for reference symbols.
- The location of the EPI is broadcast in the system information. Note that SIB1 (System Information Block) and SIB2 already need to be acquired and applied in order for a UE to be able to receive transmissions from a particular eNB. Consequently, in some embodiments, the EPI location/configuration information is broadcast within SIB2.

Note that a UE needs to be able to determine whether a particular eNB actually broadcasts early paging indicators or not. As mentioned previously, legacy eNBs will not transmit this signal. In some embodiments, a UE checks SIB2 for EPI-configuration information to determine EPI presence within a cell. In some embodiments employing either of the first two EPI location approaches listed above (i.e. fixed EPI location in all cells, or EPI location dependent upon existing cell parameters), the EPI-configuration information may be as simple as a Boolean flag indicating the presence or absence of EPI within the current cell. Alternatively, in some embodiments, if the EPI location is broadcast within the system information, then the presence of this location information will indicate to the UE that EPI is present within the current cell.

As discussed in the earlier section entitled "EARLY PAGING INDICATOR IN E-UTRA", an early paging indicator would be signalled timeOffsetEpi subframes in advance of the corresponding existing paging occasion. In some embodiments, the value of timeOffsetEpi is a fixed value for all cells. In some embodiments, the value of this quantity for a particular cell is broadcast with the other EPI-configuration information within SIB2.

It may be desirable to avoid broadcasting early paging indicators within MBSFN subframes. For an FDD system, subframes 1, 2, 3, 6, 7 and 8 may be configured for MBSFN, whereas subframes 0, 4, 5 and 9 are guaranteed not to be MBSFN subframes. Note that paging messages (for an FDD system) are restricted to subframes 0, 4, 5 and 9. Consequently, in some embodiments, an EPI is broadcast with a fixed advance of 5 subframes (or 10 subframes, or any other multiple of 5 subframes) before the corresponding existing paging occasion. This ensures that all EPIs are also contained within non-MBSFN subframes. In addition to the desire to avoid possible collisions with PMCH transmissions in MBSFN subframes, it should also be noted that relay nodes may use MBSFN subframes for wireless backhaul transmissions and may therefore be unable to transmit EPIs during these subframes. Consequently, it is expected that it will be desirable to avoid possible MBSFN subframes when broadcasting early paging indicators.

In a multi-cell scenario, it may be desirable to have a frequency re-use factor for cells to properly allocate the EPI resources so as to avoid potential EPI collisions. Considering the fact that multiple cells within the same network might send paging signals to page the same UE when a UE needs to be paged, one can take the advantage of that by coordinating the EPI resource allocation and transmission for these two cases.

"Frequency Re-Use Factor>1" Case:
- In a synchronous or asynchronous network, cells can be coordinated so that the neighboring cells choose different EPI resources for the EPI transmission.
- Note that the EPIs from neighboring cells will appear like interference. That is similar to interfering signals from the neighboring cells received at the data subcarriers. The same interference cancellation technique which is being used in the reception of the data at the data subcarriers can be employed to reduce the impact of the EPIs from other cells. Since the EPIs from the neighboring cells are being transmitted using phase-continuous tone(s) over a period longer than the period of other data subcarriers, the detection reliability of those EPIs and the effectiveness of the EPI interference cancellation could be made higher than the interference cancellation at the data subcarriers.

"Frequency Re-Use Factor=1" Case:
- In a synchronous network, cells can be coordinated to send the EPI for the same UE simultaneously.
- For cell-centre UEs (located near the serving base station), the received EPI signal from neighboring cells, as compared with the EPI signal from the serving cell, is weak and can be ignored.
- For cell-edge UEs (located at some distance from the serving base station), the received EPI signal from neighboring cells might arrive at a power level comparable to that from the serving cell. If the relative delay between those EPI signals is small, UEs can try to combine those EPI signals. Of course, as the fading paths from different cells are different, a proper EPI transmission needs to be selected to avoid the EPI signals being added destructively. For that, one approach is to select multiple EPI tones for one EPI transmission, employ the cyclic delay diversity (CDD) technique, and apply at each cell a cell-specific CDD value. If the relative delay between those EPI signals is large, UEs might need to employ the interference cancellation technique to alleviate the impact of the EPIs from the neighboring cells. That is similar to the interference cancellation described in "frequency re-use factor>1" case.

EPI Subgroup Assignment

In some embodiments, multiple EPIs are utilized for each EPI occasion, and existing paging groups are further divided (i.e. all UEs which share the same normal paging occasion) into EPI paging subgroups. For example, if there are eight distinct EPIs at each EPI occasion, then each UE could be assigned to one of eight EPI paging subgroups. As discussed earlier in the section entitled "EARLY PAGING INDICATOR IN E-UTRA", this would reduce the need for a UE to decode and process a paging message that was not intended for that UE.

UEs currently identify their paging occasion through the use of broadcast paging parameters and the UE ID (generally the UE's IMSI mod 1024). This is explained in detail in the earlier section "Paging Cycle and Paging Occasions". A similar approach could be used to determine a particular UE's EPI paging subgroup (EPI_SG) as shown in the following equation.

$$EPI\_SG = IMSI \bmod EPIs\_per\_EPI\_occasion$$

where EPIs_per_EPI_occasion represents the number of distinct EPIs at each EPI occasion. The value of this parameter would be broadcast by each eNB together with the other EPI configuration information in SIB2.

EPI Tx Power

Although the power allocated to the EPI can be configurable by eNB, the Tx power for the EPI is normally fixed per eNB. The reason is that generally, the network only knows the location of the UE is within a given tracking area. This tracking area can comprise multiple eNBs, and the network therefore does not even know in which cell the UE currently is, let alone where in that cell (e.g. close to the eNB or close to the cell edge) the UE is. As a result, it is difficult for eNB to allocate UE-specific EPI power. When the network load is light, there may be extra power that is otherwise wasted, the transmit power allocated to EPI transmission can be set higher than that when the network is heavily loaded, and this would reduce the duration needed to detect the EPI of the UEs, and increate the standby time of the UEs in the coverage area. Overall, the EPI is preferably intentionally over budgeted for the links of most UEs in the coverage area so that UEs do not have to use the entire length of the EPI occasion for achieving the detection confidence. This would allow higher tolerance for the wakeup time, and also allow the device to terminate the detection early, to reduce energy consumption of the UEs.

UE does not necessarily need to know the power set at the eNB (UE can determine an optimal threshold and can estimate the confidence level of the Early Paging Channel indicator decision).

Example of EPI Group and Subgroup Activation

Figure 25:
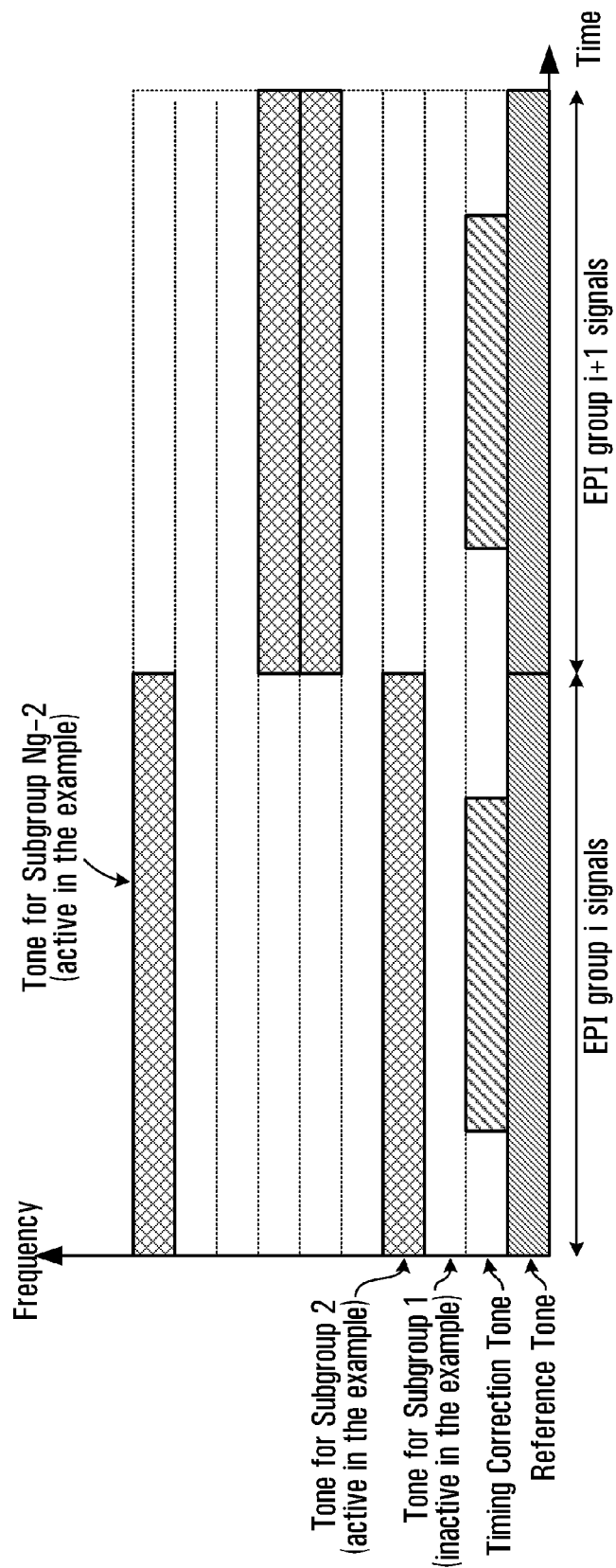
FIG. 25 is a plot showing an example of EPI group and subgroup activation in accordance with an embodiment of the present disclosure.

An example of EPI group and subgroup activation is shown in FIG. 25.

In the example illustrated in FIG. 25, two EPI groups are shown, EPI groups i and i+1. The two EPI groups are used to page UEs in paging group i and i+1, respectively.

In some embodiments, in each EPI group, there exists one reference tone which is always activated. It is used to indicate the relative frequency difference from other EPI tones, for the purpose of being able to decode the indicator value even when the local system reference clock is not fully locked or settled in frequency after waking up from sleep state.

In each EPI group there also exists one timing correction tone, which is activated over a portion of the time. The activation and/or deactivation edges of this timing correction tone are used to correct the wake-up time for the next EPI occasion to prevent timing errors being accumulated over time.

The EPIs may use the rest of the tones to indicate which subgroups of the UEs in the paging group need to listen to the downlink signal at the next paging occasion.

If a positive indication is used, when at least one UE that belongs to a subgroup needs to be paged, the corresponding tone is activated. The subgroup number to be paged may be indicated by the frequency difference between the reference tone and the subgroup indicator tone. In this way, successful decoding of the indicators is still possible in the presence of a certain amount of frequency error.

Similarly, if a negative indication is used, when none of the UEs belonging to a subgroup needs to be paged, the corresponding tone is activated. The subgroup number not being paged may be indicated by the frequency difference between the reference tone and the subgroup indicator tone. In this way, a certain amount of frequency error can still allow successful decoding of the indicators.

In the example, subgroups 2 and Ng-2 in EPI group i are paged in the positive indication case, and not paged in the negative indication case.

For ETWS and/or system information change notifications, all EPI subgroups will be paged. Therefore, all EPI tones will be activated in positive indication case, and all EPI tones are inactive for the negative indication case.

EPI Detection Considerations

For detection amplitude and phase-modulated transmit signal $$s(t) = \sqrt{2E_t} f(t) \cos[\omega_c t + \phi(t)], \quad 0 \le t \le T$$

using the received noisy waveform, where $f(t)$ and $\phi(t)$ are the amplitude and phase waveforms, respectively, $\omega_c$ is the angular carrier frequency, $E_t$ is the energy for the transmitted waveform.

$$H1: r(t) = \sqrt{2E_r} f(t) \cos[\omega_c t + \phi(t) + \theta] + w(t), \quad 0 \le t \le T$$

$$H0: r(t) = w(t), \quad 0 \le t \le T$$

Where additional quantities which are not already defined above include the following. $E_r$ is the signal energy for the received waveform, w(t) is for the background noise, and $\theta$ is the phase introduced by the wireless channel.

Figure 26:
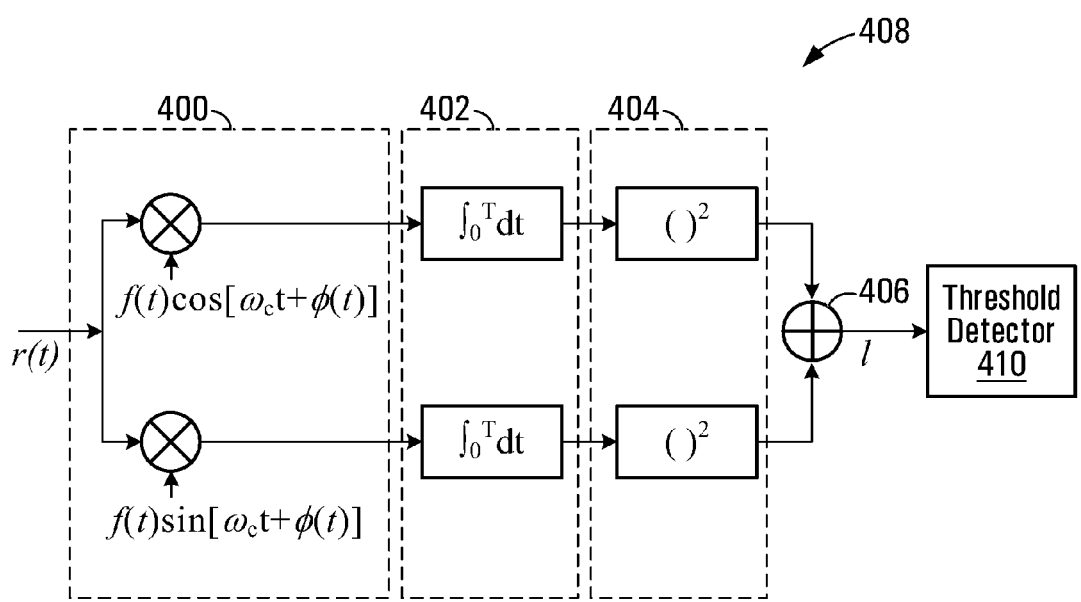
FIG. 26 is a block diagram of an EPI detector function in accordance with an embodiment of the present disclosure.

If the phase $\theta$ is completely unknown and uniformly distributed, the functional block diagram of the optimal EPI detector is shown in FIG. 26 (See Sec. 4.4 of [12]).

The EPI detector 408 shown in FIG. 26 includes a quadrature frequency translator function, generally indicated at 400, two parallel integrating functions, generally indicated at 402, two parallel squaring functions, generally indicated at 404, a summing function 406 and a threshold detector 410. The quadrature frequency translator function 400 multiplies a received signal, r(t), by locally generated EPI waveforms offset by 90 degrees relative to one another respectively (cos and sin functions). In some embodiments, both $f(t)$ and $\phi(t)$ are constants, while in some alternative embodiments, $\phi(t)$ is a constant (and without loss of generality it can be assumed to be zero), and $f(t)$ is a window function waveform, such as a Hann window, Hamming window, Kaiser window, etc. Applying a non-constant window function $f(t)$ may help in reducing out of band spurious emissions, and in some cases reducing interference to other channels. The two parallel integrating functions 402 integrate respective outputs of the quadrature frequency translator function and the two parallel squaring functions 404 square respective outputs of the two parallel integrating functions. The summing function 406 sums the outputs of the two parallel squaring functions, and the threshold detector 410 compares the output of summing function 406 with an optimal threshold. The functionality of the EPI detector 408 shown in FIG. 26 effectively performs a correlation calculation of the received signal r(t) with the locally generated EPI waveform, and uses the energy of the correlator output to compare with an optimal threshold.

Although the receiver shown in FIG. 26 assumes perfect knowledge in carrier frequency, since phase is assumed unknown and uniformly distributed, it also works even with small frequency difference in the local oscillator (LO). When multiple hypotheses exist as in the proposed multi-tone signalling, the optimal detection is achieved when the signals representing the hypotheses are orthogonal with each other. This is true in the multi-tone EPI signal design described herein and if the integration length T satisfies T=1/(tone space in frequency). An integration length T does not have to satisfy T=1/(tone space in frequency) as long as the detection is highly confident, i.e., when the signal is strong and channel quality is good, the detection does not really care about the performance loss caused by losing orthogonality. The EPI signal design using phase-continuous tones (or window-weighted phase-continuous tones) allows such early termination of detection as well as late start of the detection, i.e., the integration interval [0 T] as shown in the integrating functions 402 does not have to be accurate. The starting time would rather be slightly late than too early to integrate over the previous EPI to account for wake-up timing uncertainty, and the finishing time T can be any value before the EPI stops transmission as long as the detection confidence is achieved. One embodiment to implement such early termination is, if the resulting output value l(t) is higher than the optimal detection threshold value $L_{opt}$ at the end of the EPI symbol transmission, then the EPI is detected; if at a time t earlier than the EPI ends, the resulting l(t) becomes higher than a higher threshold L ($L>L_{opt}$), then the detection can be considered done and one can conclude that EPI is detected (when negative indication is used, the UE can go to sleep right away); if the resulting output value l(t) is lower than the optimal detection threshold value $L_{opt}$ at the end of the EPI symbol transmission, then the EPI is not detected. The end of EPI transmission T can be estimated using the time correction tone as described earlier. The reference tone added in the signal design may not directly help the detection. However, it can help indirectly. One aspect of the reference tone to help the EPI tone detection is to correct system reference frequency errors, as mentioned earlier (When the UE wakes up from sleep, there exists some uncertainty in local reference frequency.) Another aspect is to help the confidence level estimation. Since the reference tone is always on during the EPI symbol interval, and in some embodiments, the reference tone is even phase-continuous across multiple EPI occasions (when the EPI tones are assigned to use dedicated subcarrier frequency bands, such as using the band edge subcarrier channels), a dedicated detector similar to 408 is implemented for the reference tone, and produces an output at its summing function output l'. One embodiment is, at the end of the EPI occasion, if l' is less than a given confidence threshold, then no matter what l value is, the conclusion is EPI is not (confidently) detected. When negative indication is used, this means the UE needs to decode the signals in the paging occasion. If l' is higher than certain confidence threshold, then use l' to normalize l to make a decision, i.e.:

1) at the end of EPI, if $l(T)/l'(T)>L'_{opt}$ (equivalently $l(T)>l'(t) L'_{opt}$) then an EPI is detected;

2) or if for any given time t<T, the running value $l(t)/l'(t)>L'$ (equivalently $l(t)>l'(t)L'$), where L' which is a tougher threshold than $L'_{opt}$ ($L'>L'_{opt}$), then an EPI is detected;

3) otherwise, an EPI is not (confidently) detected.

It is noted that a DFT (Discrete Fourier Transform) processing to the received samples r(n), down-converted from the incoming signal r(t) and sampled, at an array of predefined frequency $[2\pi k/N]f_s$, k=0, 1, . . . , N−1, where $f_s$ is the sampling rate, is equivalent to the multiplying and integral processing carried out by the quadrature frequency translation and parallel integrating functions shown in FIG. 26. The length of the sum in the DFT processing equivalently determines the length of integral above, and whether the tone signals are orthogonal with each other also depends on the integral length.

Figure 27:
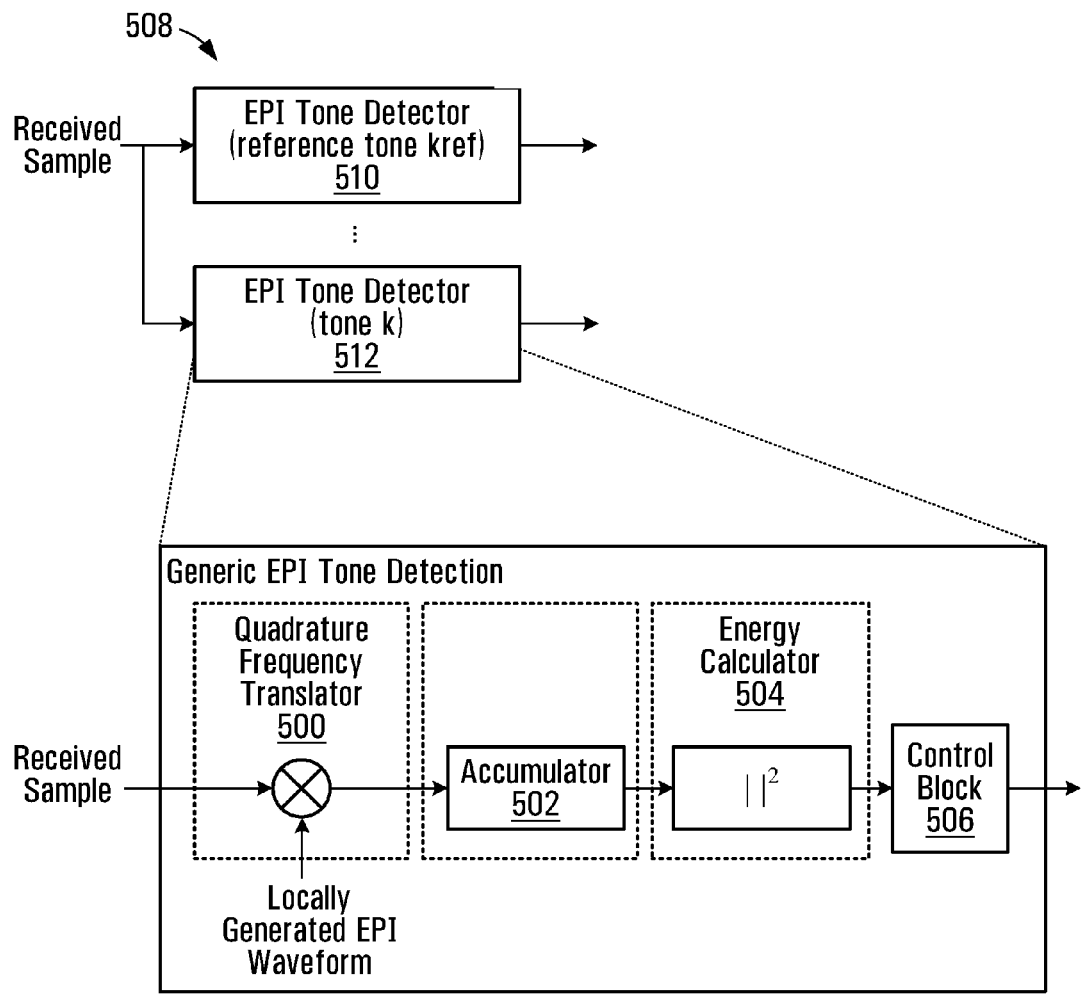
FIG. 27 is a block diagram of a DSP-based EPI detector function in accordance with an embodiment of the present disclosure.

FIG. 27 is a block diagram of a DSP-based (Digital Signal Processor-based) EPI detector function 508 in accordance with an embodiment of the present disclosure. The DSP-based EPI detector function 508 shown in FIG. 27 is configured to detect the presence of one or more of a plurality of EPI tones. The DSP-based EPI detector function 508 shown in FIG. 27 includes a plurality of EPI tone detectors 510 . . . 512, each configured to detect one of a plurality of tones. The plurality of tones may be tones having frequencies offset relative to a single data subcarrier frequency of an OFDM resource space, as described earlier.

In operation, each EPI tone detector 510 . . . 512 monitors received samples for the presence of a respective EPI tone. Here the received samples are digitized samples of a received signal that has been down-converted to an appropriate low IF (Intermediate Frequency) and sampled.

One of the EPI tone detectors 512 is shown in detail in FIG. 27. The detailed view of the EPI tone detector 512 shows that it includes a quadrature frequency translator 500, an accumulator 502, an energy calculator 504 and a control block 506. In operation, the quadrature frequency translator 500 multiplies the received samples by a locally generated EPI waveform corresponding to the EPI tone detector's respective EPI tone, $e^{-j2\pi\Delta f[k_{o,EPI}+(k/M)]nT_s}$, where $T_s=1/f_s$ is the sampling interval. The accumulator 502 accumulates output of the quadrature frequency translator 500 and the energy calculator 504 converts the signal values in the output of the accumulator 502 to its energy value. The control block 506 determines if the energy computed by the energy calculator 504 corresponds to a detection of the respective EPI tone of the EPI tone detector in the received samples, for example, by comparing the energy detected by the energy detector with a threshold value.

In some embodiments, the threshold value may be dynamically adjusted by a mobile device.

In some embodiments, the threshold is set to Aσ, where A is a configurable constant and σ is the root-mean square of the estimated noise variance.

In some embodiments, the length of one OFDM symbol is used as an accumulation unit and the accumulation is updated every OFDM symbol (with the cyclic prefix portion excluded) until the end of the EPI. In some embodiments, if the accumulated value exceeds a detection threshold the accumulation is stopped and the presence of the EPI is claimed.

It is noted that EPI tone detector 510 shown in FIG. 27 is dedicated to detection of a reference EPI tone. As described above, relative offset of the other EPI tones to the reference EPI tone may be used to identify EPI subgroups within an EPI group sharing a common paging occasion.

It is also noted that when the number of parallel EPI tones to be demodulated is large, the array of quadrature frequency translators and partial accumulators implemented by the plurality of parallel EPI tone detectors 510 . . . 512 shown in FIG.

Figure 28:
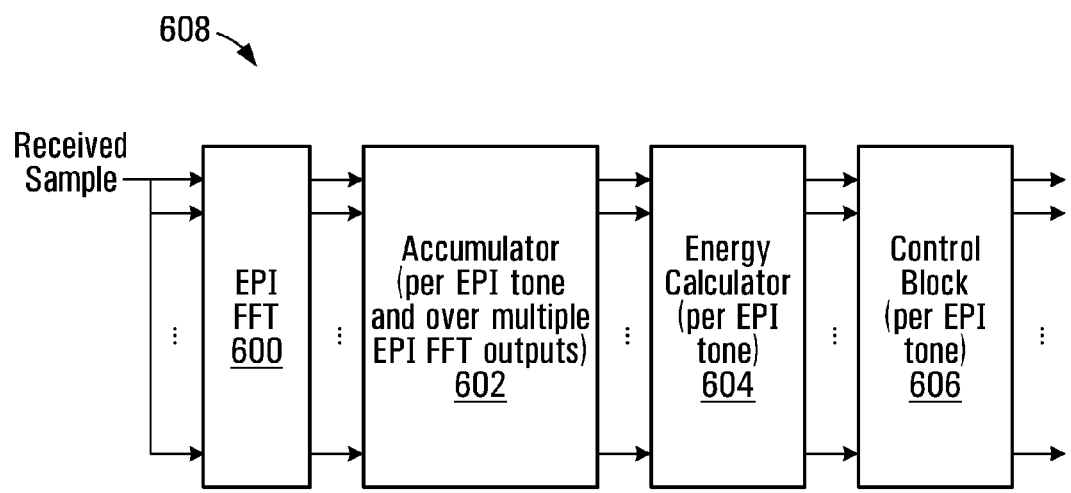
FIG. 28 is a block diagram of another DSP-based EPI detector function in accordance with an embodiment of the present disclosure.

27 can be realized by an FFT processing function that is commonly included as part of an OFDM receiver. FIG. 28 is a block diagram of another DSP-based EPI detector function 608 in accordance with an embodiment of the present disclosure in which the FFT processing function common to many OFDM receivers is employed in the EPI detection process.

The EPI detector function 608 shown in FIG. 28 includes an EPI FFT function 600, an Accumulator 602, an Energy Calculator 604 and a Control block 606, each implemented for parallel processing of a plurality of EPI tones similar to the parallel arrangement of the EPI detectors 510 . . . 512 of the EPI detector function 508 shown in FIG. 27. The EPI FFT function 600 performs an FFT on the received samples for each of the plurality of EPI tone frequencies. The operation of the Accumulator 602, Energy Calculator 604 and Control Block 606 are as described above for the corresponding elements of the EPI detector function 508 shown in FIG. 27.

In some embodiments, the integration interval in FIG. 26, FIG. 27, and FIG. 28 could be a combination of multiple nominal OFDM symbol intervals of a data subcarrier and the integration starting and ending timing instants for these nominal OFDM symbol intervals may be set synchronous to any nominal OFDM symbol interval with the cyclic prefix portion excluded, since at any subcarrier allocated for the EPI tone the EPI waveform with tone index 0 is orthogonal to the waveforms of other data subcarriers and the orthogonality is maintained in each nominal OFDM symbol interval. A nominal OFDM symbol interval represents an OFDM symbol duration without the cyclic prefix portion. Hence, integrations would be performed over a time period corresponding to each OFDM symbol interval (minus the cyclic prefix), but these integrations would not be performed over a time period corresponding to the cyclic prefix interval of each OFDM symbol. It is also possible to simply integrate over the EPI occasion continuously and ignore the minor impact of the samples in the cyclic prefix intervals.

In some embodiments, the FFT processing 600 and 602 accomplishes the quadrature frequency translator 500 and the accumulator 502 in such a sampling rate arrangement that the frequency bin width of the FFT is narrower than the EPI tone frequency space, so that each of the EPI tones (including the reference tone and timing correction tone) is processed by more than one frequency bins of the FFT. The received signal input to the FFT is also properly band-pass filtered and frequency down converted so that the FFT frequency span covers more than the frequency span of the EPI channel bandwidth transmitting the EPI tones even with system reference frequency errors. The parallel processing of FFT to cover each EPI tone by more than one, for example, 3 to 5, frequency bins can allow the bin with maximum energy value to be used for detection. This way, the frequency estimation is implicitly accomplished by the FFT parallel processing. In some embodiments, which bin to use for detection is determined jointly among energy values computed in the FFT bins in response to all (active) EPI tones, including the reference tone and tones that might be active for other subgroup UEs.

Potential Benefits

This section summarizes at least some of the benefits that may be provided by employing the EPI of the present disclosure.

The early paging indicator is easy to detect and its decoding latency is short. As such, the reception on time can be made short. Specifically, the early paging indicator does not use any spreading, layer mapping, or precoding, its detection does not rely on the detection of other downlink channels or signals and it does not need any channel estimation or equalization. The decision on the presence of an early paging indicator can be made in the physical layer and can be made quickly. If a reliable detection cannot be made, UE can go back to the conventional method, trying to detect the presence of a paging message in the paging occasions as if there were a paging message.

The use of the multi-tone pattern provides some level of error tolerance.

The use of a phase-continuous EPI waveform for a long duration allows each UE to use variable length detection to accumulate the energy of the received EPI waveform to determine confidence and terminate detection once a reliable detection is considered reached. In other words, UEs seeing a strong downlink signal can use a short accumulation time to make a decision for a possible early termination while UEs seeing a weak downlink signal will need a long accumulation time to make use of the entire EPI waveform available.

The use of a phase-continuous tone as EPI signal without complicated encoding may relax the requirement on the accurate receiver timing at UEs. A UE may not need to wake up with time advance to account for real time clock (RTC), i.e., low rate clock, frequency errors. Instead, the UE targeted wake-up time may be intentionally later than the EPI beginning edge. As such, even with RTC error, the EPI signal may be guaranteed to have been made available for a UE to decode immediately after it wakes up.

Dividing a paging group into multiple subgroups also reduces the probability that a UE has to receive and decode a paging message when the UE belongs to a different subgroup of the paging group.

Note that these advantages may result in reduced total energy usage by a handheld UE, thereby increasing the battery life.

In contrast to, for example, the quick paging channel scheme used in CDMA2000, the detection of the early paging indicator for E-UTRA described herein does not rely on the detection or fine time synchronization of any other physical channels or signals such as the pilot channel in CDMA2000. Once assigned an EPI occasion, UE initially can rely on the RTC accuracy timing to monitor EPI occasion until a new assignment is given. In some embodiments, the detection of the early paging indicator for E-UTRA as described herein does not require completely accurate timing (such as search for sub-chip level timing, PN (Pseudo-Noise) boundary determination, QPCH symbol boundary determination), and does not need advance processing time for establishing such fine timing. In some embodiments, there is no need to estimate and compensate for Doppler and no need to separately track and combine multipaths.

UEs, i.e., mobile stations, will determine if the decision variable for the EPI is reliable and as such UEs at different cell locations and receiving the downlink signal at different power levels may use different detection time durations. The granularity for the detection time duration can be as small as 1/(EPI tone frequency spacing) and does not always need to be an integer multiple of 1/(EPI tone frequency spacing). For example, if the minimum tone spacing is 3 kHz, the granularity for the detection time duration may be as small as 0.33 ms. If within the subcarrier allocated for the EPI transmission the EPI tone with tone index k=0 is the only tone used, the EPI waveform is orthogonal to the waveforms of other data subcarriers. As a result, the detection time duration could be as small as 1/(Data subcarrier frequency spacing), which is much smaller than 1/(EPI tone frequency spacing). In CDMA2000 QPCH detection, there are two QPCH slots, which are 20 ms apart. So, if the QPCH symbol in the first slot is not reliably detected, UE needs to wait for 20 ms to be able to have the data from the second slot to improve the detection.

In contrast to the Fast Downlink Notification (FDLN) channel proposed for WiMAX, while the FDLN channel uses the same subcarrier spacing as the data subcarrier, in some embodiments of the present disclosure the subcarrier spacing of a nominal data subcarrier is further divided into multiple tones for early paging indicators. As such, small frequency resource can be used for multiple early paging indicators.

In addition, the FDLN channel for WiMAX requires accurate reception timing and requires Rx FFT processing while at least some embodiments of the present disclosure do not have those same requirements.

Furthermore, the repetition of FDLN in WiMAX is 2 or 4 and is determined by the network component, while some embodiments of the present disclosure it is the UEs (mobile stations) that determine if their decision variables reach an appropriate confidence level and as such UEs at different cell locations receiving different qualities of signals may use different detection time durations.

Numerous modifications and variations of the present application are possible in light of the above teachings. It is therefore to be understood that within the scope of the appended claims, the application may be practised otherwise than as specifically described herein.

REFERENCES

The following documents are referred to above and are hereby incorporated by reference in their entireties:

[1] TS 36.133, "3$^{rd}$ Generation Partnership Project; Technical Specification Group Radio Access Network; Evolved Universal Terrestrial Radio Access (E-UTRA); Requirements for support of radio resource management (Release 8)".
[2] TS 36.211, "3$^{rd}$ Generation Partnership Project; Technical Specification Group Radio Access Network; Evolved Universal Terrestrial Radio Access (E-UTRA); Physical channels and modulation (Release 8)".
[3] TS 36.212, "3$^{rd}$ Generation Partnership Project; Technical Specification Group Radio Access Network; Evolved Universal Terrestrial Radio Access (E-UTRA); Multiplexing and channel coding (Release 8)".
[4] TS 36.213, "3$^{rd}$ Generation Partnership Project; Technical Specification Group Radio Access Network; Evolved Universal Terrestrial Radio Access (E-UTRA); Physical layer procedures (Release 8)".
[5] TS 36.321, "3$^{rd}$ Generation Partnership Project; Technical Specification Group Radio Access Network; Evolved Universal Terrestrial Radio Access (E-UTRA); Medium Access Control (MAC) protocol specification (Release 8)".
[6] TS 36.331, "3$^{rd}$ Generation Partnership Project; Technical Specification Group Radio Access Network; Evolved Universal Terrestrial Radio Access (E-UTRA); Radio Resource Control (RRC); Protocol specification (Release 8)".
[7] TS 36.304, "3$^{rd}$ Generation Partnership Project; Technical Specification Group Radio Access Network; Evolved Universal Terrestrial Radio Access (E-UTRA); User Equipment (UE) procedures in idle mode".
[8] 3GPP2, "Physical layer standard for CDMA2000 spread spectrum systems (release A)", Version 6.0, http://www.3gpp2.org/Public html/specs/C.S0002-A v6.0.pdf, February 2002.
[9] 3GPP2, "Upper layer (layer 3) signalling standard for CDMA2000 spread spectrum systems (release A)", http://www.3gpp2.org/Public html/specs/C.S0005-A.pdf, June 1999.
[10] Siemens, "White paper: TD-SCDMA: The solution for TDD bands", http://www.tdscdma-forum.org/en/pdfword/200511817463050335.pdf.
[11] K. Etemad and M. Olfat, "Fast paging and broadcast configuration update indication", http://www.ieee802.org/16/tge/contrib/C80216e-04 281.pdf, 2004.
[12] H. L. Van Trees, et al, *Detection, Estimation and Modulation Theory*, John Wiley & Sons Inc, 1968.

We claim:

1. A method in a network component, the method comprising:
performing at least one of:
A) for each of at least one paging occasion:
transmitting, during an early paging indicator occasion in advance of the paging occasion, an early paging indicator indicative that a page is present in the paging occasion, the early paging indicator comprising at least one phase-continuous tone over the early paging indicator occasion;
transmitting a page during the paging occasion; or
B) for each of at least one paging occasion:
transmitting, during an early paging indicator occasion in advance of the paging occasion, an early paging indicator indicative that a page is not present in the paging occasion, the early paging indicator comprising at least one phase-continuous tone over the early paging indicator occasion,
wherein:
a given paging occasion is associated with a group of mobile devices, the group of mobile devices comprising a plurality of subgroups of mobile devices within the group;
the transmitted page is for at least one mobile device of at least one subgroup;
for each subgroup for which a page is to be transmitted during the paging occasion, transmitting, during the early paging indicator occasion in advance of the paging occasion, an early paging indicator indicative that a page is present in the paging occasion comprises transmitting an early paging indicator specific to the subgroup that comprises at least one phase-continuous tone over the early paging indicator occasion and that is indicative that a page is present in the paging occasion for the subgroup; and
for each subgroup for which no page is to be transmitted during the paging occasion, transmitting, during the early paging indicator occasion in advance of the paging occasion, an early paging indicator indicative that a page is not present in the paging occasion comprises transmitting an early paging indicator specific to the subgroup that comprises at least one phase-continuous tone over the early paging indicator occasion and that is indicative that a page is not present in the paging occasion for the subgroup.

2. The method of claim 1, wherein the early paging indicators specific to particular subgroups collectively comprise a plurality of tones each having a respective frequency offset from a subcarrier frequency of an OFDM resource space.

3. The method of claim 2, further comprising transmitting at least one of a reference tone or a timing correction tone, wherein the plurality of tones comprises, for each subgroup, at least one separate indicator tone with each tone having a subgroup-specific offset in frequency from the reference tone.

4. The method of claim 1, wherein transmitting, during an early paging indicator occasion in advance of the early paging occasion, an early paging indicator indicative that a page is not present in the paging occasion comprises at least one of:
- transmitting the early paging indicator in a physical resource block that may otherwise be used for data transmission; or
- dynamically re-allocating the physical resource block for data transmission based on traffic load level.

5. The method of claim 1, wherein at least one band-edge subcarrier frequency which lies inside an allocated frequency band but outside a frequency range configured for data transmission is allocated for transmission of the early paging indicator.

6. A method in a mobile device, the mobile device belonging to a subgroup of a plurality of subgroups of mobile devices associated with a given paging occasion, each subgroup having a respective early paging indicator specific to the subgroup, the method comprising:
for each of at least one paging occasion:
during an early paging indicator occasion in advance of the paging occasion, monitoring for an early paging indicator that comprises at least one phase-continuous tone over the early paging indicator occasion for the respective early paging indicator specific to the subgroup of mobile devices to which the mobile device belongs; and
performing either:
A) upon detecting an early paging indicator that is indicative that a page is present in the paging occasion for the subgroup, attempting to receive a page during the paging occasion; or
B) upon detecting an early paging indicator that is indicative that a page is not present in the paging occasion for the subgroup, entering an energy saving mode,
wherein monitoring for an early paging indicator that comprises at least one phase-continuous tone over the early paging indicator occasion comprises:
calculating, over at least a portion of the early paging indicator occasion, received energy of an early paging indicator that comprises at least one phase-continuous tone; and
determining that the early paging indicator has been detected if the received energy that has been calculated exceeds a first threshold value.

7. A method in a mobile device, the mobile device belonging to a subgroup of a plurality of subgroups of mobile devices associated with a given paging occasion, each subgroup having a respective early paging indicator specific to the subgroup, the method comprising:
for each of at least one paging occasion:
during an early paging indicator occasion in advance of the paging occasion, monitoring for an early paging indicator that comprises at least one phase-continuous tone over the early paging indicator occasion for the respective early paging indicator specific to the subgroup of mobile devices to which the mobile device belongs; and
performing either:
A) upon detecting an early paging indicator that is indicative that a page is present in the paging occasion for the subgroup, attempting to receive a page during the paging occasion; or
B) upon detecting an early paging indicator that is indicative that a page is not present in the paging occasion for the subgroup, entering an energy saving mode,
wherein monitoring for an early paging indicator that comprises at least one phase-continuous tone over the early paging indicator occasion comprises waking up the mobile device from an energy saving mode for the early paging indicator occasion in advance of the paging occasion and monitoring for the early paging indicator during at least a portion of the interval of the early paging indicator occasion.

8. The method of claim 6, wherein calculating received energy of an early paging indicator that comprises at least one phase-continuous tone over at least a portion of the early paging indicator occasion further comprises waking up the mobile device from an energy saving mode at a time such that the effective starting time for calculating the received energy of the early paging indicator is not earlier than the starting time of the early paging indicator tone signal at a receiver of the mobile device.

9. The method of claim 6, wherein calculating received energy of an early paging indicator that comprises at least one phase-continuous tone over at least a portion of the early paging indicator occasion further comprises terminating the calculation at the earlier point of time between i) and ii) when:
i) the calculated energy of the early paging indicator up to the point of time exceeds a second threshold value based on a target confidence level that is not lower than the first threshold value; and
ii) the early paging indicator occasion ends.

10. The method of claim 7, further comprising:
receiving a timing correction tone;
using at least one of the activation or deactivation edges of the timing correction tone to fine-tune timing associated with waking up the mobile device for the next early paging indicator occasion.

11. A method in a mobile device, the mobile device belonging to a subgroup of a plurality of subgroups of mobile devices associated with a given paging occasion, each subgroup having a respective early paging indicator specific to the subgroup, the method comprising:
for each of at least one paging occasion:
during an early paging indicator occasion in advance of the paging occasion, monitoring for an early paging indicator that comprises at least one phase-continuous tone over the early paging indicator occasion for the respective early paging indicator specific to the subgroup of mobile devices to which the mobile device belongs; and
performing either:
A) upon detecting an early paging indicator that is indicative that a page is present in the paging occasion for the subgroup, attempting to receive a page during the paging occasion; or
B) upon detecting an early paging indicator that is indicative that a page is not present in the paging occasion for the subgroup, entering an energy saving mode, and
the method further comprising receiving a reference tone within a subcarrier frequency space, wherein monitoring for the respective early paging indicator specific to the subgroup to which the mobile device belongs comprises monitoring for at least one tone having a frequency offset from the frequency of the reference tone corresponding to the subgroup to which the mobile device belongs.

12. A method in a mobile device, the mobile device belonging to a subgroup of a plurality of subgroups of mobile devices associated with a given paging occasion, each subgroup having a respective early paging indicator specific to the subgroup, the method comprising:
for each of at least one paging occasion:
during an early paging indicator occasion in advance of the paging occasion, monitoring for an early paging indicator that comprises at least one phase-continuous tone over the early paging indicator occasion for the respective early paging indicator specific to the subgroup of mobile devices to which the mobile device belongs; and performing either:
A) upon detecting an early paging indicator that is indicative that a page is present in the paging occasion for the subgroup, attempting to receive a page during the paging occasion; or
B) upon detecting an early paging indicator that is indicative that a page is not present in the paging occasion for the subgroup, entering an energy saving mode,
wherein monitoring for an early paging indicator that comprises at least one phase-continuous tone for the early paging indicator occasion comprises monitoring at least one band-edge subcarrier frequency, which lies inside an allocated frequency band but outside a frequency range configured for data transmission, allocated for transmission of the early paging indicator.

13. A mobile device, the mobile device belonging to a subgroup of a plurality of subgroups of mobile devices associated with a given paging occasion, each subgroup having a respective early paging indicator specific to the subgroup, the mobile device comprising:
at least one antenna;
a wireless access radio, functionally connected to the at least one antenna, configured to communicate with at least one wireless access network;
a processor, functionally connected to the wireless access radio, configured to process wireless communications communicated via the wireless access radio;
an early paging indicator detector function configured to, for each of at least one paging occasion assigned to the mobile device:
for an early paging indicator occasion in advance of and associated with the paging occasion, monitor via the wireless access radio for an early paging indicator that comprises at least one phase-continuous tone over the early paging indicator occasion; and
either:
A) upon detecting an early paging indicator that is indicative that a page is present in the paging occasion for the subgroup, prompt the processor to attempt during the paging occasion to receive a page via the wireless access radio; or
B) upon detecting an the early paging indicator that is indicative that a page is not present in the paging occasion for the subgroup, prompt the processor to enter an energy saving mode,
wherein the early paging indicator function is configured to monitor for an early paging indicator that comprises at least one phase-continuous tone for the early paging indicator occasion by calculating received energy of an early paging indicator that comprises at least one phase-continuous tone over a first time duration and determining that the early paging indicator has been detected if the received energy that has been calculated exceeds a first threshold value.

14. A mobile device, the mobile device belonging to a subgroup of a plurality of subgroups of mobile devices associated with a given paging occasion, each subgroup having a respective early paging indicator specific to the subgroup, the mobile device comprising:
at least one antenna;
a wireless access radio, functionally connected to the at least one antenna, configured to communicate with at least one wireless access network;
a processor, functionally connected to the wireless access radio, configured to process wireless communications communicated via the wireless access radio;
an early paging indicator detector function configured to, for each of at least one paging occasion assigned to the mobile device:
for an early paging indicator occasion in advance of and associated with the paging occasion, monitor via the wireless access radio for an early paging indicator that comprises at least one phase-continuous tone over the early paging indicator occasion; and
either:
A) upon detecting an early paging indicator that is indicative that a page is present in the paging occasion for the subgroup, prompt the processor to attempt during the paging occasion to receive a page via the wireless access radio; or
B) upon detecting an the early paging indicator that is indicative that a page is not present in the paging occasion for the subgroup, prompt the processor to enter an energy saving mode,
wherein the early paging indicator detector function is further configured to:
receive via the wireless access radio a reference tone within a subcarrier frequency space; and
monitor for the respective early paging indicator specific to the subgroup to which the mobile device belongs by monitoring for a tone having an offset from the frequency of the reference tone corresponding to the subgroup to which the mobile device belongs.

15. The mobile device of claim 14, wherein the early paging indicator detector function is further configured to:
receive via the wireless access radio a timing correction tone; and
determine, based on at least one of the activation or deactivation edges of the timing correction tone, the timing associated with waking up at least one of the early paging indicator detector function or the wireless access radio for the next early paging indicator occasion.

16. A mobile device, the mobile device belonging to a subgroup of a plurality of subgroups of mobile devices associated with a given paging occasion, each subgroup having a respective early paging indicator specific to the subgroup, the mobile device comprising:
at least one antenna;
a wireless access radio, functionally connected to the at least one antenna, configured to communicate with at least one wireless access network;
a processor, functionally connected to the wireless access radio, configured to process wireless communications communicated via the wireless access radio;
an early paging indicator detector function configured to, for each of at least one paging occasion assigned to the mobile device:
for an early paging indicator occasion in advance of and associated with the paging occasion, monitor via the wireless access radio for an early paging indicator that comprises at least one phase-continuous tone over the early paging indicator occasion; and
either:
A) upon detecting an early paging indicator that is indicative that a page is present in the paging occasion for the subgroup, prompt the processor to attempt during the paging occasion to receive a page via the wireless access radio; or B) upon detecting an the early paging indicator that is indicative that a page is not present in the paging occasion for the subgroup, prompt the processor to enter an energy saving mode, wherein the early paging indicator detector function is configured to monitor for an early paging indicator that comprises at least one phase-continuous tone over the early paging indicator occasion by monitoring at least one band-edge subcarrier frequency, which lies inside an allocated frequency band but outside a frequency range configured for data transmission, allocated for transmission of the early paging indicator.

* * * * *

UNITED STATES PATENT AND TRADEMARK OFFICE
CERTIFICATE OF CORRECTION

PATENT NO.        : 8,897,818 B2                                                 Page 1 of 1
APPLICATION NO.   : 12/944309
DATED             : November 25, 2014
INVENTOR(S)       : Jianfeng Weng et al.

It is certified that error appears in the above-identified patent and that said Letters Patent is hereby corrected as shown below:

In the claims:

Column 45, Claim 13, Line 46, "...upon detecting an the early..." should read --...upon detecting an early...--

Column 46, Claim 14, Line 19, "...upon detecting an the early..." should read --...upon detecting an early...--

Column 47, Claim 16, Line 1, "...upon detecting an the early..." should read --...upon detecting an early...--

Signed and Sealed this
Twenty-eighth Day of April, 2015

Michelle K. Lee
*Director of the United States Patent and Trademark Office*